April 17, 1962 R. A. BAER ET AL 3,030,494
METHOD AND APPARATUS FOR FORMING A CONTINUOUS RAIL
Original Filed April 24, 1959 23 Sheets-Sheet 7
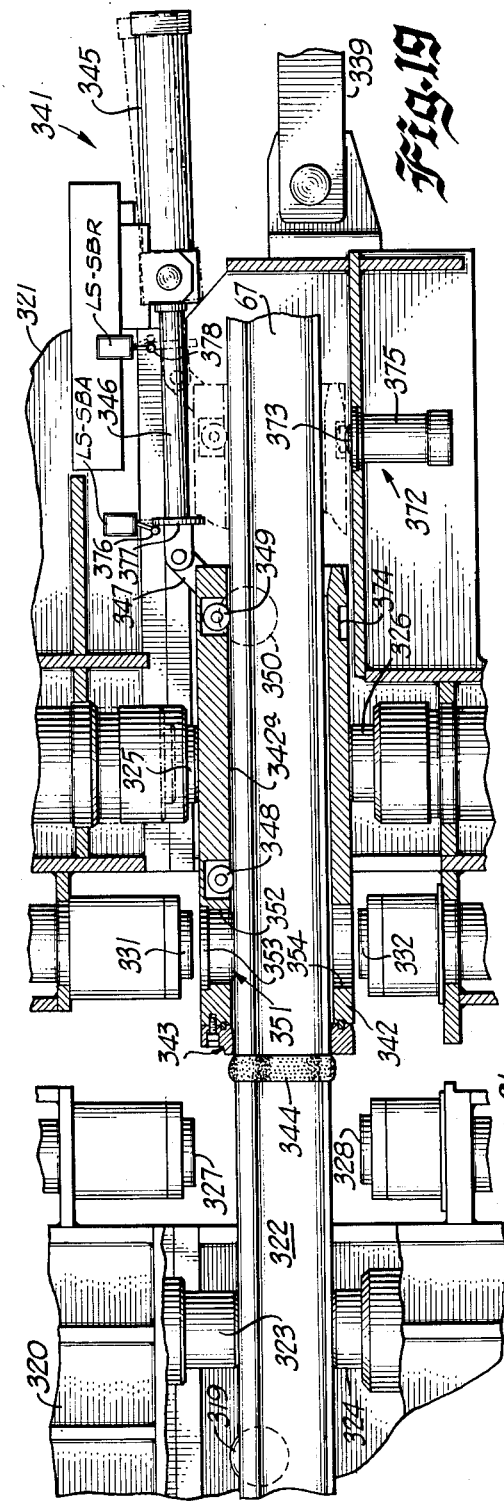
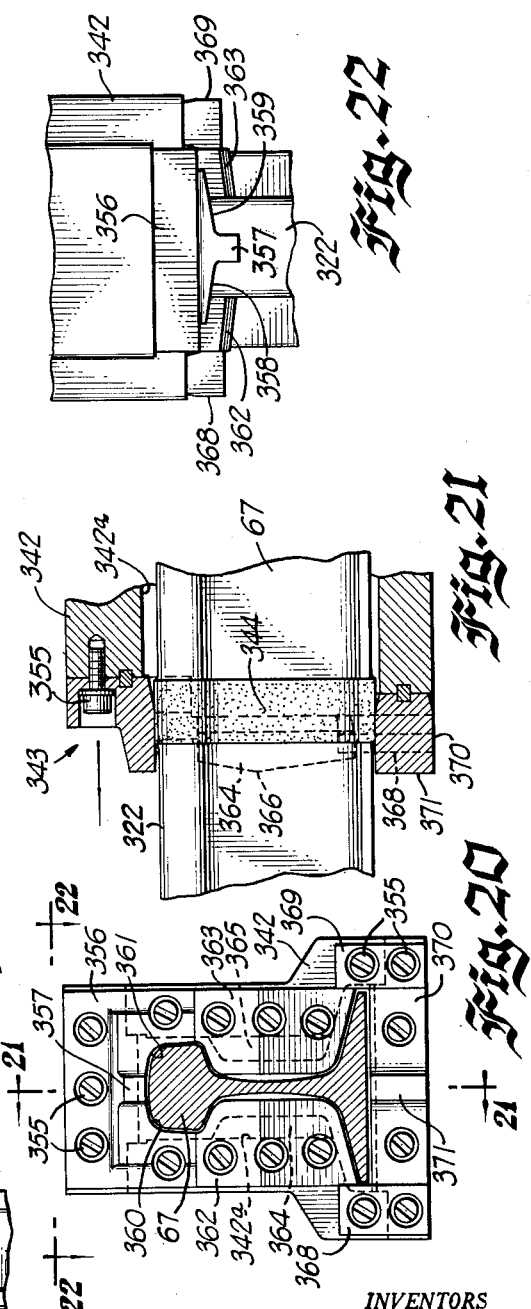
INVENTORS
ROBERT A. BAER,
ROBERT E. SLATTERY AND
BY ALBERT L. TRIPP
Mason, Kolehmainen,
Rathburn and Wyss
ATTORNEYS

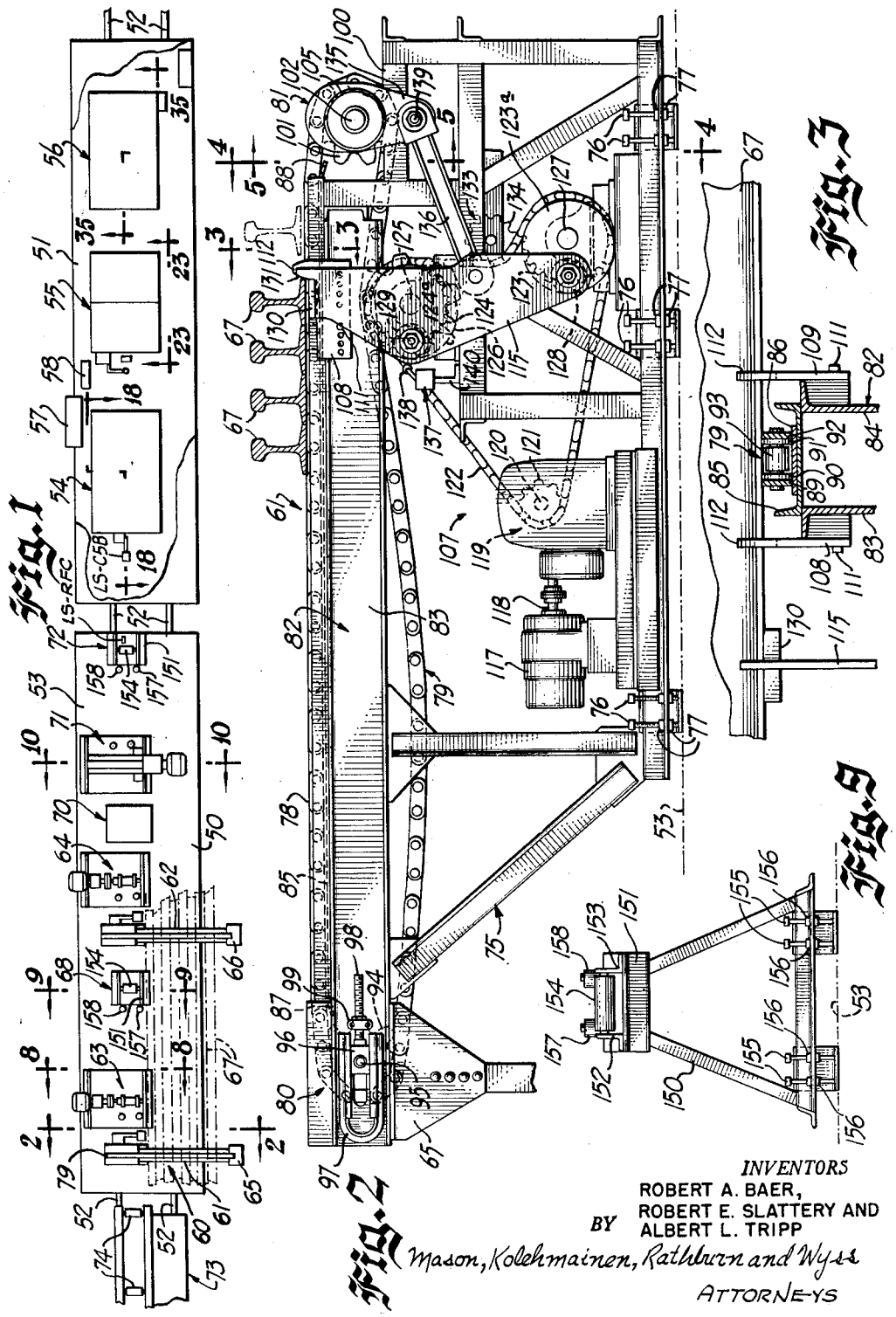

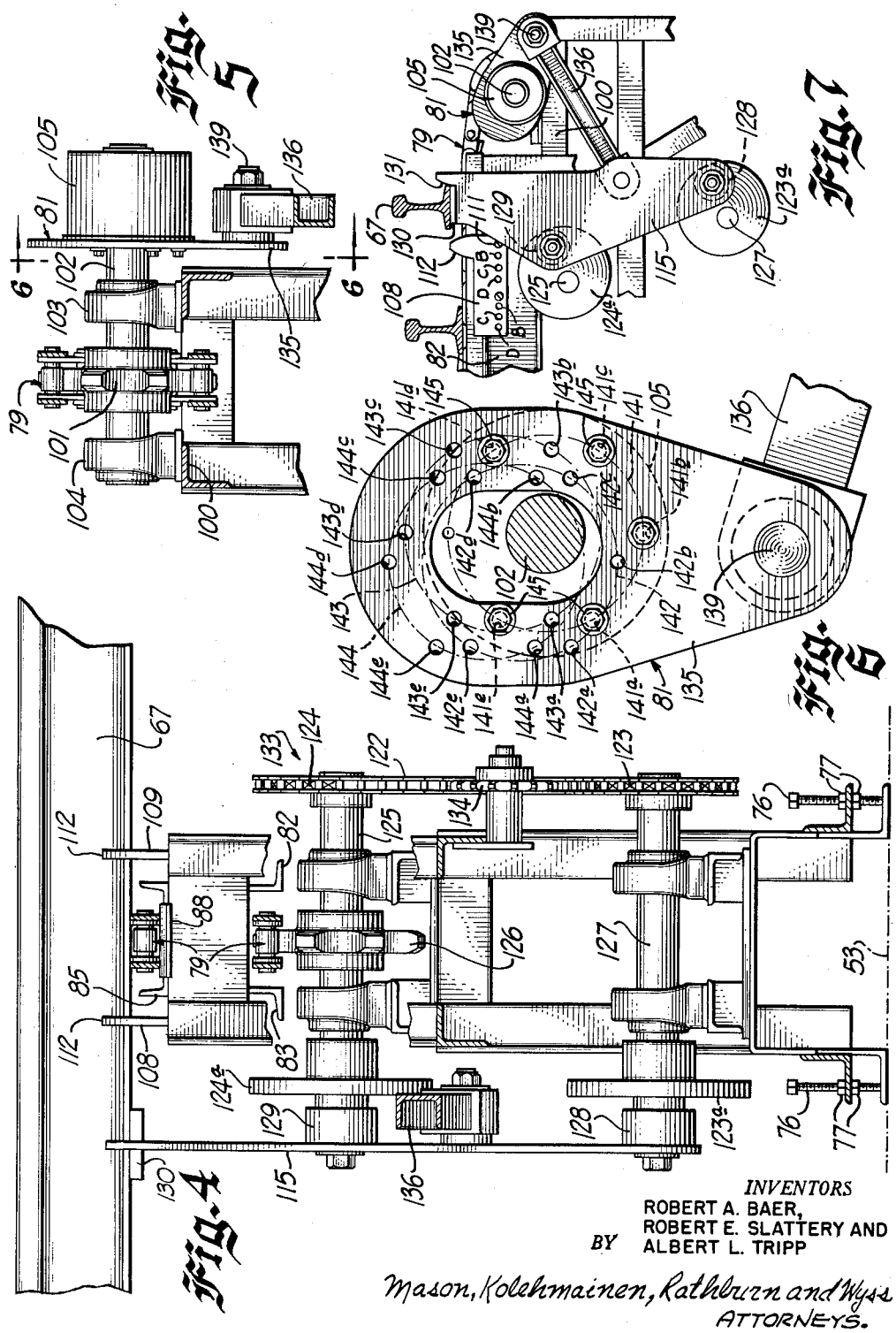

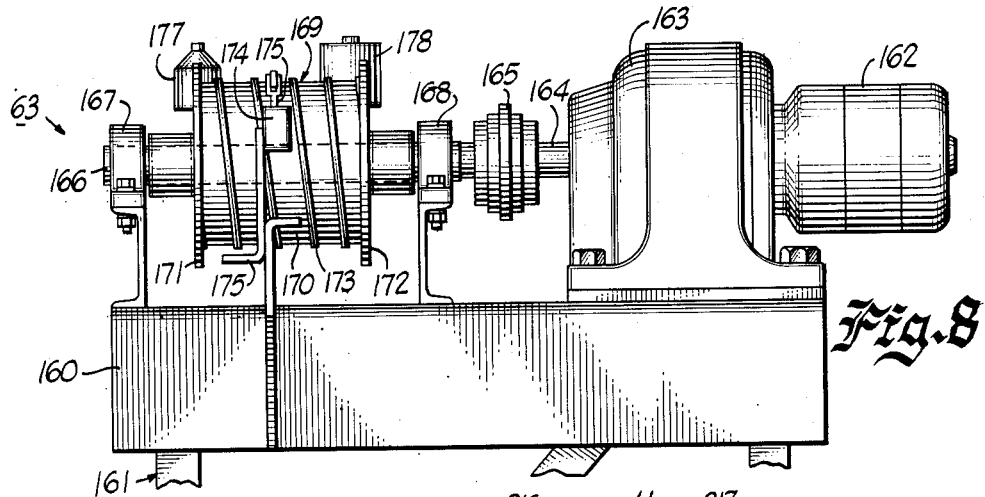
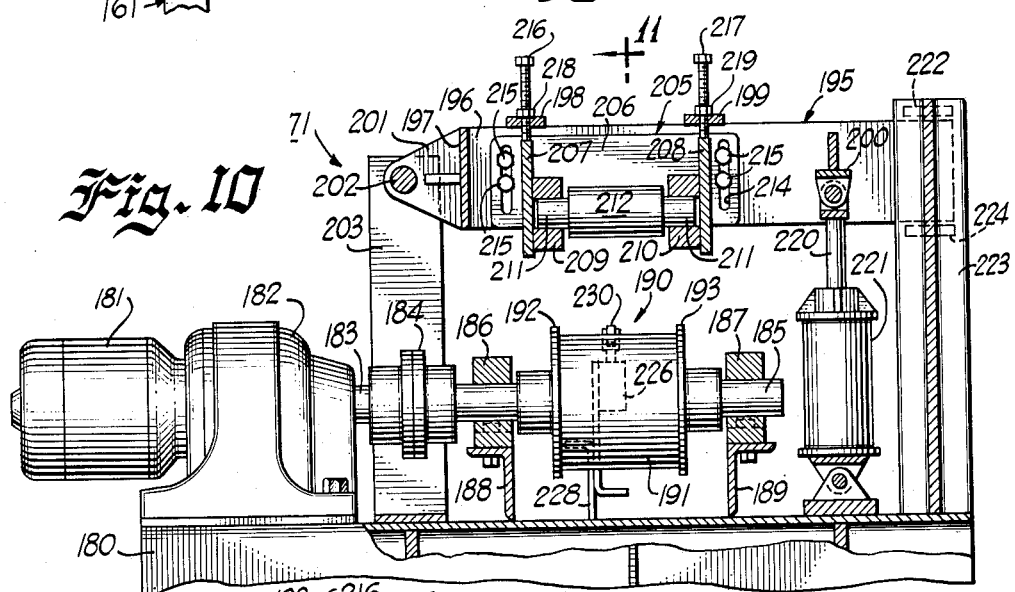
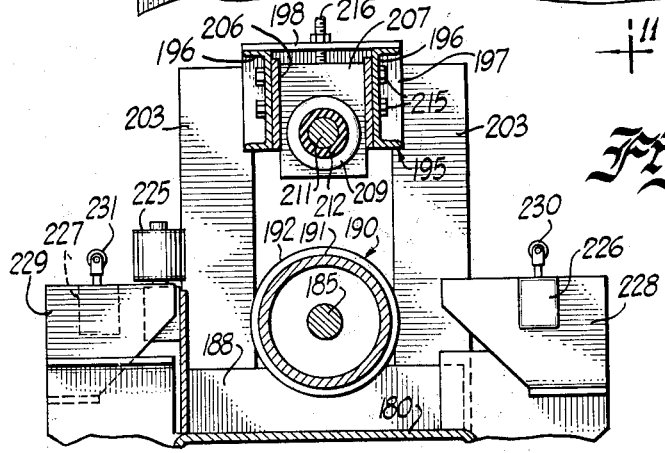

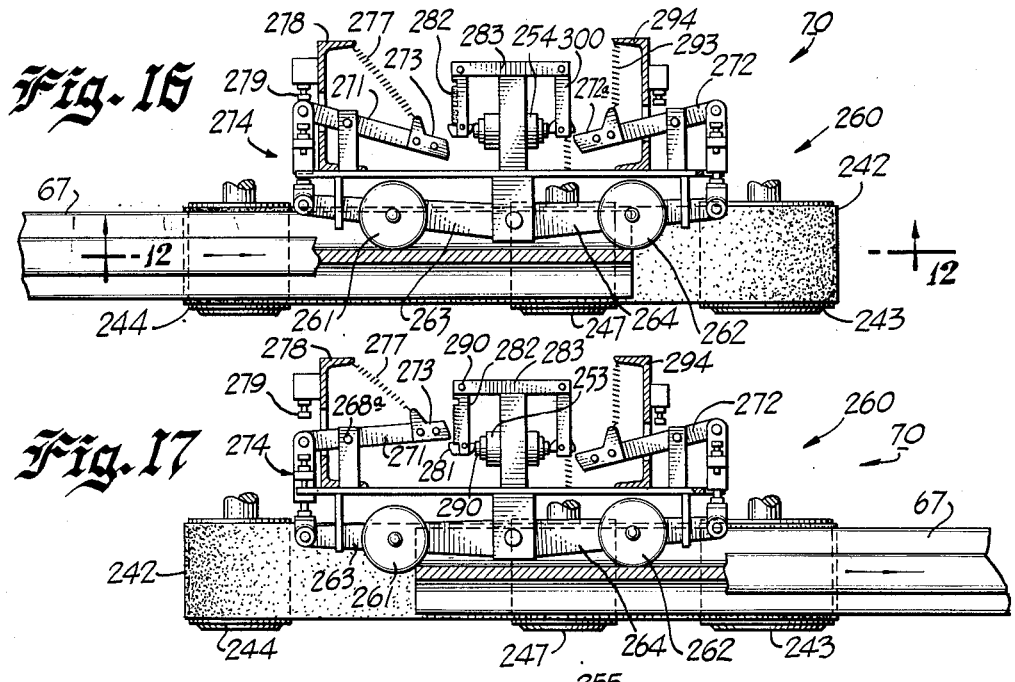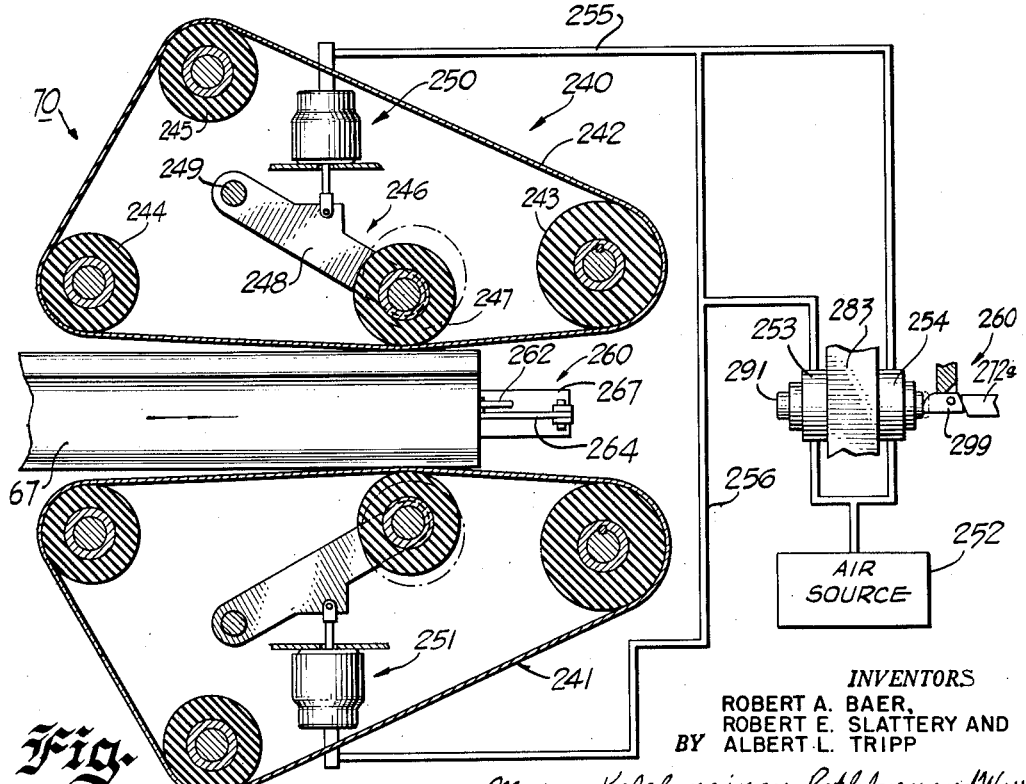

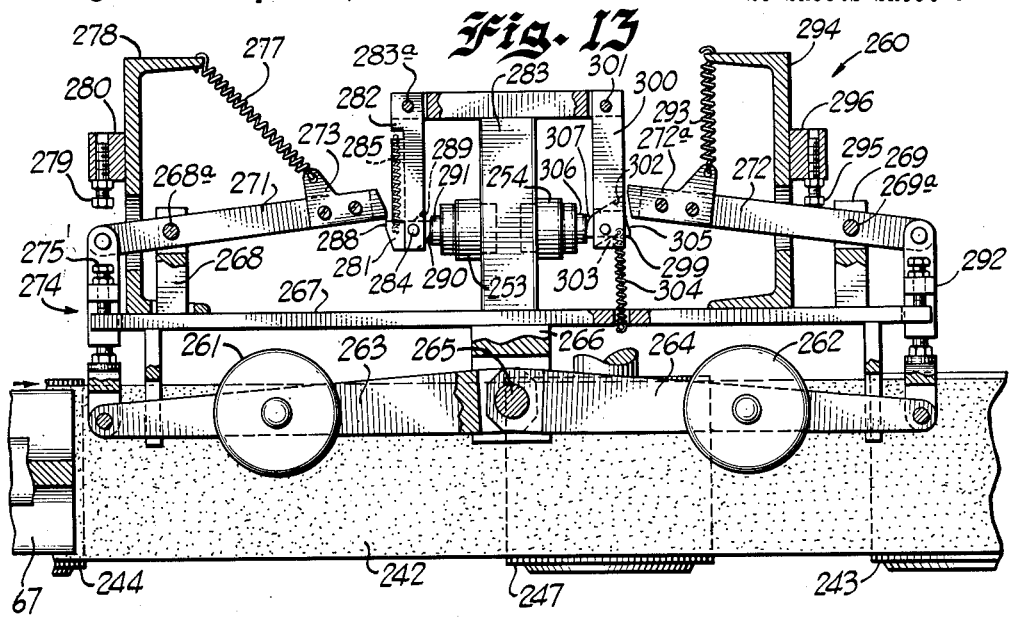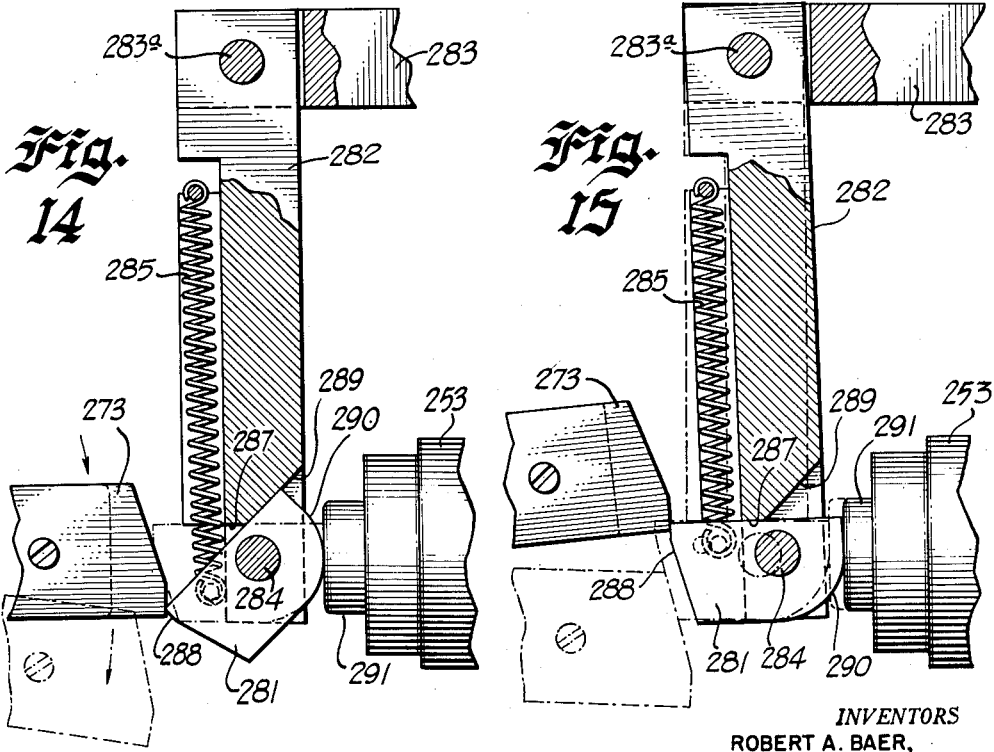

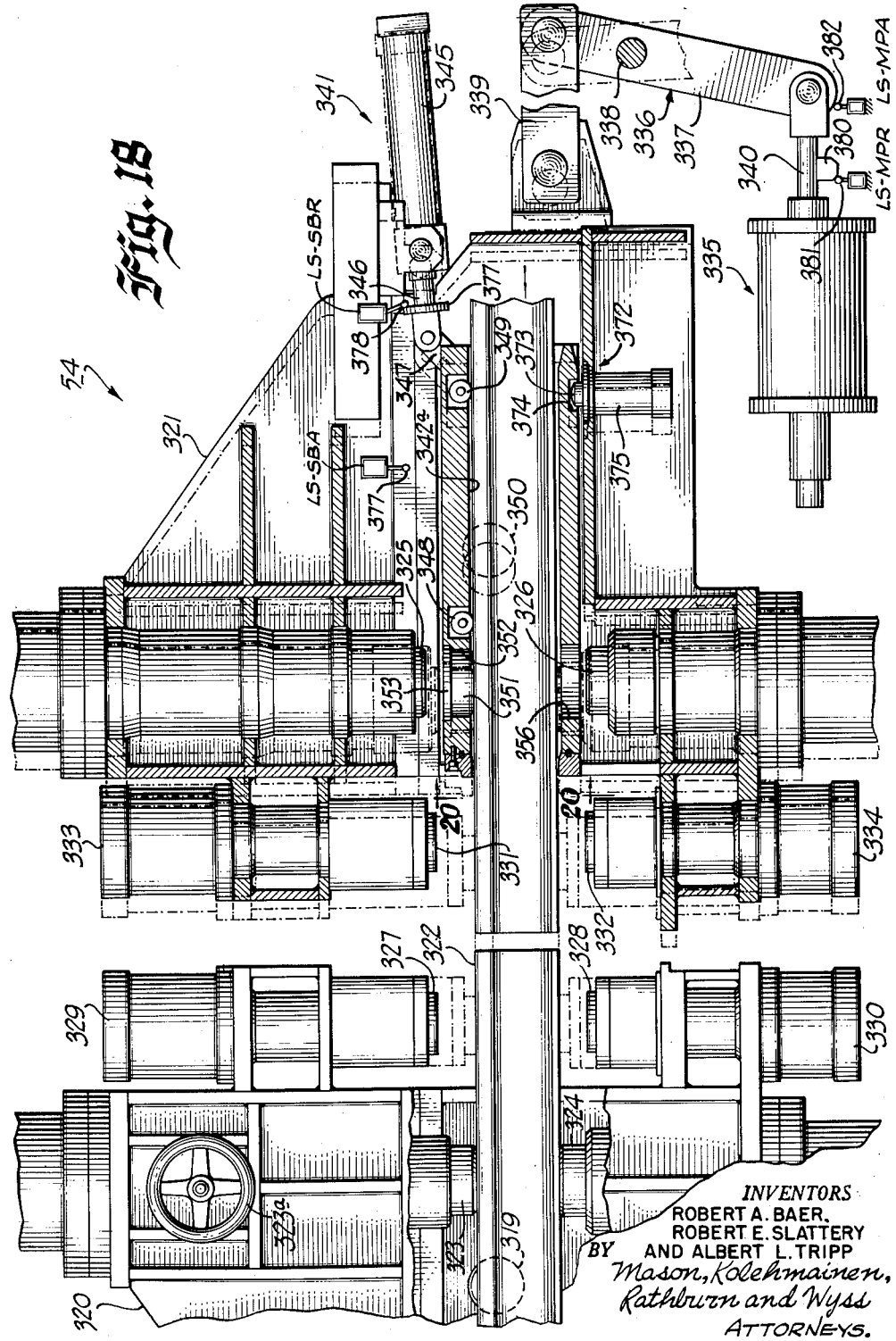

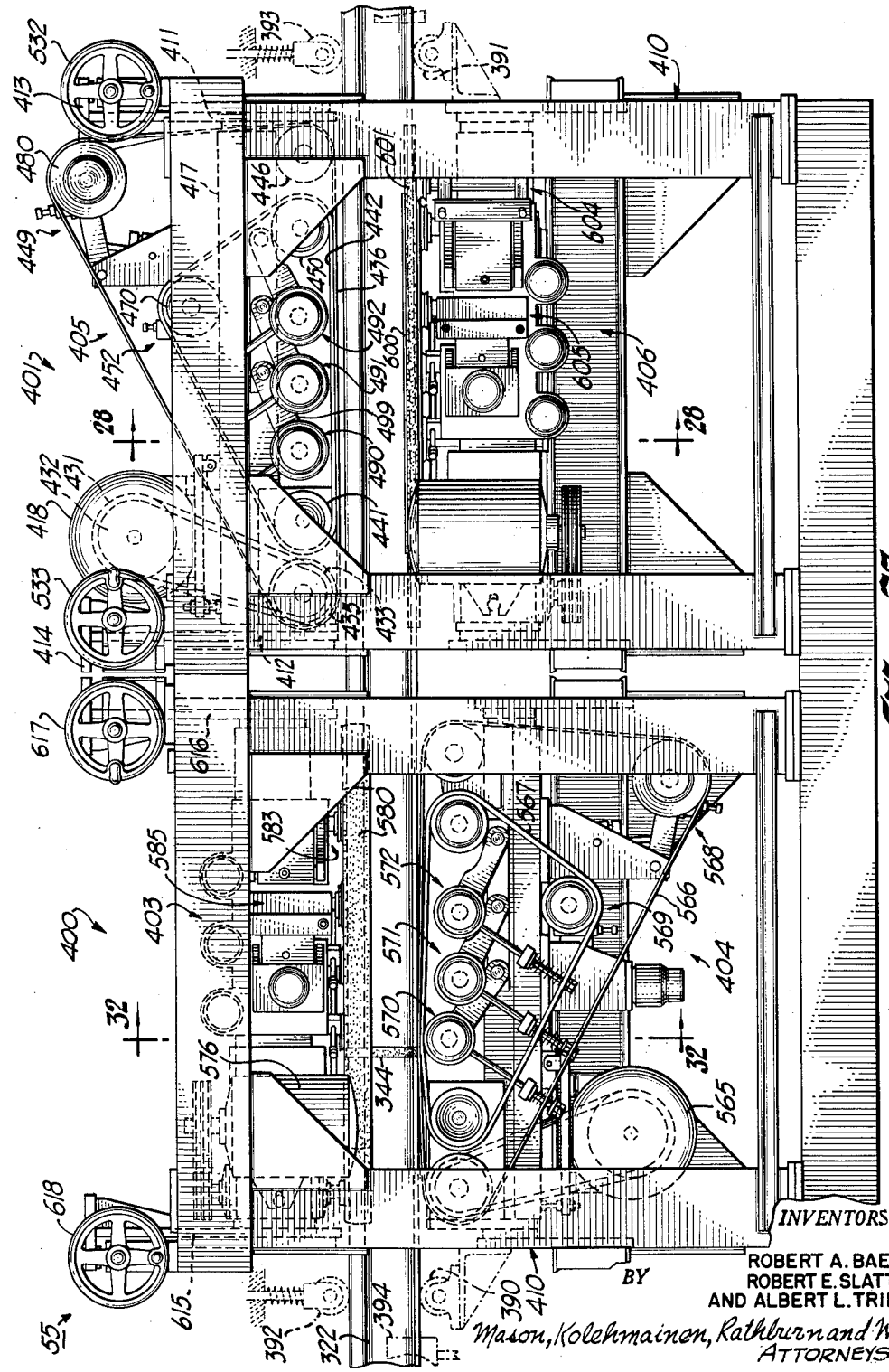

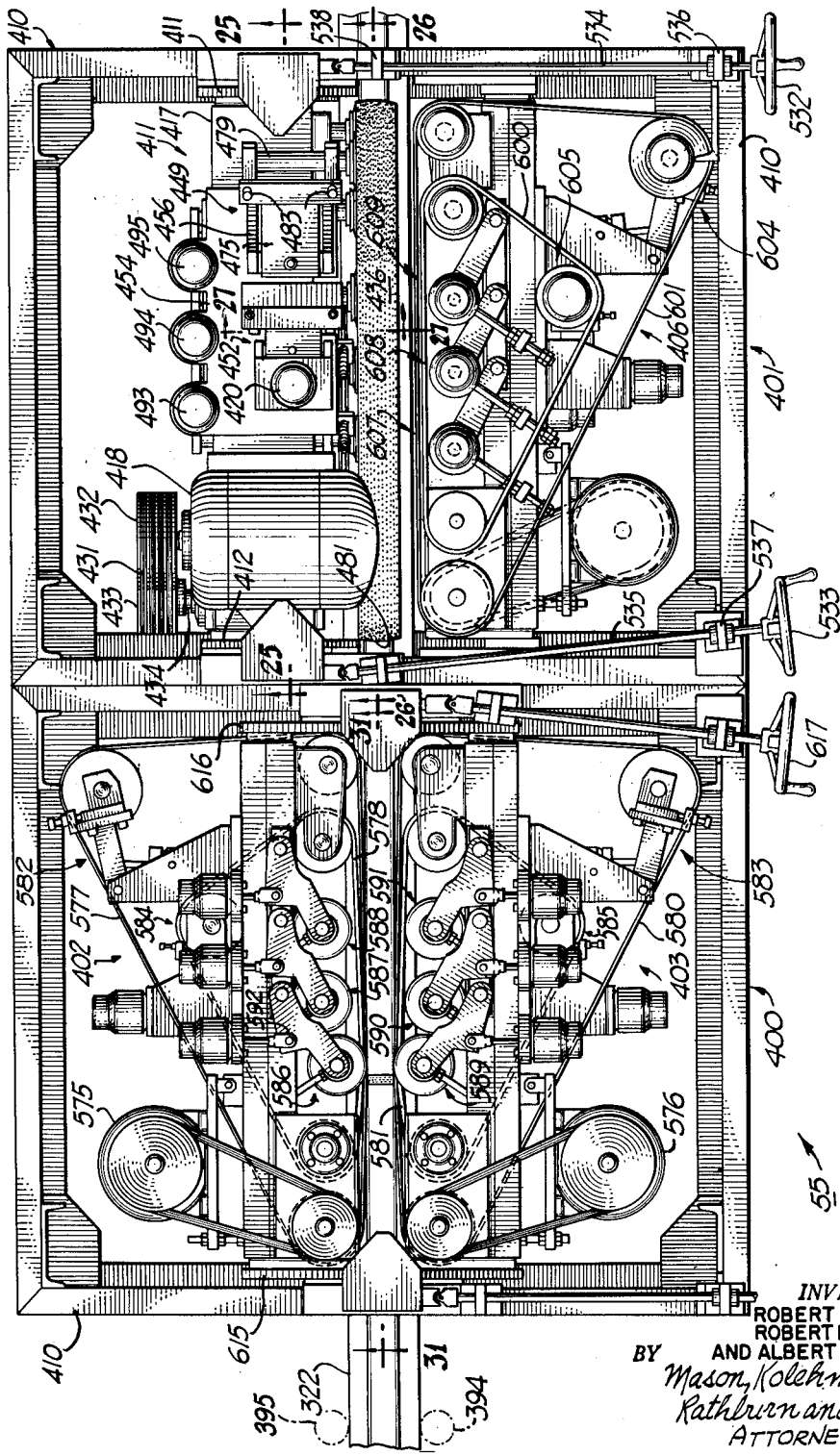

April 17, 1962 R. A. BAER ET AL 3,030,494
METHOD AND APPARATUS FOR FORMING A CONTINUOUS RAIL
Original Filed April 24, 1959 23 Sheets-Sheet 10
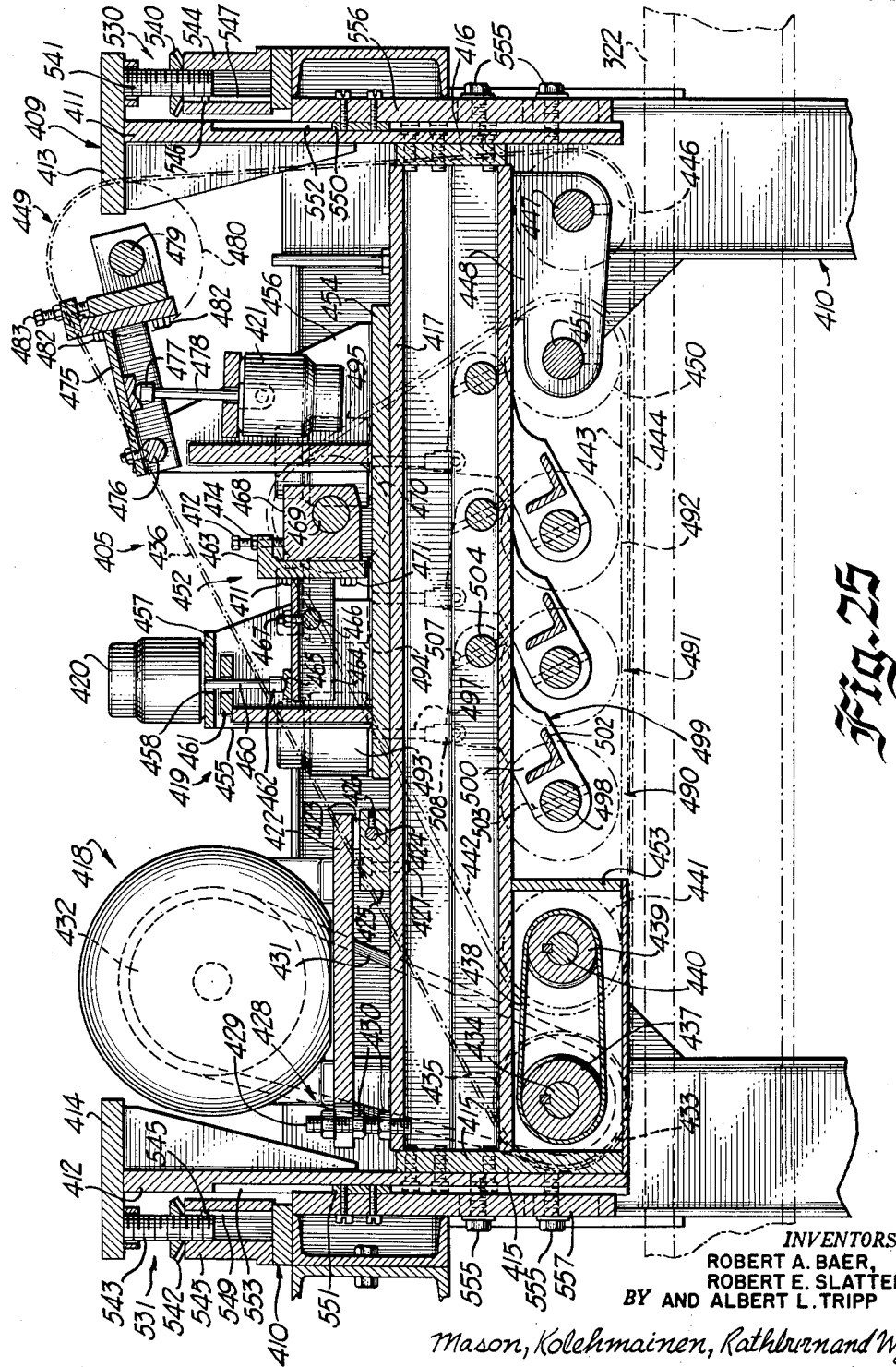
INVENTORS
ROBERT A. BAER,
ROBERT E. SLATTERY
BY AND ALBERT L. TRIPP
Mason, Kolehmainen, Rathburn and Wyss
ATTORNEYS.

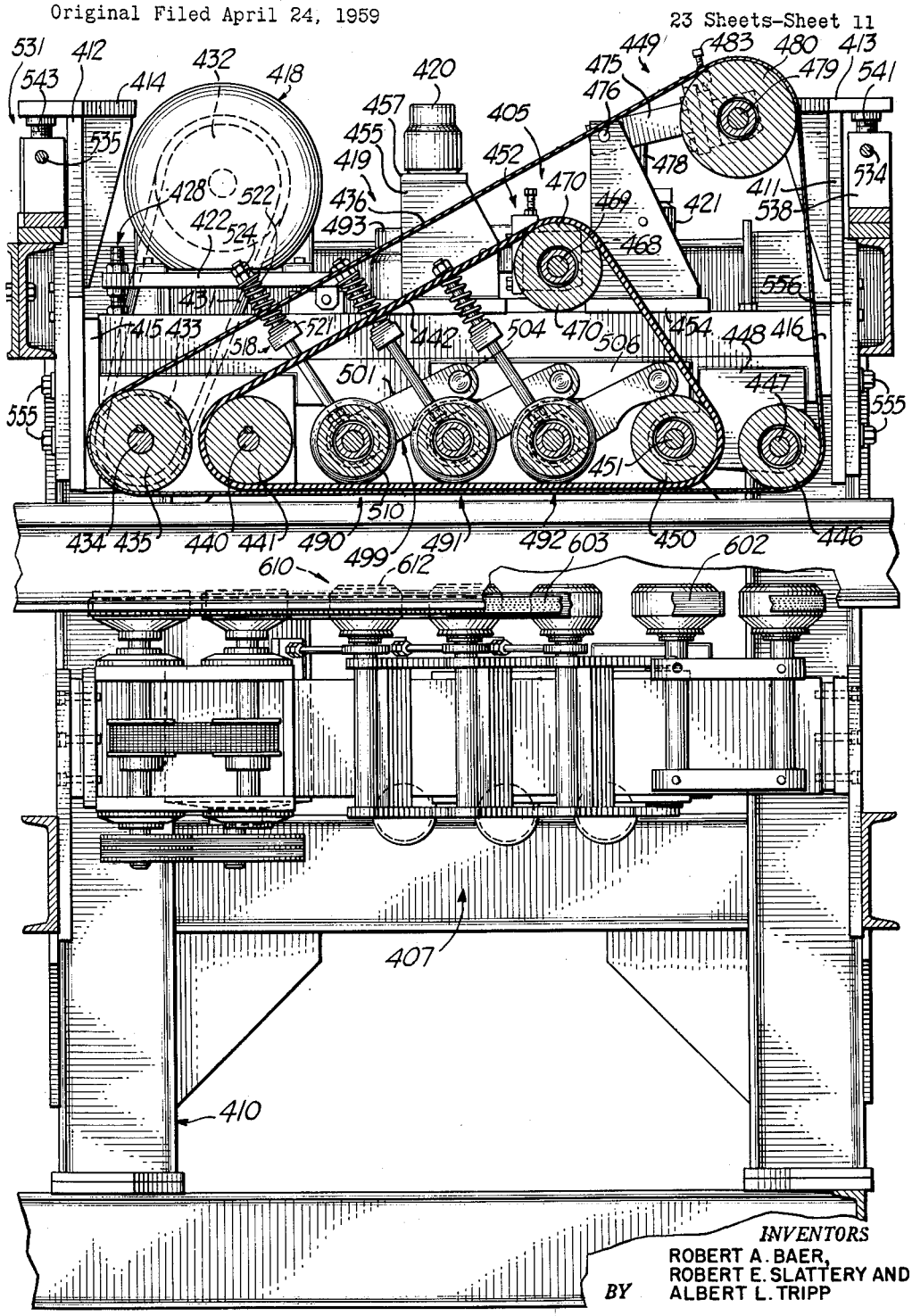

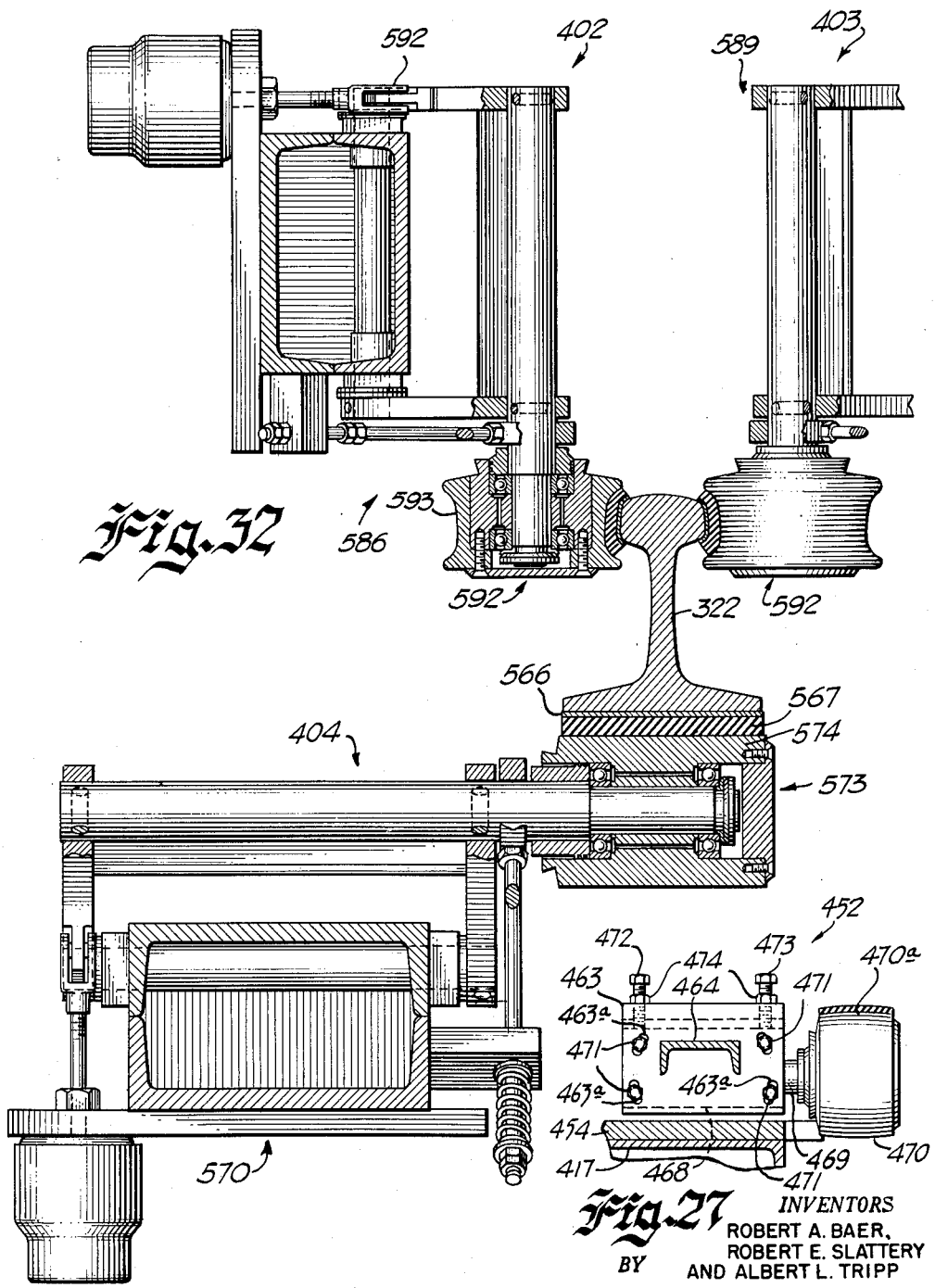

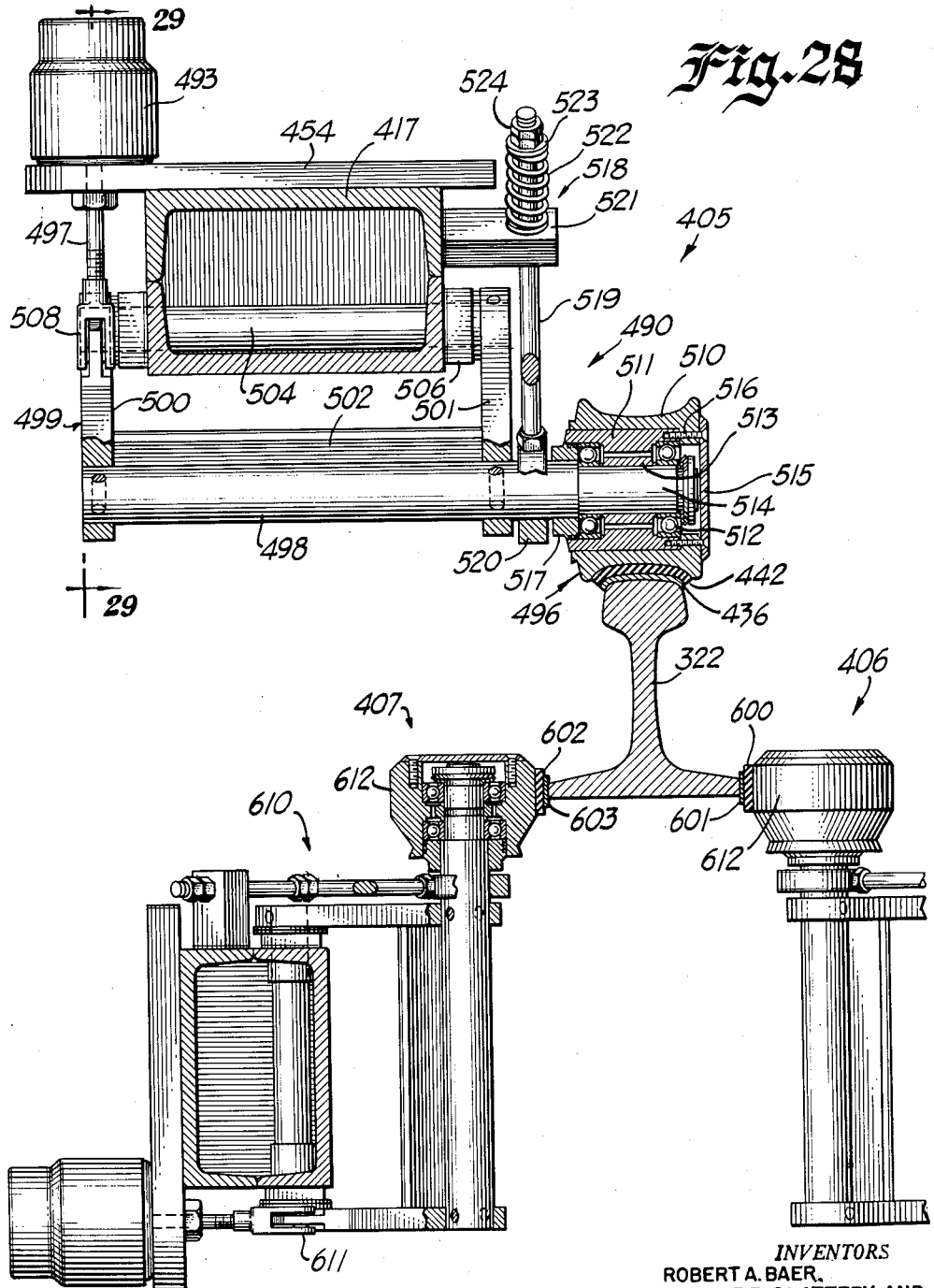

April 17, 1962 R. A. BAER ET AL 3,030,494
METHOD AND APPARATUS FORMING A CONTINUOUS RAIL
Original Filed April 24, 1959 23 Sheets-Sheet 14
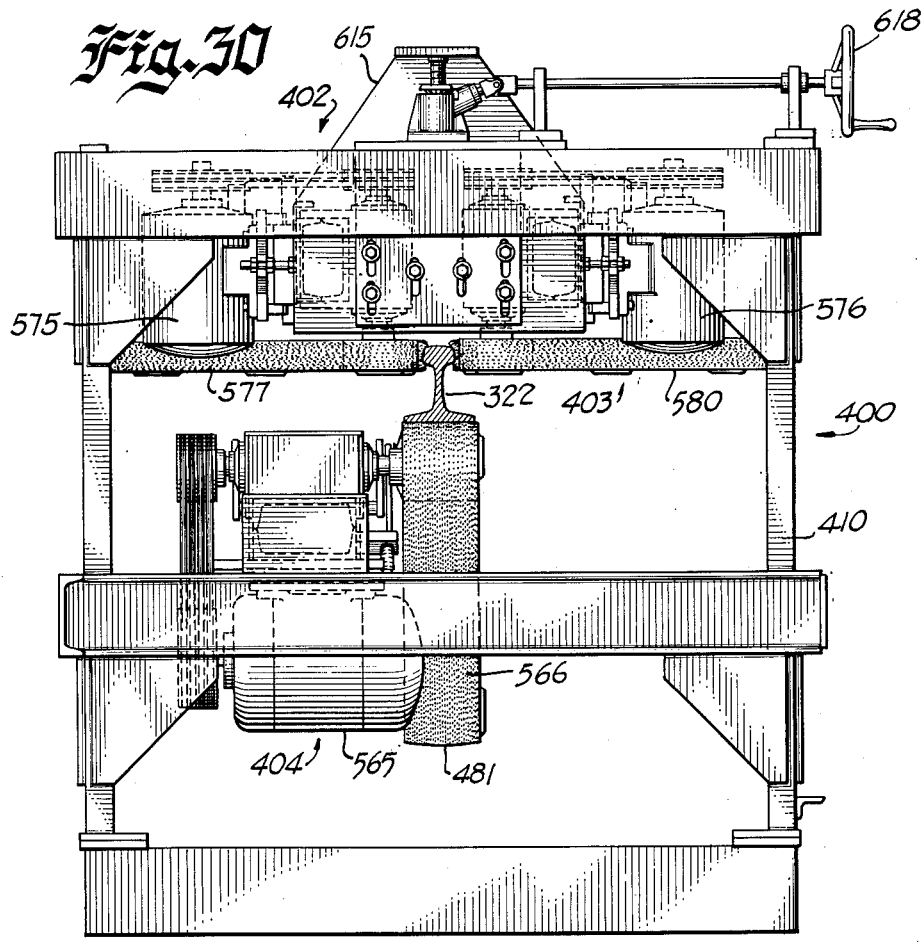
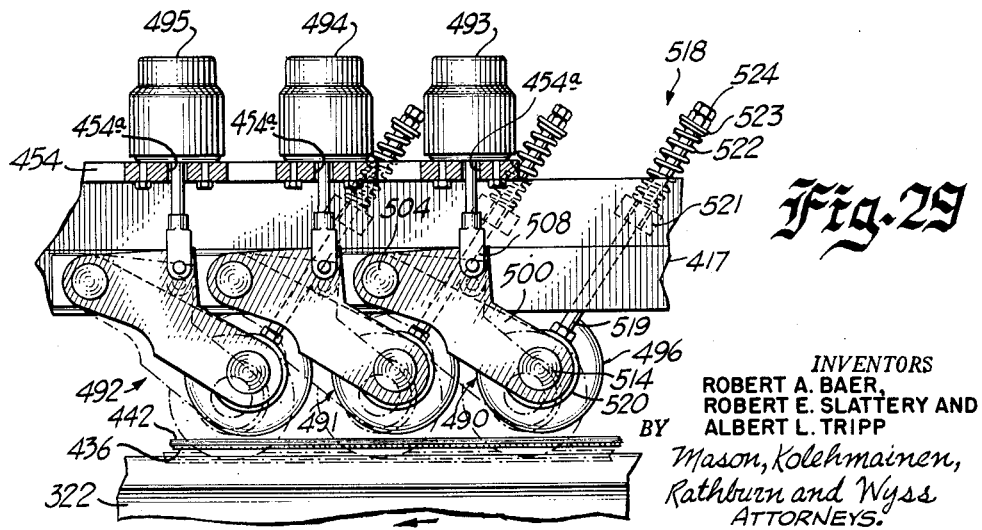
INVENTORS
ROBERT A. BAER,
ROBERT E. SLATTERY AND
ALBERT L. TRIPP
BY Mason, Kolehmainen,
Rathburn and Wyss
ATTORNEYS.

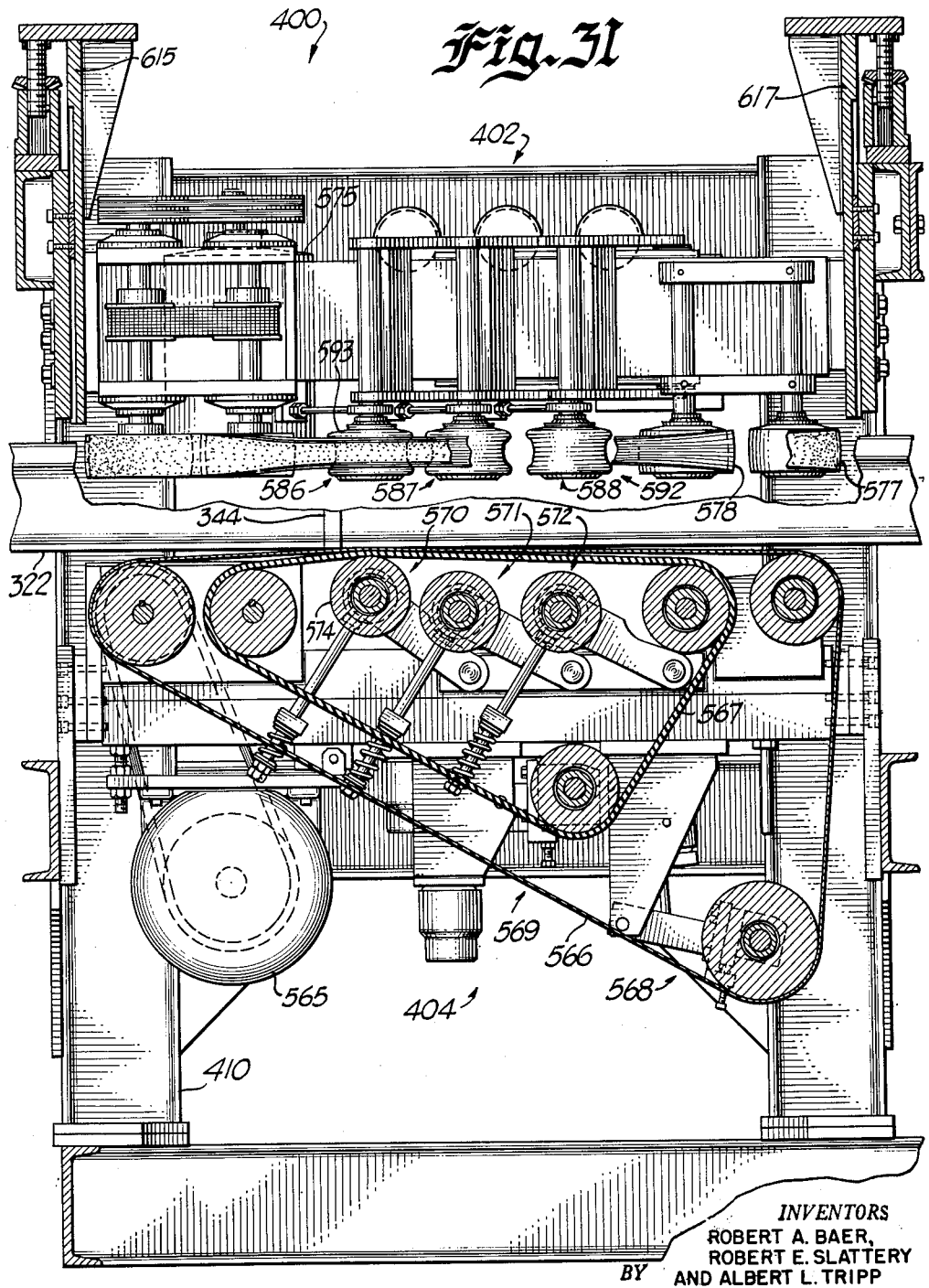

April 17, 1962  R. A. BAER ET AL  3,030,494
METHOD AND APPARATUS FOR FORMING A CONTINUOUS RAIL
Original Filed April 24, 1959  23 Sheets-Sheet 16

INVENTORS
ROBERT A. BAER,
ROBERT E. SLATTERY AND
BY ALBERT L. TRIPP

Mason, Kolehmainen, Rathburn and Wyss
ATTORNEYS.

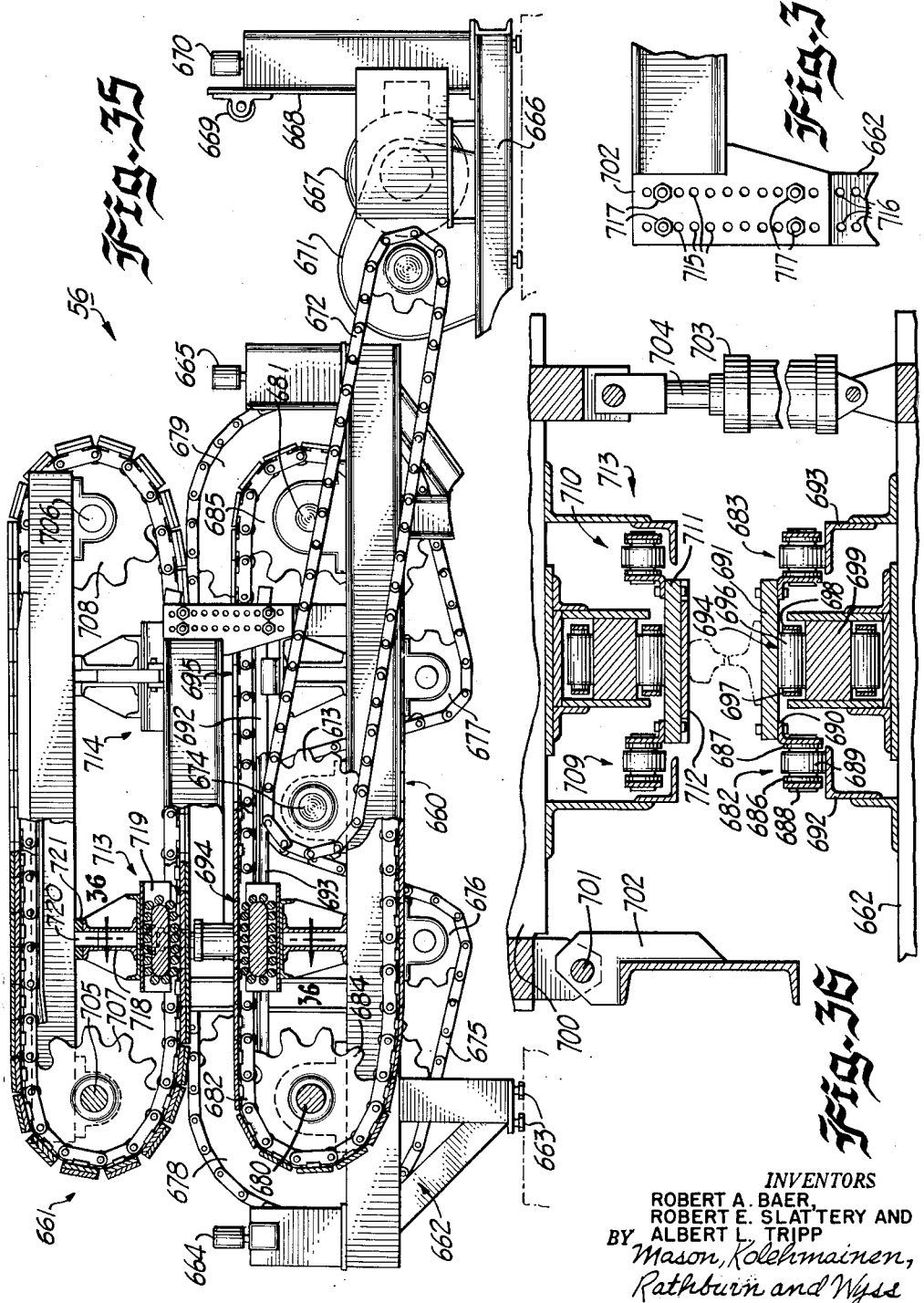

April 17, 1962   R. A. BAER ET AL   3,030,494
METHOD AND APPARATUS FOR FORMING A CONTINUOUS RAIL
Original Filed April 24, 1959   23 Sheets-Sheet 18

INVENTORS
ROBERT A. BAER,
ROBERT E. SLATTERY AND
BY ALBERT L. TRIPP
Mason, Kolehmainen, Rathburn and Wyss
ATTORNEYS.

April 17, 1962  R. A. BAER ET AL  3,030,494
METHOD AND APPARATUS FOR FORMING A CONTINUOUS RAIL
Original Filed April 24, 1959   23 Sheets-Sheet 20

INVENTORS
ROBERT A. BAER,
ROBERT E. SLATTERY AND
ALBERT L. TRIPP
BY Mason, Kolehmainen,
Rathburn and Wyss
ATTORNEYS.

April 17, 1962   R. A. BAER ET AL   3,030,494
METHOD AND APPARATUS FOR FORMING A CONTINUOUS RAIL
Original Filed April 24, 1959   23 Sheets-Sheet 23

INVENTORS
ROBERT A. BAER,
ROBERT E. SLATTERY AND
BY ALBERT L. TRIPP
Mason, Kolehmainen, Rathburn and Wyss
ATTORNEYS.

United States Patent Office 3,030,494
Patented Apr. 17, 1962

3,030,494
METHOD AND APPARATUS FOR FORMING A CONTINUOUS RAIL
Robert A. Baer, Kenilworth, Robert E. Slattery, Rockford, and Albert L. Tripp, Chicago, Ill., assignors to Chemetron Corporation, Chicago, Ill., a corporation of Delaware
Continuation of application Ser. No. 808,786, Apr. 24, 1959. This application May 16, 1961, Ser. No. 112,167
53 Claims. (Cl. 219—101)

This invention relates generally to a new and improved method and apparatus for forming a continuous rail and is more particularly concerned with a new and improved method and apparatus comprising a number of individual components coacting to produce a continuous rail much more quickly, more economically and more efficiently than has heretofore been possible. This application is a continuation of U.S. patent application Serial No. 808,786, filed April 24, 1959, now abandoned.

For a number of years it has been evident that the use of railroad tracks in the form of rail sections welded together to form a continuous strip is particularly desirable because such a construction not only increases the riding comfort of railroad passengers and reduces the shock and vibration to which rail freight is subjected but, at the same time, is substantially trouble free and, hence, requires considerably less maintenance than tracks of the type employing individual rail sections bolted or otherwise secured together. Despite the knowledge of these advantages, however, the use of welded rails has not been wide spread due partly to their excessive cost and also to the inordinate amount of time usually required to form the welded joint for the rail sections. More specifically, in order to form an efficient welded joint, it is necessary not only to weld the rail sections together but also to shear off the upset or excess weld metal and/or to grind the rail in order to form smooth surfaces for the rail base and for the running surface adapted to accommodate the wheels of the railroad car. In prior art arrangements, all of these operations have been very time consuming and, hence, both the time required to form the continuous rail and the production costs have been excessive. Moreover, the prior arrangements for welding the rail sections together have also been found to be unsatisfactory in that they result in the production of a large number of unsatisfactory welds which must be corrected by severing the joint and making a new weld. Obviously, the production of improper welds also increases both the time required and the cost of production of the rail.

It is an object of the present invention therefore to provide a new and improved method and apparatus for producing a continuous rail much more quickly, more economically and considerably more efficiently than devices of prior construction.

Another object of the invention is to provide a new and improved method and apparatus for welding together a number of rail sections, for shearing off the excess material around each welded joint and for grinding the sheared weld in such manner that the number of unsatisfactory welds produced is considerably smaller than with systems employed prior to the present invention.

A further object of the invention is to provide apparatus of the type described wherein the welding, grinding and rail moving equipment are located within a single railroad car so that they may be transported from place to place very easily.

It is also an object of the invention to provide a rail forming system of the type described above employing a belt type grinder which is rendered automatically effective as the welded joint is advanced.

It is a further object of the invention to provide a system of the type described above wherein the different operations are performed automatically and in predetermined order so that the continuous rail is formed with a minimum of manual supervision by the operator.

Another object of the invention is to provide a rail forming system of the character described above wherein the rail feeding apparatus, the welding apparatus, the shearing device, the grinding equipment, and the rail pusher mechanism are operated substantially automatically and in predetermined sequence in a continuous cycle so that new rail sections can be joined to the continuous rail very quickly.

The foregoing and other objects are realized, in accordance with the present invention, by providing an apparatus wherein a plurality of individual rail sections to be welded together are stored on a rack and are lifted one at a time onto power driven rollers which feed the rails to an electric flash type welder. As the rail section advances along the power driven rollers a belt type spot grinder is operated automatically to remove accumulated scale from small areas of the running surface and the base of the rail section near its opposed ends. This spot grinder includes pressure operated rollers automatically actuated by the rail ends as these ends pass through the device in order to move the belts into engagement with the rail sections in the areas to be ground or cleaned. Following the spot grinding operation, the rail section is fed to the welding apparatus where it is joined to the end of the continuous rail formed by previous welding operations. The welding is performed by passing current from electrodes through the ends to be joined, moving the rail section back and forth to flash the ends until they are heated and then forcing the rail section against the continuous rail to complete the weld. When the end of the rail section is forced against the end of the continuous rail, an upset of metal is pushed out around the joint and, hence, as soon as the welding operation is completed, a shear block is rendered automatically effective to remove a major portion of the upset metal. At the completion of the shearing operation, a pusher mechanism acting upon the continuous rail is rendered effective to move the continuous rail including the added rail section through the grinding machine where the remaining excess metal surrounding the welded joint is removed. The grinding equipment is provided with a plurality of grinding heads each including a driven grinding belt having a grinding surface extending longitudinally of the rail. The grinding belts are so arranged that each acts upon only a very small section of the rail surface. The heads are arranged in two spaced apart groups or stations with the grinding heads at the first station being effective to grind the sides of the rail head and the underside of the base and the grinding heads at the second station being effective to grind the running surface of the rail head and the two side edges of the base. The grinding belt of each head is urged into engagement with the rail surface to be ground by means of a plurality of fluid pressure operated contact rollers with the rollers for the running surface and the sides of the rail head being contoured to conform to the rail being formed. The entire apparatus is adjustable to handle rail sections of different diameter and different length. The pressure rollers are not rendered effective to move the belt into engagement with the rail until the welded joint has reached a point near the grinding surface of the belt and, as a result, the belts do not grind an excessive area of the rail surface. The pressure rollers are rendered automatically effective by means of a weld sensing mechanism which is actuated by contact with the excess metal on the rail web at the welded joint to be ground. When the weld sensing mechanism is actuated, a timing mechanism is started which functions to apply fluid pressure to the pressure operated rollers in sequence in order to force the belts against the rail in a predetermined order as the weld advances through each grinding station. The continuous welded rail is moved from the welding apparatus through the grinding equipment by means of a motor operated pusher mechanism which is basically formed of two opposed endless treads respectively acting upon the base and the running surface of the continuous rail. The pusher mechanism can be rendered effective to move the rail at different speeds and is in fact operated so that the rail slows down during the time when the welded joint is passing through each of the grinding stations and is then speeded up as the welded joint passes from the first grinding station to the second station. The continuous rail is pushed from the welding car past a testing station where each weld is carefully checked to make certain that it is satisfactory. In the event that an unsatisfactory weld is found provision is made for backing up the continuous rail to permit removal of the improper joint and to allow a new weld to be made in place of the defective one. Rails up to one quarter of a mile in length are formed by joining rail sections in the manner described above and these rails are passed from the testing station onto a suitable rail receiving means which may take the form of a string of flat cars lined up adjacent the welding car so that the completed rail may be transported to the area where it is to be installed. Alternatively, the rail receiving means may comprise a storage rack for holding several rows of rails in stacked relationship.

The invention both as to its organization and manner of operation together with further objects and advantages will best be understood by reference to the following detailed description taken in conjunction with the accompanying drawings wherein:

FIG. 1 is a plan view showing somewhat schematically the weld forming apparatus of the present invention;

FIG. 2 is an enlarged sectional view taken along a line substantially corresponding to the line 2—2 in FIG. 1 and shows particularly the rail transfer apparatus for lifting the rail sections from the storage bed onto the powered rollers on the rail supply car;

FIG. 3 is an enlarged fragmentary sectional view taken along a line substantially corresponding to the line 3—3 in FIG. 2 and shows particularly the mechanism for lifting the rail section from the storage bed onto the power driven rollers;

FIG. 4 is an enlarged sectional view taken along a line substantially corresponding to line 4—4 in FIG. 2;

FIG. 5 is an enlarged, fragmentary view taken along a line substantially corresponding to line 5—5 in FIG. 2;

FIG. 6 is an enlarged fragmentary view taken along a line substantially corresponding to line 6—6 in FIG. 5 and shows particularly an index plate for adjusting the transfer device to handle rail sections of different size;

FIG. 7 is a fragmentary view showing the transfer apparatus in a different position from that shown in FIG. 2;

FIG. 8 is an enlarged fragmentary view looking in the direction of the arrows 8—8 in FIG. 1 and shows particularly the construction of one of the powered rollers on the rail supply car;

FIG. 9 is an enlarged sectional view taken along a line substantially corresponding to the line 9—9 in FIG. 1 and shows particularly the construction of one of the idler rollers used in feeding the rail sections to the welding car;

FIG. 10 is an enlarged fragmentary sectional view taken along a line substantially corresponding to line 10—10 in FIG. 1 and shows particularly the construction of another one of the power rollers employed in feeding the rail sections to the welding car with this roller being provided with a squeeze roller acting against the running surface of the rail section;

FIG. 11 is a fragmentary sectional view taken along a line substantially corresponding to line 11—11 in FIG. 10 assuming, of course, that the latter shows the entire construction;

FIG. 12 is a sectional view taken along a line substantially corresponding to line 12—12 in FIG. 16, is shown partly schematic and illustrates the grinding heads of the spot grinder and the sensing mechanism for rendering these heads effective to grind the rail section during spaced apart intervals;

FIG. 13 is a fragmentary view showing the construction of the sensing mechanism for rendering the spot grinder effective in its inoperative condition, that is, in the condition when there is no rail section on the spot grinder;

FIG. 14 is a greatly enlarged view partly broken away and showing the valve operating pawls employed in the mechanism illustrated in FIG. 13;

FIG. 15 is a view similar to FIG. 14 but showing the valve operating pawls in a different operating condition;

FIG. 16 is a view similar to FIG. 13 but shows the sensing mechanism in the condition where it is operated by the leading edge of the rail section;

FIG. 17 is a view similar to FIG. 13 but shows the actuating mechanism when it is controlled by the trailing edge of the rail section.

FIG. 18 is a fragmentary sectional view taken along a line substantially corresponding to line 18—18 in FIG. 1 illustrating a shearing mechanism for removing a major portion of the excess weld metal surrounding each welded joint;

FIG. 19 is an enlarged fragmentary sectional view illustrating the operation of the shear box employed in the mechanism shown in FIG. 18;

FIG. 20 is an enlarged sectional view taken along the lines 20—20 in FIG. 18 and shows particularly the construction of the shearing blades attached to the shear box;

FIG. 21 is a sectional view taken along a line substantially corresponding to line 21—21 in FIG. 20;

FIG. 22 is a fragmentary top plan view of the end of the shear box as seen looking in the direction of the arrows 22—22 in FIG. 20;

FIG. 23 is a side elevational view of the grinding equipment looking in the direction of the arrow pointed lines 23—23 in FIG. 1;

FIG. 24 is a top plan view of the grinding equipment illustrated in FIG. 23;

FIG. 25 is a sectional view taken along a line substantially corresponding to the line 25—25 in FIG. 24 and shows particularly the construction of the grinding head acting upon the top running surface of the rail;

FIG. 26 is a sectional view taken along a line substantially corresponding to the line 26—26 in FIG. 24 with a portion of the continuous rail being broken away to facilitate the illustration;

FIG. 27 is an enlarged sectional view taken along a line substantially corresponding to line 27—27 in FIG. 24;

FIG. 28 is an enlarged sectional view taken along a line substantially corresponding to line 28—28 in FIG. 23 and shows the three grinding heads employed at the second grinding station with all of the heads being shown in grinding position;

FIG. 29 is a sectional view taken along a line substantially corresponding to line 29—29 in FIG. 28 and shows the pressure rollers of the grinding head acting upon the top running surface of the continuous rail;

FIG. 30 is an end view of the grinding equipment as viewed from the left end of FIGS. 23 and 24;

FIG. 31 is a sectional view taken along a line substantially corresponding to the line 31—31 in FIG. 24 with a portion of the continuous rail again being broken away;

Figures 33, 34:
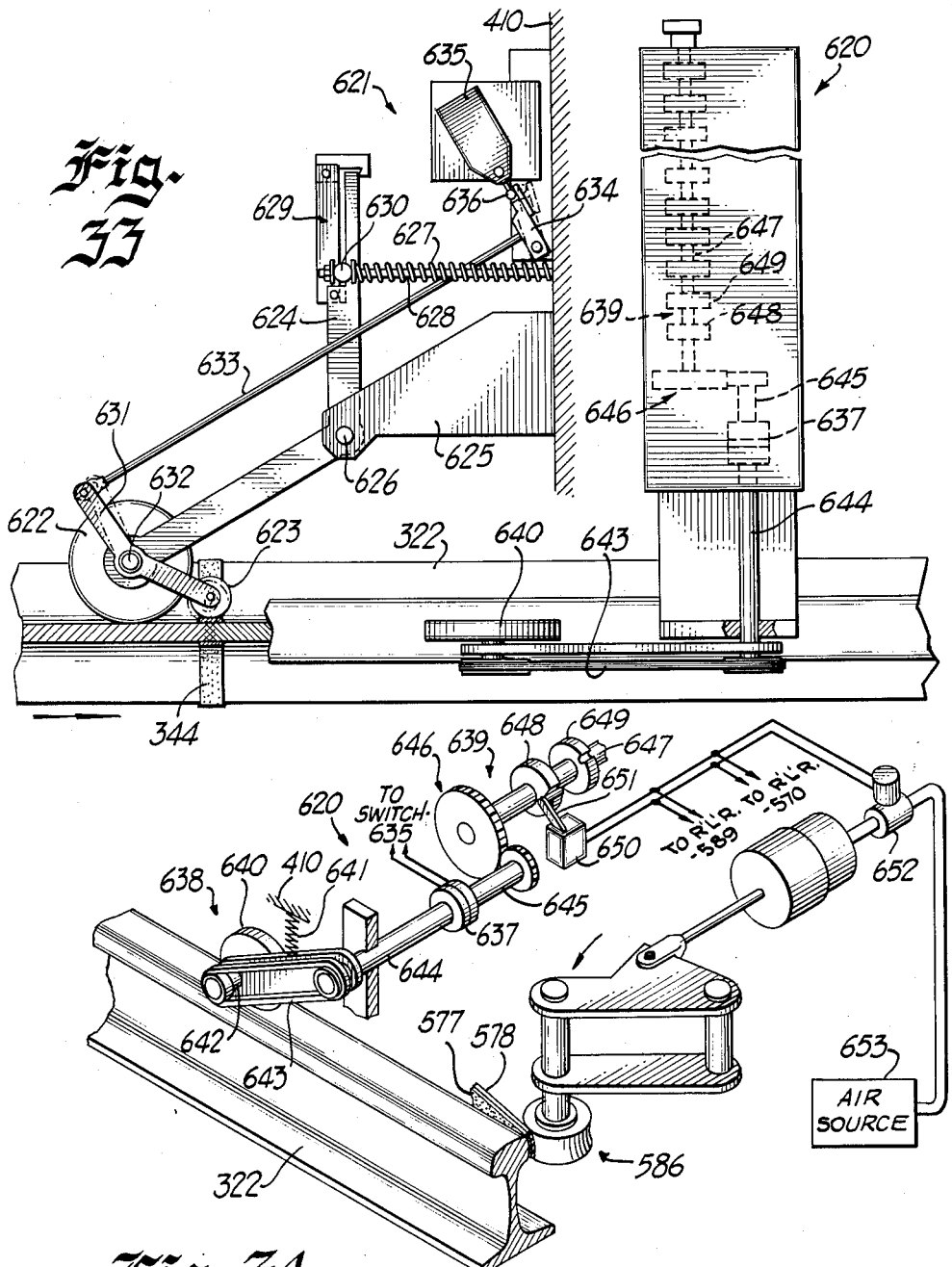
Figure 38:
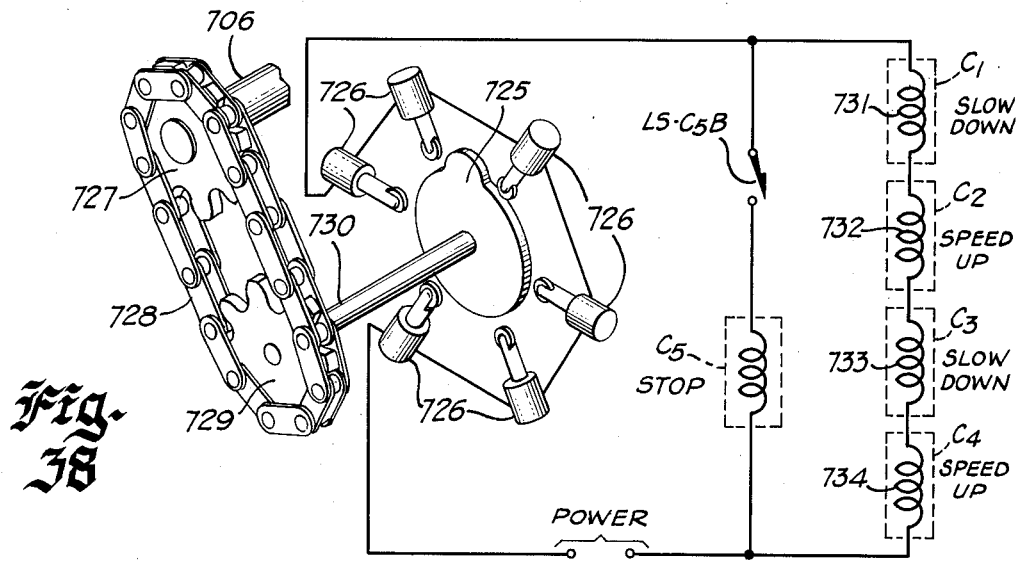
Figure 39:
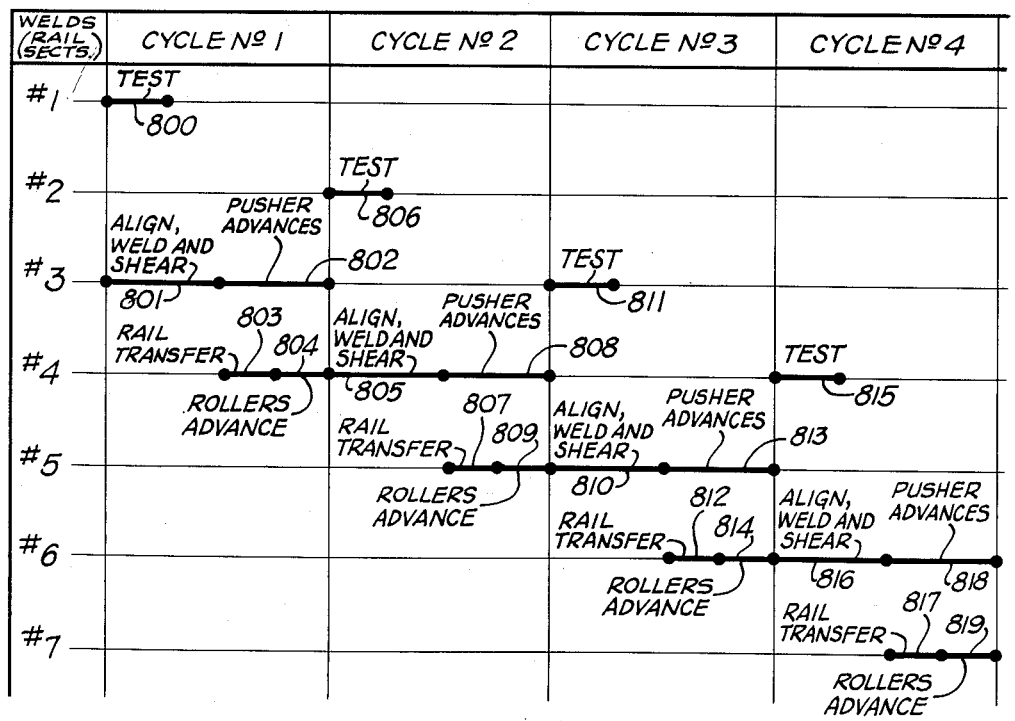
Figure 40:
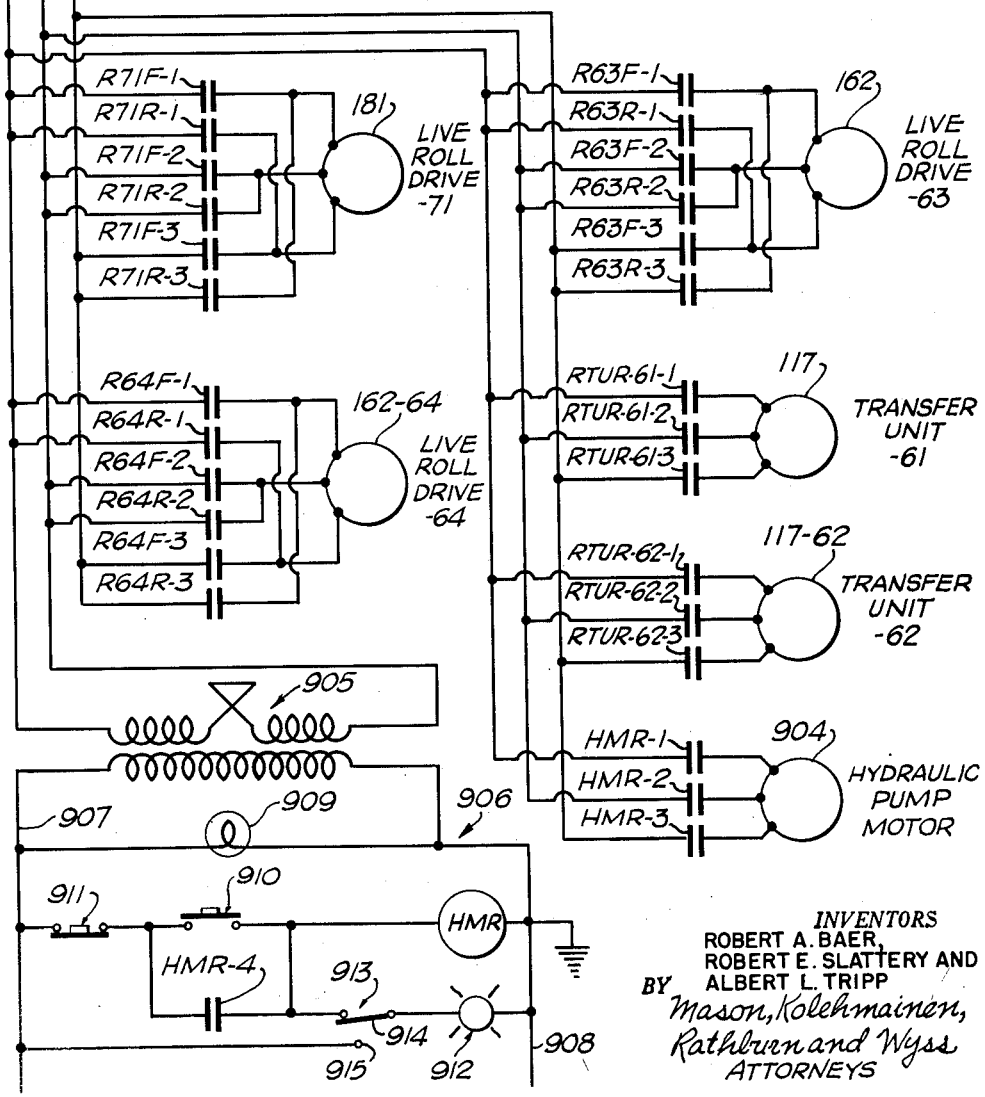
Figure 41:
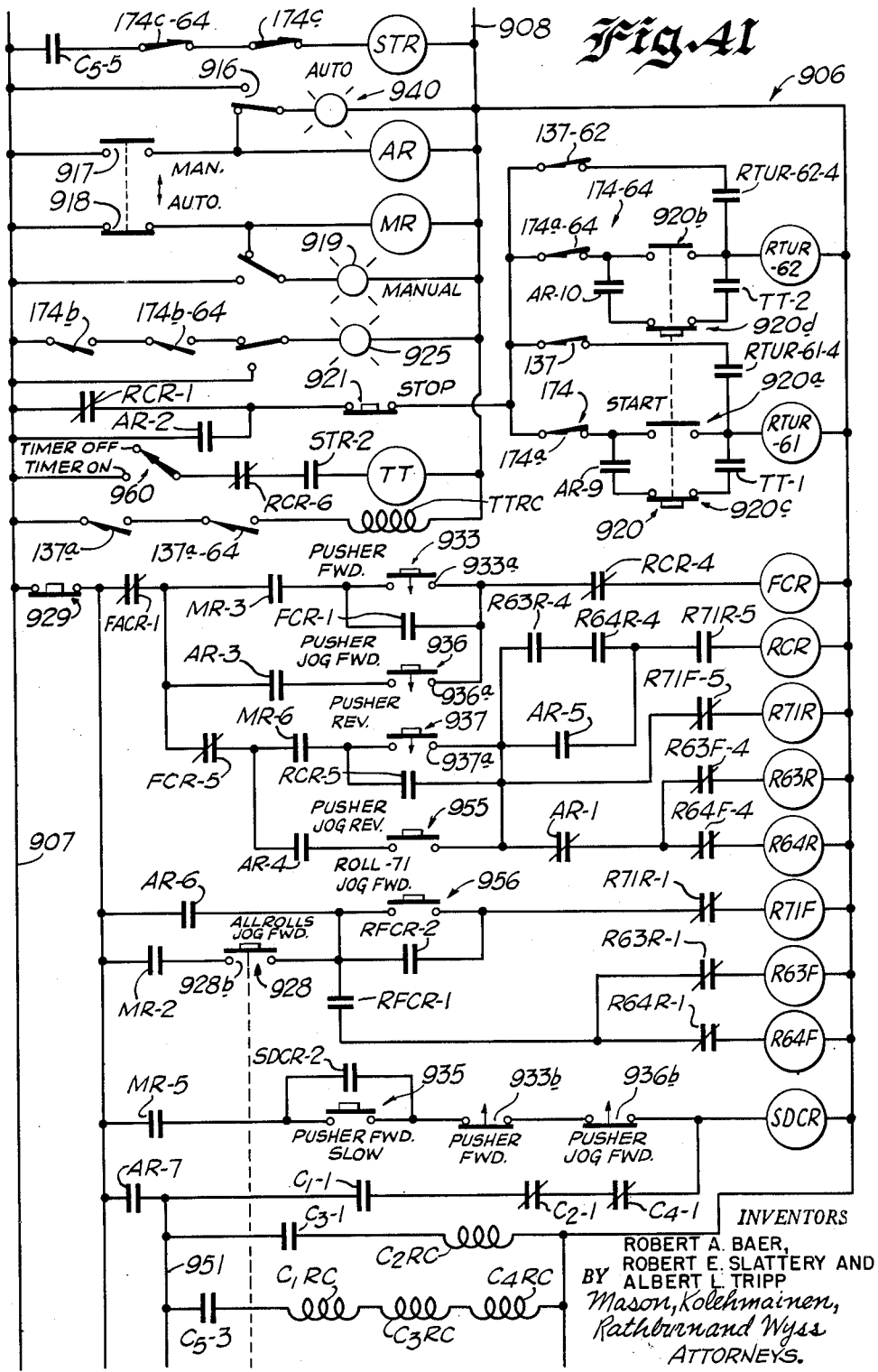
Figure 42:
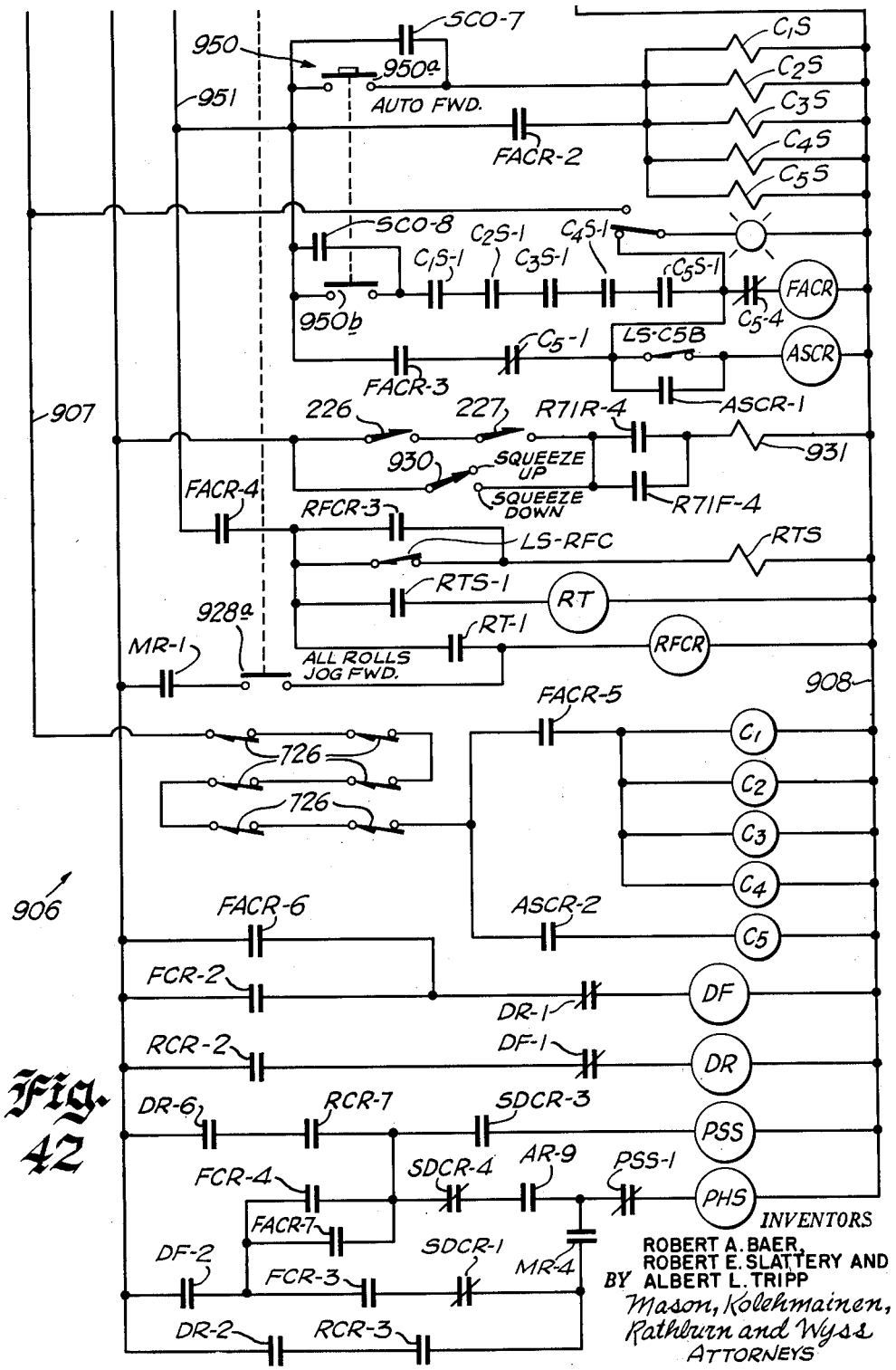
Figure 43:
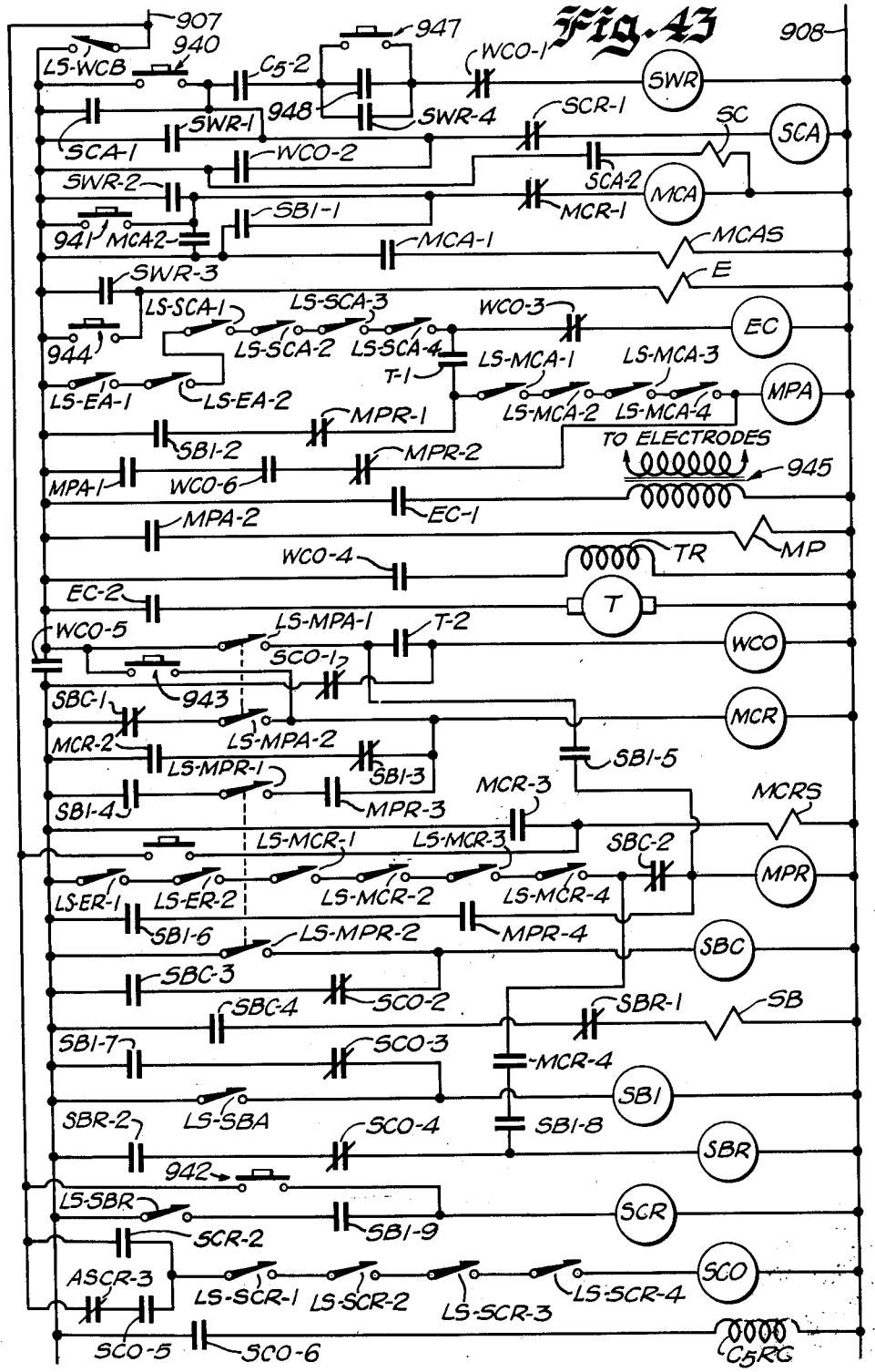
Figure 44:
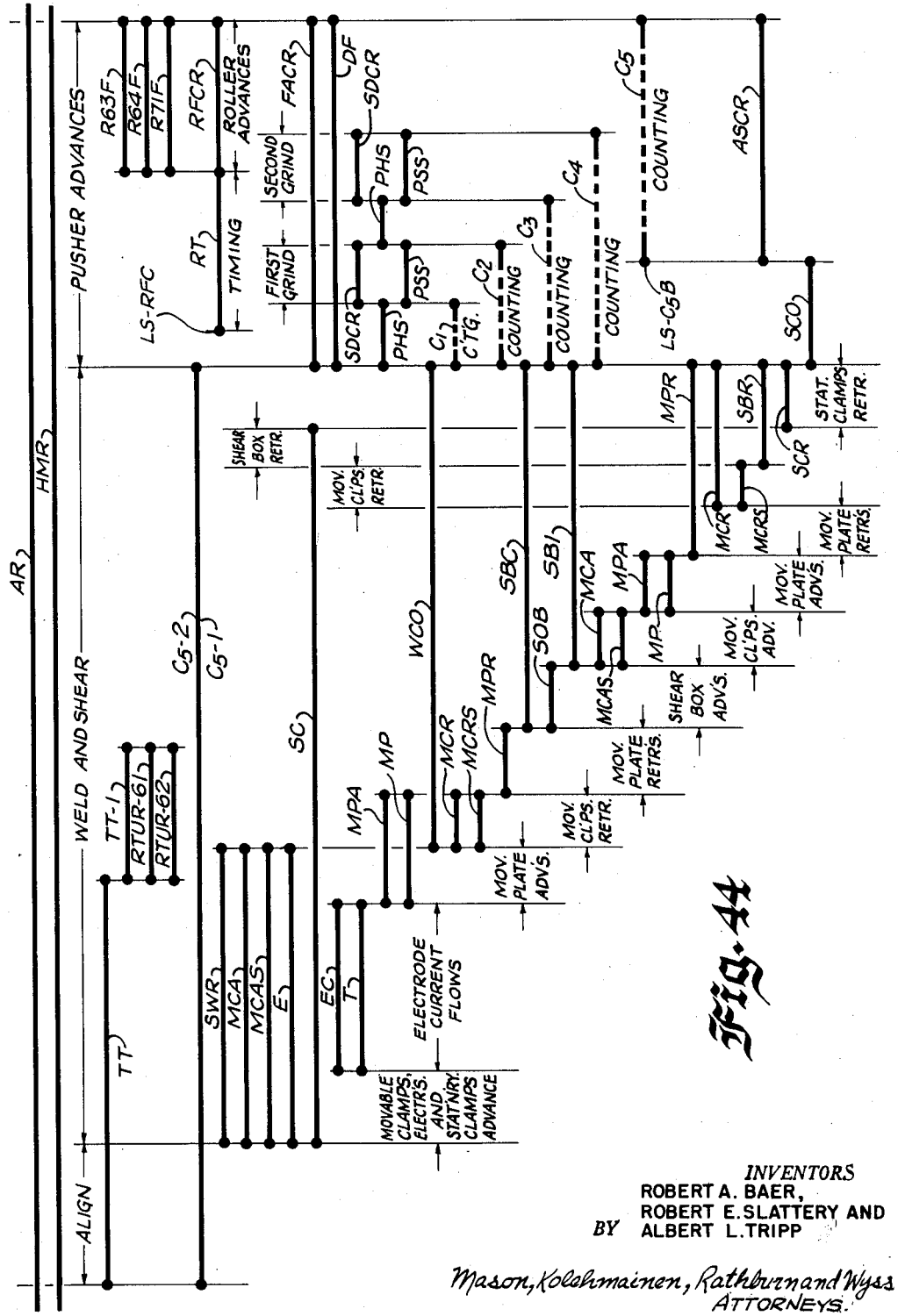

FIG. 32 is an enlarged sectional view taken along a line substantially corresponding to line 32—32 in FIG. 23 and illustrating the three grinding heads employed at the first grinding station with all of the heads being shown in grinding position;

FIG. 33 is a top plan view illustrating the weld sensing mechanism for sensing the presence of the welded joint on the continuous rail with a portion of the rail head being broken away to facilitate the illustration;

FIG. 34 is a perspective, somewhat schematic, view illustrating the timing mechanism for applying the pressure rollers of the grinding equipment in sequence;

FIG. 35 is a fragmentary, side elevational view shown partly in cross section as viewed along a line substantially corresponding to the line 35—35 in FIG. 1 and it illustrates the pusher mechanism;

FIG. 36 is an enlarged fragmentary sectional view taken along a line substantially corresponding to the line 36—36 in FIG. 35 and showing particularly the coaction between the drive tread and the squeeze tread of the pusher mechanism to move the continuous rail;

FIG. 37 is a fragmentary view showing the adjustment for the squeeze tread to enable the pusher mechanism to handle rails of different height;

FIG. 38 is a partly schematic, partly diagrammatic view illustrating the operation of the counters for automatically controlling the speed of drive of the pusher mechanism;

FIG. 39 is a timing diagram showing the sequence of movement of the rail sections through the system illustrated in FIG. 1;

FIGS. 40, 41 and 42 when taken together and laid one below the other with FIG. 40 at the top, FIG. 41 in the center and FIG. 42 at the bottom show schematically the control circuit for operating the system shown in FIG. 1;

FIG. 43 is a schematic diagram showing the circuit for controlling the operation of the welding and shearing cycle; and FIG. 44 is a relay timing chart depicting the sequence of energization of the relays employed in the control circuit illustrated in FIGS. 40, 41, 42 and 43.

*General Description*

Referring now to the drawings and more particularly to FIG. 1, the rail forming apparatus of the present invention is there illustrated as installed upon a pair of railroad cars 50 and 51 braked in position upon a railroad track 52. The equipment illustrated as being mounted on the car 50 may also be installed on concrete foundations or other fixed support means anchored to the ground but when a rail feeding car, such as the car 50, is employed, it takes the form of a conventional flat car having an upper horizontal car bed 53 for supporting the apparatus for feeding rail sections one at a time to the welding car 51. The car 51 preferably comprises a covered car housing welding and shearing apparatus indicated generally by the reference numeral 54, grinding equipment indicated generally by the reference numeral 55 and a pusher mechanism indicated generally by the reference numeral 56. To provide ample working space and easy access to the equipment 54, 55 and 56, one side of the car 51 opens to form a continuous walk way and canopy although this is not illustrated in the drawing. This side wall is designed so that it is broken at or near the center with the lower half swinging outwardly to provide a walk way and the upper half being hinged to the car roof to swing upwardly in order to form the canopy. Suitable supports are provided for holding the walk way forming portions of the side wall above the ground at a level coinciding with the floor of the car 51. Other supports are provided for holding the canopy in raised position. The two cars 50 and 51 contain all of the equipment necessary to produce a continuous welded rail at locations where commercial power is available. To permit welding of rails at locations where it is impossible to use commercial power, a third car (not shown in the drawings) containing suitable power generating equipment is employed. In one such car which has been used heretofore, the power generating car contains a very large diesel engine driving a weld current generator, a somewhat smaller diesel generator set for providing auxiliary power, and other associated auxiliary equipment. Obviously the equipment carried upon the movable cars can be transported from location to location by merely moving the cars to any point where a production line is desired.

The welding car 51 also houses a main control panel or box identified by the reference numeral 57 and a control sequence panel or box indicated at 58 both of which are controlled by the weld operator. Generally, the main control box contains the various push buttons and controls necessary to operate the equipment while the control sequence box contains such items as indicating lights to keep the operator informed of the operation of the various system components and also to apprise the operator of the progress being made during each cycle of operation.

The rail feeding equipment includes a rail storage and transfer apparatus 60 which actually includes two units 61 and 62 of similar construction coacting to form a storage bed containing a row of rail sections oriented in contiguous, side by side relationship together with suitable mechanism for transferring these rail sections one at a time onto a pair of power driven rollers indicated by the reference numerals 63 and 64. The units 61 and 62 are illustrated as being supported at one end upon the rail feeding car 50 and at the other end are provided with supports respectively indicated by the reference numerals 65 and 66 extending downwardly into engagement with the ground. The units 61 and 62 may be located on either side of the power driven rollers 63 and 64 so that the rail sections can be fed either upwardly or downwardly as viewed in FIG. 1. The rail sections, which are indicated by the reference numeral 67, are loaded onto the rail storage and transfer device 60 by means of cranes or other mechanical rail handling equipment and the rail sections are replaced as they are used up during production of the continuous rail so that a supply of rails will at all times be available on the storage bed. If necessary, the butt ends of the rails may be ground or otherwise cleaned to remove rust or scale prior to delivering the rail sections to the power driven rollers 63 and 64. As indicated previously, the storage and transfer device functions to lift the rail sections one at a time from the row of supply rails and to deposit the lifted section onto the power driven rollers 63 and 64. One or more idler rollers of the type indicated by the reference numeral 68 may be employed to provide further support for the rail section.

After the rail section is delivered from the transfer and storage device 60 the power driven rollers 63 and 64 serve to advance the rail section past a spot grinder indicated at 70 which functions to grind the bottom surface of the base and the running surface of the rail head near the leading and trailing ends of the rail section so that these ground areas will provide good contact surfaces for receiving the welding electrodes employed in the welding apparatus 54. The rail section is advanced through the spot grinder and is delivered to the welding apparatus by a power driven roller 71 which includes a top squeeze roller acting upon the running surface of the rail section to hold the latter in position while the rail section is being fed into the welding apparatus. The rail section passes into the welding apparatus over an idler roller 72 which is illustrated as being disposed at the forward end of the rail feeding car 50. The rail section entering the welding apparatus 54 is moved adjacent the end of the continuous rail formed by prior welds and the two abutting ends are joined together by an electric flash type welding operation. During this operation the rail section 67 is reciprocated so that its end is moved toward or away from the butt end of the continuous rail, thus flashing and uniformly heating the rail ends to raise the temperature of the metal near the melting point whereupon the rail section 67 is forced vigorously against the butt end of the continuous rail. The rail ends are thus joined by the flow of metal therebetween and an upset of metal is formed around the joint by the force applied to the rail section 67. When the welding operation is completed, a shear block is rendered automatically effective to remove a major portion of this upset metal. The weld operator then uses a pair of tongs to remove the ring of hot metal sheared off and the welded joint then passes at relatively high speed to the grinding equipment 55 where the remainder of the weld metal is removed while the weld is still hot and soft.

The continuous rail is passed through the grinding equipment 55 by the pusher mechanism 56 which forces the rail outwardly from the forward end of the welding car 51 and moves it along a flat car disposed at the right end of the car 51 as viewed in FIG. 1. This flat car contains a weld testing station housing suitable equipment for checking or testing the weld as, for example, by using a conventional magnaflux test procedure. In making the test, it may be desirable to remove the weld metal along the web portion of the rail and this may be done by using a hand grinder. In this connection, it should be observed that the grinding equipment 55 is effective to smooth the weld along the top running surface and the two side edges of the rail top and is also effective to grind the rail along the bottom of the base and along the two side edges of the base but it does not perform a grinding operation upon the weld metal located in the web of the rail in view of the fact that the existence of a small bead in the web does not affect the usefulness of the continuous rail produced. In the event that a defective weld is found at the testing station the test station operator operates a push button switch to illuminate an indicating light on the control sequence box 58 so that the weld operator can operate suitable controls for backing up the continuous rail. This backup operation is performed by reversing the direction of drive of the pusher mechanism 56 and by reversing the drive of the power driven rollers 63, 64 and 71. During the backup operation, the end of the continuous rail is forced along the idler roller 72, along the power driven rollers 63, 64 and 71 and along the idler rollers 68 until it passes to suitable backup support structure located at the left end of the rail feeding car 50 as viewed in FIG. 1 and indicated generally by the reference numeral 73. This backup support structure preferably includes a series of idler rolls 74 which permit the continuous rail to be backed up until the defective weld has been moved past the grinding equipment 55. The rail is then cut by using an oxyacetylene torch or the like to remove the defective weld section and the cut portions of the rail are then backed up still further and are thereafter joined together by operating the welding apparatus 54 in the manner indicated above.

*The Rail Storage and Transfer Device*

As indicated above, the rail storage and transfer device 60 comprises two identical units 61 and 62 mounted in spaced apart relationship extending parallel to each other and cooperating to form a storage bed for supporting a supply of the rail sections 67 in side by side relationship as shown in FIGS. 1 and 2. The two units 61 and 62 are so spaced that they provide adequate support for the entire row of rail sections but are nevertheless capable of holding even the shortest rail sections supplied to the system. Since these units are identical only one, namely, the unit 61, will be described in detail. This unit is shown in FIGS. 2 to 7, inclusive, of the drawings and includes a rigid frame 75 which, in the form of the invention shown, is bolted or otherwise secured in fixed position upon the floor 53 of the rail supply car near one end of the frame. The other end of the unit 61 is supported above ground level by the supporting structure 65 referred to above. The frame 75 may be raised or lowered with respect to the floor surface 53 by means of adjusting bolts 76 threaded through suitable nuts 77 welded to the frame. The bolts 76 are adjusted so that an upper rail supporting surface or storage bed 78 of the unit 61 is substantially level, is also level with a similar bed on the unit 62, and is disposed at the proper height for holding the rail sections for deposit upon the power driven rollers 63 and 64.

The rail sections are advanced along the unit 61 from left to right as viewed in FIG. 2 by means of an endless chain 79 having its opposed ends trained over sprocket assemblies 80 and 81 respectively carried at opposed ends of the frame 75. More specifically, the sprocket assembly 80 is supported upon the left end of an elongated horizontal channel 82 forming a part of the frame 75. As is best shown in FIG. 3 of the drawings, the channel 82 is formed by a pair of side plates or beams 83 and 84 secured to an upper channel plate 85. A hardened wear plate 86 is secured to the upper face and within the channel of the plate 85 and is provided with end portions 87 and 88 extending slightly beyond the ends of the plate 85. These end portions are bent downwardly to permit the chain 79 to enter and leave the upper channel 82. The chain 79, as is best shown in FIGS. 2, 3, 4 and 5, comprises a series of pivotally interconnected links 89 and 90 extending along one side of the chain and a similar set of links 91 and 92 forming the other side of the chain. Bushed rollers 93 interconnect the chain links and provide pivots for each link pair. The chain links are adapted to be moved along the upper surface of the wear plate 86 in a manner described more fully below and these links engage the undersides or bottoms of the bases of all of the rail sections 67 in the row disposed on the storage bed 78.

The sprocket assembly 80, as is shown in FIG. 2, includes a toothed sprocket 94 mounted upon a small shaft 95 having its opposed ends journaled within bearing blocks 96. Each of the bearing blocks is adjustably mounted within a guide channel formed between one of the side plates of the channel 82 and a fixed guide bracket 97 suitably secured to this side plate. For the purpose of adjusting the tension on the endless chain 79, the bearing blocks 96 may be moved within their associated guide channels by turning an adjusting screw 98 which is threaded through a block 99 secured to the upper channel 82 and has its inner end connected to move the bearing blocks as the screw is turned.

The sprocket assembly 81 is mounted upon a platform 100 formed at the right side of the frame 75 as viewed in FIG. 2. As is best shown in FIG. 5, this assembly includes a central sprocket 101 having peripheral teeth in engagement with the chain 79. The sprocket is mounted upon a shaft 102 rotatably supported upon pillow bearings 103 and 104. One end of the shaft 102 is connected to one of the drive elements of a conventional one way clutch 105 which is adapted to be driven by a drive mechanism indicated generally by the reference numeral 107 in order to advance the rail sections along the horizontal storage bed 78 in a manner which will become evident as the description proceeds.

For the purpose of stopping the advancement of the rail sections in order to hold the rail section at the right end of the row as viewed in FIG. 2 in position to be deposited upon the power driven rollers 63 and 64, there are provided a pair of adjustable stop plates 108 and 109 of identical construction. Each stop plate includes a main body portion having a series of horizontally aligned openings therein for receiving attaching bolts 111 which serve to hold the stop plate in position. To this end, the stop plate 108 is secured to the side plate 83 by threading the bolts 111 into appropriate tapped openings formed in the latter plate and in similar manner, the guide plate 109 is secured to the side plate 84 by threading the attaching screws into tapped openings formed in the side plate 84. Each of the plates 108 and 109 includes an upwardly extending indexing tab 112 disposed in the path of movement of the rail sections 67 as the latter are advanced from left to right as viewed in FIG. 1. Thus, when the rail sections are moved to the right, the rail section at the right end of the line engages the indexing tabs 112 on the two stop plates and is held in proper position for transfer to the power driven rollers. The latter transfer is accomplished by means of a transfer plate 115 driven by the drive mechanism 107 which includes an electric motor 117 having its output shaft 118 connected through suitable reduction gearing indicated generally by the reference numeral 119 to drive a shaft 120. The latter shaft carries a sprocket 121 in engagement with an endless chain 122 which is trained over suitable sprockets 123 and 124 mounted for rotation upon the frame 75. For the purpose of synchronizing a pair of eccentric plates 123a and 124a described more fully below, there is provided an idler sprocket assembly 133 adjustably mounted on the frame 75. This assembly includes a sprocket 134 having teeth engaging the chain 122 and adjustable to alter the synchronization between plates 123a and 124a by a suitable adjusting mechanism which is not visible in the drawings.

As is best shown in FIG. 4, the sprocket 124 is secured to a shaft 125 which also supports an idler sprocket 126 engaging the underside of the chain 79 in order to prevent excessive sag of the lower chain run. The sprocket 126 carries at its center a bearing hub which permits free rotation of the sprocket upon the shaft 125 so that this sprocket does not drive the chain 79. The sprocket 124 is, of course, secured to rotate both the shaft 125 and the eccentric plate 124a which is mounted upon the latter shaft. In similar manner, the sprocket 123 turns its mounting shaft 127 to rotate the eccentric plate 123a.

The transfer plate 115 is connected to the drive mechanism 107 by means of eccentric connecting assemblies 128 and 129 respectively attached to the eccentric plates 123a and 124a. The eccentric connecting assemblies are constructed to permit relative rotation between the eccentric plates and the transfer plate 115 and, hence, they serve to move the transfer plate within a restricted path when the motor 117 is actuated. More specifically, the drive mechanism 107 is so constructed that the sprockets 121, 123 and 124 rotate in a clockwise direction as viewed in FIG. 2 and, when this rotation occurs, the transfer plate is raised from the position shown in FIG. 2 and is also moved to the right until the eccentrics 128 and 129 would reach a point where they are disposed vertically above the shafts 125 and 127. As the drive sprockets continue to rotate the transfer plate moves further to the right and is lowered until the eccentrics reach a position where they are horizontally aligned with the shafts 125 and 127. Further rotation of the drive sprockets 123 and 124 lowers the transfer plate 115 and moves it to the left until the eccentrics reach a position where they are located vertically below the drive shafts 125 and 127. Continued rotation of the drive sprockets 123 and 124 raises the transfer plate 115 and moves it further to the left until it reaches the position shown in FIG. 1. At this point, the transfer plate has completed one cycle. When the transfer plate moves along the described path, a horizontal shelf 130 carried near its upper end engages the bottom of the base of the rail section 67 disposed at the right end of the line and lifts this rail section upwardly. To hold the rail section on the shelf, the transfer plate is provided with a raised stop 131 extending upwardly near the shelf 130. When the rail section is lifted, it is guided over the indexing tabs 112 on the stop plates 108 and 109 and, when the transfer plate shelf 130 descends, the rail section is lowered onto the power driven rollers 63 and 64. These rollers hold the rail section while the transfer plate 115 is lowered to move the shelf 130 out of engagement with the rail section base.

In order to advance the line of rail sections from left to right along the storage bed 78, the movement of the transfer plate 115 is used to drive the sprocket 102 of the sprocket assembly 81. More specifically, when the transfer plate moves through its cycle to lift the end rail section in the row onto the power driven rollers in the manner described above, a conecting rod 136 pivotally connected at one end to the transfer plate 115 and pivotally connected at its other end to an indexing plate 135 transmits the movement of the transfer plate to pivot the indexing plate 135 first in one direction and then in the reverse direction as the transfer plate moves through one complete cycle. The indexing plate 135 is, in turn, connected to drive the one way clutch 105 and the arrangement is such that rotation of the indexing plate in a clockwise direction as viewed in FIG. 2 turns the shaft 102 and the sprocket 101 in a clockwise direction in order to advance the chain 79 along the wear plate 86 from left to right, thus carrying all of the rail sections positioned on the storage bed 78 for a distance equal to the width of the base of one rail section so that the rail section at the right end of the line engages the indexing tabs 112 on the stop plates 108 and 109 to replace the rail section lifted by the transfer plate 115. When the end rail section engages the stop plates it is in position to be transferred to the power driven rollers 63 and 64 during the next cycle of operation of the transfer plate. When the indexing plate 135 is driven in a counterclockwise direction by movement of the connecting rod 136, the one way clutch 105 overruns and, hence, the drive sprocket 101 is not turned. A limit switch 137 is mounted adjacent the path of movement of the transfer plate 115 in order to provide a control signal for automatically terminating the operation of the transfer device after the transfer plate has moved through one complete cycle. This limit switch 137 is mounted in fixed position upon a bracket 140 on the frame 75 and it includes an actuating arm 138 carrying at its free end a roller disposed in the path of movement of the transfer plate 115. A similar limit switch on the unit 62 will hereinafter be identified by reference numeral 137–62.

Rail sections of different cross sectional dimensions are used on different railroad lines in this country and, as a consequence, at a given location the apparatus of the present invention will generally be called upon to handle only a single type rail section having a predetermined cross section, when the apparatus is transported to other locations perhaps on a different rail line, a different type of rail section having different cross section dimensions may be encountered. It is, of course, desirable that the apparatus be adjusted to handle these different sized rails. The rail sections may also vary somewhat in length but these variations have no effect on the operation of the rail storage and transfer apparatus 60 since as indicated previously, the two units 61 and 62 are placed sufficiently close together to receive any of the usual lengths of rails. Any variations in the width of the rail base, however, must be taken into consideration due to the fact that the transfer plate 115 must deposit the rail section with its center line located at the center of the power driven rollers 63 and 64 and the idler roller 68. The center line of the latter rollers is, of course, fixed as is the stroke of the transfer plate and, hence, when rail sections having different base widths are employed, it is necessary that the end rail section in the line on the storage bed 78 be stopped at the proper position to permit the transfer plate to deposit the end rail section at exactly the right position on the power driven and idler rolls on the rail feeding car. To this end, the stop plates 108 and 109 may be moved to the left or right as viewed in FIGS. 2 and 7 by removing the attaching bolts 111 and thereafter moving the stop plates so that different ones of the apertures in these plates are aligned with tapped openings in the side plates of the upper channel 82. By proper selection of the aligned holes, the stop plates 108 and 109 can be moved to the left or to the right as viewed in FIG. 2 to change the position of the indexing tabs 112. The stop plates 108 and 109 are moved to the left when rail sections having smaller base widths are employed and, when the proper adjustment has been made, the attaching bolts are again inserted through the aligned openings to lock the plates in position. In FIGS. 2 and 7, the stop plates 108 and 109 are positioned for the widest base rail sections which, for convenience, will be referred to as type A sections. This position is established when the two bolts 111 are inserted within the two holes indicated in FIG. 7. When the plates 108 and 109 are moved one step to the right so that the bolts 111 are disposed within the holes marked B, the stop plates are positioned for the next widest base rails which will be referred to as B type sections. Similarly, when the stop plates are moved an additional step to the right, the bolts 111 are disposed within holes C and the apparatus is set up to handle C type rail sections. Finally, when the bolts 111 extend through holes D, the apparatus is conditioned to handle the narrowest base rails which may be referred to as D type sections.

Since the drive sprocket 101 is adapted to move the chain 79 through a distance corresponding approximately to the width of the base of one rail section during each cycle of operation of the transfer, it also becomes necessary to adjust the stroke of the indexing plate in order to compensate for the different base widths when different rail sections are supplied. To this end, as is best shown in FIG. 6, the indexing plate 135 is provided with a plurality of spaced apart apertures for receiving bolts 145 which serve to attach the indexing plate to the one way clutch 105. The apertures in the indexing plate are arranged along four different circles with each circle corresponding to one of the four rail sizes discussed above. More specifically, apertures 141a, 141b, 141c, 141d and 141e are arranged along an imaginary bolt circle 141 and when the attaching bolts 145 are inserted through these five apertures the equipment is set up to handle the widest rail base or type A sections since the effective length between the center of the shaft 102 and the center of the pivot pin 139 is at this time at a minimum and, as a result, the reciprocation of the connecting rod 136 induces a maximum angular rotation of the shaft 102. Therefore, the drive sprocket 101 is driven through its maximum angle during each cycle of operation of the transfer plate so that the chain 79 is moved along the wear plate 86 for a distance sufficient to move the wide base rails into engagement with the indexing tabs 112 on the stop plates 108 and 109. Similarly, apertures 142a, 142b, 142c, 142d and 142e are arranged along an imaginary bolt circle 142 and this set of apertures is used when the type B rail sections are employed. Apertures 143a, 143b, 143c, 143d and 143e are arranged along an imaginary bolt circle 143 and when the bolts are inserted through these apertures, the apparatus is set up to handle the type C rail sections. Finally, apertures 144a, 144b, 144c, 144d and 144e are arranged along an imaginary bolt circle 144 and the attaching bolts 145 are inserted through this set of apertures when it is desired to adjust the apparatus to handle the type D rail sections having the narrowest rail bases. At any given location of the rail forming equipment, it is likely that a single adjustment will be sufficient to handle all of the rail sections encountered and, in any event, the adjustment need be made very infrequently since the equipment is generally used for long periods of time with rail sections of substantially the same cross sectional dimensions being supplied.

In view of the foregoing description, it will be observed that a single drive mechanism is effective to operate the transfer plate 115 to deposit a rail section on the power driven rollers and is also effective to advance the entire row of rail sections by movement of the endless chain 79. Thus, the equipment required to perform both functions is relatively simple in construction, is economical to manufacture and is rugged and durable in operation.

The Idler Rollers

The idler rollers 68 and 72 are of similar construction and one such roller is illustrated in FIG. 9. This idler roller includes a rigid frame 150 having a roller supporting base 151 at its upper end. The roller supporting base includes suitable bearing carrying brackets 152 and 153 for journaling the ends of a horizontally disposed roller 154 upon which rests the base of the rail section as the latter is being fed from the rail supply car 50 to the welding car 51. The height of the frame 150 may be adjusted by means of adjusting bolts 155 which are threaded through nuts 156 welded or otherwise secured to the bottom of the frame. The bolts 155 are adjusted so that the roller 154 is level and is disposed at the proper height to cooperate with power driven rollers 63, 64 and 71 in transferring the rail sections along the rail supply car 50 and into the welding apparatus 54. The roller support base 151 also serves to support a pair of vertically extending guide rollers 157 and 158 which engage the two side edges of the rail base in order to prevent lateral movement of the rail sections during the feeding.

The Power Driven Rollers 63 and 64

The power driven rollers 63 and 64 are identical in construction and, hence, only one of these has been shown in detail in the drawings. Thus referring to FIG. 8, it will be observed that the power driven roller 63 includes a roller support base 160 mounted upon the upper end of a rigid support frame indicated generally by the reference character 161. Actually, only small portions of the structural members making up the frame 161 are shown in FIG. 8 since this frame can be of any suitable construction and provision is made for adjusting the height of the power driven roller unit by use of adjusting bolts of the type described above as used on the frame of the idler rollers. The adjustment is such that the power driven roller is level and is disposed at the same height as the idler rollers so that the rail sections can be fed along the rail supply car 50.

The base 160 supports an electric motor 162 connected to drive a reduction gearing 163 which, in turn, has its output shaft 164 connected through a coupling 165 to drive a roller support shaft 166. Since the motor 162 is reversible, the shaft 166 may be selectively turned in either direction. The shaft 166 has its opposed ends journaled within bearing assemblies 167 and 168 supported upon the base 160. The shaft 166 carries a cylindrical roller 169 which is adapted to engage the underside of the base of the rail section in order to advance the rail section and, at the same time, to clean the bottom of the base. To this end, the roller 169 is formed by a center drum 170 disposed between end plates 171 and 172 and having a small rod of square cross section wound in a spiral about its periphery and welded to its surface. The bottom of the rail section actually rides upon the rod 173 and, as a consequence, when the roller 169 is turned by operation of the motor 162, the edges of the rod 173 serve as cutting surfaces which act against the rail base to remove dirt and debris while the rail section is being fed along the rail supply car 50. The dirt removed is dislodged into the helical space between the evolutions of the spirally wound rod 173 and is forced outwardly from the side of the roller.

To provide a control signal indicating that the rail section has been deposited upon the power driven rollers, each of these rollers includes a limit switch. The limit switch on the power driven roller 63 is identified by the reference numeral 174 and is supported upon a limit switch support bracket 175 secured to the base 160. The limit switch includes an actuating arm 175 which is depressed to operate the switch when the transfer apparatus 60 deposits a rail section upon the power driven roller. A similar limit switch on the power driven roller 64 will hereinafter be identified by reference numeral 174-64. The base 160 also supports a pair of guide rollers 177 and 178 which are mounted so that they can be adjusted toward or away from each other in order to accommodate rail section bases of different widths. Preferably, the guide rollers 177 and 178 are also mounted so that they can be adjusted vertically to insure proper engagement with the rail. The guide rollers 177 and 178 obviously engage the two side edges of the rail base to inhibit lateral movement of the rail section as the latter is being fed along the rail supply car 50.

*The Power Driven Squeeze Roller 71*

As is shown in FIGS. 10 and 11 of the drawings, the squeeze roller 71 includes a base or platform 180 mounted upon the upper end of rigid support structure supported from the floor 53 of the rail supply car 50. Here again, the support structure is provided with suitable adjusting bolts of the type described above for the purpose of raising or lowering the platform 180 to adjust the level of the squeeze roller until it is level and is disposed at the same height as the power driven rollers 63 and 64 and the idler rollers 68 and 72. The platform carries an electric motor 181 driving a gear train unit 182 which has its output shaft 183 connected through a flexible coupling 184 to drive a roller supporting shaft 185. The motor 181 is reversible so that the shaft 185 may be driven in either direction. The motor is driven in a forward direction to advance the rail section to the welding apparatus under normal operating conditions and is reversed when it is desired to back up the continuous rail in order, for example, to remove a defective weld. The roller supporting shaft is journaled within bearings 186 and 187 supported above the floor of the base 180 upon support beams 188 and 189, respectively. A roller 190 is mounted for rotation with the shaft 185 between the two bearings and this roller includes a metal drum 191 secured to end plates 192 and 193 which include central hubs secured to the shaft 185 in any suitable manner as, for example, by means of set screws. Cleaning rods, similar to those employed on the rollers 63 and 64, may be attached to the drum surface but these are not shown in the drawings.

The base of the rail section rests upon the surface of the drum 191 and is held against this surface by means of an upper roller structure supported upon a pivotally mounted frame 195 formed by a pair of channel beams 196 extending parallel to each other and interconnected by cross arms 197, 198, 199 and 200. The frame is provided with a pair of fixed ears 201 mounted for pivotal movement upon a pivot pin 202 connected between a pair of support legs 203 rigidly secured to the platform 180. The cross arms 198 and 199 support a roller carrying structure 205 formed by a pair of side plates 206 interconnected by cross plates 207 and 208. The cross plates 207 and 208 carry bearing assemblies 209 and 210, respectively, for supporting the ends of a roller shaft 211 carrying the upper roller 212. The latter roller is adapted to engage the top running surface of the rail section while the latter is being fed from the squeeze roller 71 to the welding apparatus in the welding car. The roller carrying structure 205 is adjustable with respect to the pivoted frame 195 to accommodate rail sections of different height and, to this end, the side plates 206 are provided with elongated openings 214 for receiving locking bolts 215 which, when tightened into tapped openings in the channel beams 196, lock the frame 205 in position. When the bolts 215 are loosened, the position of the roller carrying structure 205 may be adjusted by turning lead screws 216 and 217 which are threaded through the cross bars 198 and 199 respectively. After the roller carrying structure 205 has been properly positioned the bolts 215 are tightened and lock nuts 218 and 219 are employed to prevent inadvertent turning of the lead screws.

For the purpose of pivoting the frame 195 about the pivot pin 202, the cross bar 200 is pivotally secured upon the upper end of a piston rod 220 forming part of a piston and cylinder assembly 221 pivotally mounted upon the platform 180. Thus, when fluid is admitted to the lower end of the assembly 221, the piston rod 220 is extended or raised to pivot the frame 195 in a counterclockwise direction as viewed in FIG. 10, thus moving the roller 212 to a position where it will not engage the running surface of the rail section. The roller 212 is automatically moved to the latter position whenever a rail section is not present in the squeeze roller 71. When the piston and cylinder assembly 221 is actuated to retract or lower the piston rod 220, the frame 195 pivots about the pin 202 in a clockwise direction as viewed in FIG. 10, thus moving the roller 212 into engagement with the running surface of the rail section. In this position of the frame 195, the roller 212 functions to hold the rail firmly in position on the lower roller 190.

The degree of pivotal movement of the frame 195 is very restricted since the counterclockwise rotation is limited by a pair of fixed blocks 222 secured upon an I beam 223 affixed to the platform 180. The clockwise movement of the frame 195 is similarly limited by a pair of blocks 224 fixedly secured to the I beam 223.

In order to prevent lateral movement of the rail section as it passes through the squeeze roller, the platform 180 also supports a pair of guide rollers 225 disposed to engage the two side edges of the rail base. Preferably, these rollers are mounted so that their vertical positions can be adjusted and, in addition, the mounting arrangement is such that the two guide rollers can be adjusted laterally of the path of movement of the rail in order to permit the squeeze roller to handle rail sections having bases of different widths.

As was indicated above, the pivotal movement of the frame 195 is preferably controlled by the selective admission of a suitable fluid, such as air, under pressure from a source to the piston and cylinder assembly 221. The flow of air to the latter assembly is controlled by a solenoid actuated control valve, not shown in the drawings, but referred to hereinafter in the description of the electrical control circuit for the entire system. The solenoid of the valve is connected in an electrical circuit so that its actuation is controlled by a pair of limit switches 226 and 227 respectively mounted upon limit switch support brackets 228 and 229 secured to the platform 180. The limit switches 226 and 227 are provided with actuating arms 230 and 231 carrying rollers which are engaged by the base of the rail section when the latter is advanced. As will be evident from the ensuing description of the control circuit, the limit switches and the solenoid are so connected that air under pressure is delivered to the lower end of the piston and cylinder assembly 221 whenever either or both of the limit switches 230 and 231 are in their non-actuated positions illustrated in FIG. 11. When both of the limit switches are actuated, that is, when the base of the rail is effective to pivot both of the actuating arms 230 and 231 in a counterclockwise direction as viewed in FIG. 11, the piston and cylinder assembly 221 is rendered effective to move the upper roller 212 into engagement with the running surface of the rail section in order to seat the rail section against the lower roller 190. By this arrangement, the roller 212 is maintained out of the path of the advancing rail section until the leading edge of the rail section has reached a position to actuate the limit switch 227. In this manner, the leading butt edge of the rail section is prevented from being confronted by the roller 212 when the rail section is advanced.

The Spot Grinder

The spot grinder 70 is illustrated in FIGS. 12 to 17, inclusive, of the drawings and, as there shown it includes a pair of grinding heads 240 and 241 which are respectively adapted to grind the top running surface and the bottom of the base of the rail section along small areas located near the two ends of the rail section. As indicated previously, this grinding action serves to clean those regions of the rail section engaged by the electrodes of the welding apparatus in order to enhance the electrical contact. These grinding heads are similar in construction and each includes a flexible abrasive belt 242 wound over three spaced apart rollers 243, 244 and 245. At least one of the three rollers of each set is driven for the purpose of moving the flexible belt in order to perform the grinding operation. The abrasive belt includes a belt run extending adjacent the rail surface to be ground and a portion of this run is adapted to be urged into engagement with the rail section by means of a fluid operated roller assembly 246 which is movable between a deactuated position indicated by the broken lines in FIG. 12 to an actuated position illustrated in solid lines. The roller assembly 246 includes a roller 247 movable into engagement with the back or non-grinding surface of the belt 242 and mounted upon one end of roller support structure 248. The roller support structure is mounted for pivotal movement about a pivot pin 249 under the control of a fluid operated piston and cylinder assembly. The piston and cylinder assembly for the grinding head 240 is identified by the reference numeral 250 while a corresponding piston and cylinder assembly for controlling the pivotal movement of the pressure operated roller of the grinding head 241 is identified by the reference numeral 251. These piston and cylinder assemblies may be either of the single acting type or of the double acting type, but in the form illustrated in FIG. 12, they are single acting with their pistons being biased by means of a suitable spring or the like (not shown) to urge the roller assemblies toward their deenergized positions.

The piston and cylinder assemblies 250 and 251 are adapted to be moved to their actuated positions by admission of air or other fluid under pressure delivered from a source 252, this fluid pressure being effective to overcome the action of the biasing springs in order to move the roller assemblies to their actuated positions where they urge the abrasive belt against the rail section. The flow of air under pressure from the source 252 to the piston and cylinder assemblies is controlled by a pair of timed control valves 253 and 254, each of which is of the type which remains open for a predetermined period following its actuation and then closes automatically at the expiration of this period. When the valve 254 is open, air under pressure flows from the source 252 through an air line 255 to the upper end of the piston and cylinder assembly 260 so that the piston rod of this assembly moves downwardly to pivot the support structure 248 in a clockwise direction as viewed in FIG. 12, thereby moving the grinding belt 242 into engagement with the running surface of the rail section. At the same time, the fluid pressure in the line 255 is delivered via line 256 to the lower end of the piston and cylinder assembly 251 in order to move the roller assembly of the grinding head 241 to its actuated position.

As will be described in detail hereinafter, the valve 253 is opened when the leading end of the rail section advances to the spot grinder and this valve remains open for a predetermined period of time while the grinding heads 240 and 241 clean small areas near the leading end of the rail section. At the expiration of this predetermined time, the valve 253 closes automatically to shut off fluid pressure to the piston and cylinder assemblies 250 and 251 whereupon the roller assemblies move to their deactuated positions and the grinding heads no longer grind the rail section. The roller assemblies remain in their deenergized positions while the rail section advances until the trailing edge of the rail section becomes effective in a manner described more fully below to open the valve 253. When the valve 254 is opened, air under pressure from the source 252 again flows through the conduits 255 and 256 to the piston and cylinder assemblies 250 and 251 to move the roller assemblies to their actuated positions in order to force the abrasive belts of both grinding heads against the rail section. The valve 253 is opened in response to movement of the trailing end of the rail section to a point just prior to its emergence from the spot grinder and this valve remains open while the grinding heads 240 and 241 clean small areas of the rail section near its trailing end.

The mechanism for operating the valves 253 and 254 in response to movement of the rail is shown in FIGS. 13 to 17 of the drawings where it is generally identified by reference numeral 260 and includes a pair of rollers 261 and 262 which are adapted to ride upon the web of the rail section in order to sense the movements of the leading and trailing ends of the rail section when the latter is advanced to the spot grinder. To this end, as is best shown in FIG. 13 of the drawings, the rollers 261 and 262 are respectively supported upon arms 263 and 264 mounted for pivotal movement at one end about a pivot pin 265 carried on a fixed bracket 266. The bracket 266 is mounted upon a support base 267 located in fixed position adjacent the path of movement of the rail section as, for example, upon a housing for the spot grinding equipment. The base 267 also carries a pair of forked blocks 268 and 269 mounting pivot pins 268a and 269a, respectively, for supporting valve actuating arms 271 and 272. The arm 271 carries a valve actuating fingers 273 at its free end and at its other end is pivotally connected through a linkage 274 to the arm 263. The linkage 274 extends through a slot or notch formed in the end of the base 267 and carries an adjustable stop screw 275 which is adapted to engage the base for the purpose of limiting downward movement of the linkage as viewed in FIG. 13. A biasing spring 277 connected between the valve actuating finger 273 and a support beam 278 fixedly secured to the base 267 normally urges the valve actuating arm 271 to pivot in a counterclockwise direction as viewed in FIG. 13, thereby biasing the roller 261 towards and into the path of movement of the rail section. When the roller 261 is engaged by the leading edge of the rail section as the latter advances, it is moved upwardly as viewed in FIG. 13 against the action of the spring 277 until it reaches the position shown in FIG. 16. When the roller 261 moves upwardly the arm 263 is pivoted about the pivot pin 265 in a clockwise direction, thus raising the linkage 274 and pivoting the arm 271 about the pin 268a in a clockwise direction. The clockwise movement of the arm 271 is limited by an adjustable stop screw 279 which is threaded into a tapped bore formed in a stop block 280 secured to the beam 278. When the valve actuating arm 271 is pivoted in a clockwise direction from the position shown in FIG. 13 to that shown in FIG. 16, the actuating finger 273 engages a pawl 281 pivotally carried upon the lower end of a support arm 282 mounted for limited pivotal movement about a pin 283a carried upon a support 283 fixedly secured to the base 267. More specifically, the pawl 281 is mounted for pivotal movement about a pin 284 carried by the arm 282 and is normally biased to pivot in a clockwise direction as viewed in FIG. 13 by means of a biasing spring 285 which has one end secured to the pawl 281 and has its other end secured in fixed position upon the arm 282. As is best shown in FIGS. 14 and 15 of the drawings, the clockwise movement of the pawl 281 is limited by engagement of the pawl with a fixed shoulder 287 formed on the arm 282. When the pawl 281 is seated against the shoulder 287, that is, when the pawl is in the broken line position illustrated in FIG. 14, its extreme outer end 288 is disposed in the path of movement of the finger 273. Thus, the above described pivotal movement of the valve actuating arm in a clockwise direction from the position shown in FIG. 13 to that shown in FIG. 16 when the leading end of the rail section advances causes the finger to engage the end of the pawl in order to pivot the latter in a counterclockwise direction, that is, from the broken line position illustrated in FIG. 14 to the solid line position. The counterclockwise pivoting of the pawl 281 is limited by engagement of the pawl with an inclined shoulder 289 formed on the arm 282 and extending upwardly from the shoulder 287. The inner end of the pawl 281 indicated by the reference numeral 290 is arcuate in shape with the center of the arc coinciding with the center of the pivot pin 284. The inner end 290 bears against the outer surface of a push button 291 for operating the valve 253. The described counterclockwise movement of the pawl 281 in response to clockwise movement of the valve actuating arm 271 has no effect upon the push button 291 in view of the arcuate contour of the camming surface 290 which merely rides over the push button without depressing it. The inclined shoulder 289 is positioned to permit the pawl 281 to turn through a sufficient angle to allow the valve actuating finger 273 to clear the end 288 of the pawl so that this finger moves to the broken line position illustrated in FIG. 14. As soon as the finger 273 moves beyond the end of the pawl, the spring 285 turns the pawl in a clockwise direction from the solid line position shown in FIG. 14 until the pawl again seats against the shoulder 287.

When the valve actuating arm 271 returns from the dotted line position shown in FIGS. 14 and 15 in a manner described more fully hereinafter, the finger 273 engages the end 288 of the pawl as shown in FIG. 15 but since the pawl is, at this time, resting on the shoulder 287, it is unable to pivot in a clockwise direction. As a result, the finger 273 forces the entire arm 282 to pivot about the pin 283a in a counterclockwise direction, thereby moving the arm from the broken line position illustrated in FIG. 15 to the solid line position. The described movement of the arm 282 is, of course, accompanied by corresponding movement of the push button 291 which moves from the broken line position to the solid line position and actuates or opens the valve 254.

Considering next the structure for operating the valve 254 it will be observed that this structure includes the valve actuating arm 272 referred to above which is generally similar to the arm 271 and is provided with a valve actuating finger 272a at its free end. The arm 272 is connected through a linkage 292 to the arm 264 and, here again, the linkage 292 passes through a slot or notch formed in the base 267. A biasing spring 293 urges the arm 272 to pivot about the pin 269a in a clockwise direction as viewed in FIG. 13 in order to force the roller 262 into the path of movement of the rail section and, to this end, the spring is connected between the valve actuating finger 272a and the end of a channel beam 294 secured in fixed position upon the base 267. An adjustable stop screw 295 is threaded into a block 296 carried on the beam 294 for the purpose of limiting the clockwise movement of the arm 272. The valve actuating finger 272a is adapted to engage a pawl 299 which is identical to the pawl 281 described above but is inverted or is 180 degrees out of phase with respect to the latter pawl for a purpose which will become evident as the description proceeds. More particularly, the pawl 299 is mounted for pivotal movement upon the lower end of an arm 300 which, in turn, is free to pivot to a limited extent about a pivot pin 301 carried by the support structure 283. Counterclockwise movement of the pawl 299 as viewed in FIG. 13 is limited by engagement with an inclined shoulder 302 on the support arm, while clockwise movement is limited by engagement with a fixed shoulder 303. The pawl is normally urged to seat against the shoulder 303 by a biasing spring 304 connected between the outer end 305 of the pawl and the support base 267.

When the leading end of the rail section reaches the position shown in FIG. 16, it engages the roller 262 to pivot the arm 264 about the pin 265 thus pivoting the valve actuating arm 272 in a counterclockwise direction about the pin 269a to move this arm from the position shown in FIG. 13 to that shown in FIG. 16. When the arm 272 is thus moved, the finger 272a engages the end 305 of the pawl 299 and pivots the arm 300 slightly in a clockwise direction about the pin 301 in the manner indicated above, thereby depressing a push button 306 for operating the timed valve 254. When the valve actuating arm 272 is moved in a clockwise direction, the pawl 299 pivots in a counterclockwise direction and its arcuate camming surface 307 rides upon the outer end of the push button 306 so that the latter push button is not operated. The described counterclockwise movement of the pawl 299 is limited by engagement with the inclined shoulder 302 at which time the pawl has been moved sufficiently to permit the valve actuating finger 272a to pass.

Turning now to the operation of the valve actuating mechanism 260, it will be observed that in the absence of a rail section, the biasing springs 277 and 293 force both of the linkages 274 and 292 downwardly as viewed in FIG. 13 so that the rollers 261 and 262 are disposed well into the path of movement of the rail section. At this time, the valve actuating arms 271 and 272 are disposed in the positions illustrated in FIG. 13 awaiting the entry of the next rail section. When the leading edge of the rail section enters the spot grinder it first engages the roller 261 to pivot the arm 263 in a clockwise direction about the pin 265, at the same time, pivoting the valve actuating arm 271 in a clockwise direction in order to move the finger 273 past the pawl 281. As described above, this action has no effect upon the valve 253 since the push button 291 is not depressed when the pawl 281 pivots in a counterclockwise direction. The leading edge of the rail section continues to advance until it reaches the position shown in FIG. 16 where it encounters the roller 262 and pivots the arm 264 in a counterclockwise direction. When the arm 264 is thus pivoted, the valve actuating arm 272 turns about the pin 269a in a counterclockwise direction so that its valve actuating finger 272a engages the pawl 299 in order to pivot the arm 300 slightly about the pin 301 in a clockwise direction, thus depressing the push button 306 and opening the valve 254. As indicated above, when the valve 254 is opened, fluid under pressure passes from the source 252 through the lines 255 and 256 to the piston and cylinder assemblies 250 and 251 with the result that the pressure operated rollers of both of the grinding heads 240 and 241 urge the abrasive belts 242 into engagement with the rail section. Thus, the grinding heads 240 and 241 are rendered effective to grind a portion of the bottom of the rail base and a portion of the top running surface of the rail in a region near the leading end of the rail section. The pressure operated rollers remain in their actuated positions as long as the valve 254 remains open and, hence, the grinding action continues as the rail section advances to the right as viewed in FIGS. 12, 13, 16 and 17. At the end of a predetermined period which is selected to permit the grinding of a sufficient area to make certain that the electrodes of the welding apparatus 54 will make good contact with the rail section during the welding operation, the valve 254 automatically closes, thus interrupting the flow of fluid under pressure to the piston and cylinder assemblies 250 and 251. As indicated above, the assemblies 250 and 251 are single acting devices and, hence, they are automatically returned to their non-actuated positions when the flow of air under pressure from the source is interrupted, thus moving the roller assemblies to their de-actuated positions. Thus, as the end of the predetermined period of operation of the valve 254, the grinding action terminates and the rail section continues to advance. When the trailing end of the rail section reaches the position shown in FIG. 17 where it moves out of engagement with the roller 261, the biasing spring 277 becomes effective to pivot the valve actuating arm 271 about the pin 268a in a counterclockwise direction as viewed in FIG. 13, thus moving the finger 273 into engagement with the pawl 281 and pivoting the arm 282 about the pin 283a in a counterclockwise direction to depress the push button 291 and open the valve 253. When the valve 253 is opened, fluid under pressure is again admitted from the source 252 to the piston and cylinder assemblies 250 and 251, with the result that the pressure operated rollers of the two grinding heads 240 and 241 again move the abrasive belt 242 into engagement with the rail section. At this time, the grinding heads 240 and 241 become effective to grind portions of the top running surface and the underside of the rail base near the trailing end of the rail section. This grinding continues until the timing period of the valve 253 expires at which time the latter valve closes automatically to interrupt the flow of air under pressure from the source 252 to the piston and cylinder assemblies 250 and 251 with the result that the pressure operated rollers of the two grinding heads 240 and 241 again return to their non-actuated positions.

When the predetermined period of operation of the valve 253 is completed, the rail section continues to advance until its trailing end leaves the roller 262. When this occurs the spring 293 becomes effective to pivot the valve actuating arm about the pin 269a in a clockwise direction until this arm returns to the position shown in FIG. 13. During this movement of the arm 272, the finger 272a pivots the pawl 299 in a counterclockwise direction but the pawl movement has no effect upon the valve 254 since the arcuate surface of the pawl rides along the push button 306 without depressing it. At this point, of course, the mechanism 260 has returned to its inoperative condition with the rollers 261 and 262 disposed in the path of movement of the next rail section awaiting the next cycle of operation. In view of the foregoing description, it will be recognized that the spot grinder 70 is rendered effective to grind small portions of the rail section respectively located near its leading and trailing ends and the grinding is discontinued for the major portion of the cycle, thus avoiding excessive wear upon the abrasive belts 242.

*The Welding and Shearing Apparatus*

The welding and shearing apparatus 54 is shown in FIGS. 18 to 22, inclusive, of the drawings. The welding apparatus, exclusive of the shearing mechanism, is generally similar to the arrangement disclosed in United States Patent No. 2,781,026 of Hans Alfred Schlatter and Emil Wegmann. More particularly, the welding apparatus itself is of the flash welding type wherein the continuous rail is held stationary while the movable rail is moved toward and away from the butt end of the continuous rail in order to draw an arc between the rail sections for the purpose of producing heat and, when the end portions of the rail sections are sufficiently heated, the parts are suddenly pushed together with a large force in order to fuse the ends together. As described in the above identified Patent No. 2,781,026, the welding machine includes a stationary base only a portion of which is visible in FIG. 18 and this portion is indicated by the reference numeral 320. A movable platen or carriage 321 is mounted for sliding movement upon the base 320 within suitable guideways shown at the right side of the base as viewed in FIG. 18. The continuous rail, which is indicated by the reference numeral 322 and which may include several rail sections welded during previous welding operations, is held in fixed position upon the base 320 by means of a pair of aligned vertical clamps 323 and 324 respectively acting upon the top running surface and the bottom of the rail base and by a pair of aligned horizontal clamps one of which is indicated in FIGS. 18 and 19 by the dotted line 319. The horizontal clamps act at right angles to the vertical clamps 323 and 324 and are adapted to be moved into engagement with the side edges of the top running surface of the rail. The movable carriage 321 carries the movable rail section 67 supplied from the rail supply car 50 and, to this end, the movable carriage is provided with a pair of aligned vertical clamps 325 and 326 respectively acting upon the top running surface and the bottom of the rail section base together with a pair of aligned horizontal clamps which act at right angles to the clamps 325 and 326 and are adapted to be moved into engagement with the side edges of the top of the rail section. One of the horizontal clamps is indicated by the broken line 350 in FIGS. 18 and 19 and this clamp cooperates with its associated horizontal clamp to prevent lateral movement of the rail section during the welding and shearing operations. All of the clamps described above are moved by a fluid operated piston and cylinder assembly between a retracted position out of engagement with the rail and an extended position where they are seated against the rail surface. The two pairs of vertical clamps 323, 324 and 325, 326 and the two pairs of horizontal clamps are of the type described in detail in United States Patent No. 2,787,698, issued April 2, 1957, to Hans Alfred Schlatter and Emil Wegmann and, hence, one of the clamps of each pair acts as a stop member while the other clamp of each pair acts as a pressure member for forcing the rail against the stop member in order to hold it firmly during the welding and shearing operations. The position of the stop member of each pair may be adjusted to align the rail section 67 and the continuous rail 322 prior to making the weld. This adjustment is made in the manner described in Patent No. 2,787,698 referred to above and for the clamp 323 it is accomplished by manually turning a wheel 323a. A similar hand operated wheel is, of course, provided for the stop members of the remaining pairs of clamps but these are not shown in the drawings. As described in Patent No. 2,787,698 provision is made for applying more total force to the stop member of each pair of clamps than is applied to the pressure member, thereby preventing the latter from overcoming the former and disturbing the alignment.

For the purpose of supplying current to the continuous rail 322 and to the movable rail section 67 to perform the welding operation, the base 320 also supports a pair of welding electrodes or contacts 327 and 328 movable into engagement with the ground portions near the trailing edge of the continuous rail. It will be recalled that these electrode receiving portions near the trailing end of the continuous rail were ground and cleaned by the action of the spot grinder 70 described above. The electrodes 327 and 328 are movable between a retracted position shown in solid lines in FIGS. 18 and 19 and an extended or applied position illustrated by the broken lines in FIG. 18. The movement of the electrodes 327 and 328 between these positions is respectively accomplished by piston and cylinder assemblies 329 and 330 of conventional construction energized from a fluid source either hydraulic or pneumatic which is preferably the same source used in the operation of the piston and cylinder assemblies for the rail clamps. The movable carriage 321 also carries a pair of electrodes or contacts 331 and 332 which are respectively moved by piston and cylinder assemblies 333 and 334 between a retracted position (indicated by solid lines in FIGS. 18 and 19) out of engagement with the rail section 67 and an extended position (illustrated in broken lines in FIGS. 18 and 19) where the ends of the electrodes respectively contact ground portions of the top running surface of the rail section and the underside of the rail base. It will be recalled that the electrode receiving portions near the leading edge of the rail section 67 were ground or cleaned by the spot grinder 70 as the rail section was advanced along the rail supply car 50. The piston and cylinder assemblies 333 and 334 are, of course, energized from the same source as the assemblies 329 and 330 referred to above.

As was indicated above, the movable carriage 321 is adapted to slide horizontally along the base 320 between a retracted position indicated in solid lines in FIG. 18 and an extended position indicated by the broken lines, this movement being controlled by a piston and cylinder assembly 335 which is hydraulically actuated by oil supplied from a suitable pump. The piston rod 340 of the assembly 335 is connected to one end of the carriage through a linkage 336 including a lever 337 mounted for pivotal movement about a fulcrum pin 338 carried on the base 320. More specifically, the lever is pivotally connected at one end to a fixed arm 339 on the carriage 321 and at the other end is pivotally joined to the piston rod 340. The piston and cylinder assembly 335 is of the type described in the above identified Schlatter et al. Patent No. 2,781,026 and the oil flow to this assembly is controlled in the manner described in this patent so that the assembly is effective to move the carriage 321 back and forth while it is being advanced from its retracted position to its extended position. More specifically, the carriage is reciprocated while it is being advanced thus moving the leading end of the rail section 67 toward and away from the trailing end of the continuous rail 322 during the welding operation, thus uniformly heating the two ends. The manner in which the piston and cylinder assembly 335 is operated to accomplish the described movement of the carriage is set forth in detail in Patent No. 2,781,026 and, as described therein, when the ends of the rails have been heated sufficiently, the carriage 321 is moved to the left as viewed in FIG. 18 with a large force to complete the welding process by pushing the leading end of the rail section 67 against the trailing end of the continuous rail 322, thereby causing the molten metal to fuse together and form a solid joint. This process creates an upset 344 of metal surrounding the welded joint and this upset must, of course, be removed before the rail can be used.

In accordance with an important feature of the present invention, the welding apparatus 54 is provided with a new and improved device for shearing off the upset metal surrounding the welded joint and this device is indicated in the drawings by the reference numeral 341. The shearing device 341 includes an elongated shearing box 342 mounted for sliding movement upon the carriage 321. This box is movable from a retracted position illustrated in FIG. 18 to an extended position shown in FIG. 19 and in the extended position a plurality of shearing blades 343 affixed to the front end of the shearing box are disposed immediately adjacent the upset material surrounding the welded joint. The shear box 342 is adapted to be moved between its retracted and extended positions by means of a piston and cylinder assembly 345 mounted upon the movable carriage 321 and having its piston rod 346 secured through a connecting link 347 to the box 342. The actual shearing is accomplished, as will be described more fully hereinafter, by admitting oil to the piston and cylinder assembly 335 to move the carriage 321 to its extended position, thus forcing the shearing blades 343 through the metal upset 344.

The shearing box 342 is, in effect, a hollow structure of rectangular cross section with walls formed of heavy steel plates having sufficient strength to withstand the shearing force. The shear box has a through opening 342a dimensioned loosely to receive the rail section and, hence, it is capable of handling a number of different size rails within the range of its dimensions but it may be necessary in some instances to replace the shear box with one having different dimensions in the event that the cross section of rail sections to be handled falls beyond the range. To facilitate the movement of the shear box 342 along the rail the box carries internally a plurality of spaced apart rollers 348 and 349 which are adapted to engage and roll along the top running surface of the rail whenever the shear box is being extended or retracted. These rollers are mounted upon suitable spring pressure supports having biasing springs acting to urge the rollers downwardly as viewed in FIGS. 18 and 19. The shear box may also be provided with side guides which are not shown in the drawings but which function to guide the movement of the box along the rail and to aid in aligning the rail in the welding machine. These side guides are preferably adjustable laterally of the rail and the mountings for the rollers 348 and 349 are preferably adjustable vertically so that rail sections of different dimensions can be accommodated.

During the welding operation, the shear box 342 is retracted so that the electrodes 331 and 332 may move into engagement with the rail section 67 but, as is clearly shown in FIG. 18, even when retracted the shear box is disposed in the path of movement of the vertical clamps 325 and 326 and the pair of horizontal clamps including the clamp 350. However, as indicated above, both of these pairs of clamps must be extended and rendered effective to hold the rail section 67 in position during the welding operation. To this end, the clamp 325, when extended, engages a hardened insert plate 351 accommodated within an opening 352 formed in the top wall of the shear box. The insert plate 351 includes an enlarged head 353 seating within an enlarged diameter portion of the opening 352 and a smaller diameter portion extending through the opening 352 and protruding into the opening 342a in the shear box. The thickness of the insert plate 351 is determined by the height of the rail section 67 and, as a result, different insert plates are used for rail sections of different dimensions. The vertical clamp 326 on the other hand extends through an opening 354 formed in the bottom wall of the shear box in vertical alignment with the opening 352. The opening 354 is preferably somewhat larger in diameter than the clamp 326 in order to permit the latter clamp to extend freely therethrough and into engagement with the underside of the base of the rail section 67. The clamp 326 lifts the rail section 67 and seats it firmly against the hardened insert 351 and, at the same time, raises the spring mountings for the rollers 348 and 349. In similar manner, when the horizontal clamps on the carriage 321 are extended one of these clamps seats against a hardened insert plate (not shown) identical to the plate 351 described above but carried by one side wall of the shear box while the other horizontal clamp extends through an opening formed in the other side wall and aligned with the insert plate. These horizontal clamps cooperate with the vertical clamps 325 and 326 to lock the rail section 67 to the carriage 321 during the welding operation.

During the welding operation, the shear box 342 is locked in its retracted position by means of a latching mechanism indicated by the reference numeral 372 in FIGS. 18 and 19. This mechanism includes a latching dog 373 movable between a retracted position shown in solid lines in FIG. 19 and an extended position shown in broken lines wherein it projects into a dog receiving notch 374 formed in the base or lower wall of the shear box. The movement of the dog 373 is controlled by a single acting piston and cylinder assembly including a biasing spring (not shown) urging the dog towards its extended position. When it is desired to release the latching mechanism 372 in order to extend the shear box, fluid under pressure is admitted to the piston and cylinder assembly 375 to force the piston of the latter assembly downwardly against the action of the biasing spring in order to withdraw the latching dog 373 from the notch 374 and, hence, to permit the forward movement of the shear box 342. Fluid for operating the latching assembly 372 is supplied simultaneously with the fluid for extending the piston and cylinder assembly 345. When the shear box 342 has been returned to its retracted position by interruption of the flow of fluid pressure to the piston and cylinder assembly 345 the fluid circuit to the piston and cylinder assembly 375 has also been broken and, as a consequence, the biasing spring again becomes effective to seat the latching dog 373 within the notch 374 to lock the shear box in retracted position.

When the welding is completed, both pairs of clamps are released or retracted and the carriage 321 is returned to its retracted position by the piston and cylinder assembly 335. The rail is still held in position by the pair of stationary vertical clamps 323 and 324 and by the pair of stationary horizontal clamps including the clamp 319. The return movement of the carriage is facilitated by the rollers 348 and 349 rolling along the top running surface of the rail.

The shearing portion of the cycle now begins as soon as possible since it is desirable to shear the upset 344 while the metal is still very hot so that it is soft and easy to cut. The shearing is initiated by operating the piston and cylinder assembly 345 to extend the shear box 342 until the latter reaches the position shown in FIG. 19 whereupon the shear box is locked to the carriage 321 by again extending the pair of vertical clamps 325 and 326 and the pair of horizontal clamps including the clamp 350.

At this time, as is best shown in FIG. 19, the clamps are no longer aligned with their associated insert plate (the plate 351 for the clamp 325) and shear box opening (the opening 354 for the clamp 326) but instead they engage external surface portions of the shear box to lock the box to the carriage 321. The rail is, of course, freely supported within the shear box to permit operation of the piston and cylinder assembly 335 in order to move the carriage 321 and the shear box to the left from the position shown in FIG. 19, this movement being accompanied by the rollers 349 and 349 rolling along the top of the rail. The very large carriage moving force available from the piston and cylinder assembly 335 is sufficient to drive the shearing blades 343 through the upset metal 344, thus shearing off the major portion of this upset region while the metal is still very hot from the weld. To this end, the shearing blades 343 are contoured to approximate the size of the rail. These blades are made in separable sections each formed of an alloy steel suitable for shearing the hot metal of the upset 344. In the form of the invention illustrated in FIGS. 18 to 22, these blades have been found effective to shear the upset to within 1/32 of an inch of the rail size along the rail head and the rail base while leaving a somewhat thicker region along the rail web. The blade sections are suitably affixed to the ends of the shear box 342 as, for example, by means of bolts 355 having their heads seated within appropriate recesses in the blades and having stems threaded into tapped bolt receiving bores extending into the end of the shear box. The cutting edges of the separable blade sections are stepped so that all of these edges do not begin to shear the upset 344 at the same time, an arrangement which reduces the force required from the piston and cylinder assembly 335. More specifically, the upper blade section 356 includes a forwardly extending cutting projection 357 which tapers back into cutting edges 358 and 359. The cutting edges 357, 358 and 359 cooperate to shear the upset 344 along the top running surface of the rail. The cutting edges 358 and 359 taper downwardly as indicated at 360 and 361, respectively, to follow the two side edges of the rail head. The two side blade sections 362 and 363 include inwardly and forwardly projecting cutting edges 364 and 365, respectively, for shearing off the upset portion 344 along the two side edges of the rail web. The two side cutting edges 364 and 365 each taper rearwardly from an apex or point indicated at 366 in FIG. 21 for the cutting section 364. The lower edge of each of the sections 362 and 363 flares outwardly to accommodate the top of the rail base and to shear off the upset portion 344 in this region. At the base of the rail, two blade sections 368 and 369 serve to shear the two side edges of the rail base. The bottom of the rail base is sheared by a lower blade section 370 having a forwardly extending cutting projection 371 extending outwardly for approximately the same distance as the upper projection 357 and cooperating with portions tapering rearwardly from both sides of the projection 371 to form cutting edges.

Referring now to the operation of the welding and shearing apparatus 54, it will be observed that at the beginning of the welding cycle, the pair of stationary vertical clamps 323 and 324 and the pair of horizontal stationary clamps including the clamp 319 are actuated to hold the continuous rail in fixed position with its trailing end located at the position shown in FIG. 18 preparatory to beginning the welding operation. The front or forward end of the rail section 67 is clamped to the carriage 321 by moving the pair of vertical clamps 325 and 326 and the pair of horizontal clamps including the clamp 350 to their extended positions. The two pairs of clamps (323, 324, 319) on the base 320 will be referred to as the stationary clamps in ensuing portions of this description since they are mounted upon the stationary base while the two pairs of clamps (325, 326, 350) on the carriage 321 will be referred to as the movable clamps since they are carried by the movable carriage. At this time, the clamp 325 seats upon the insert 351 in the shear box 342 while the clamp 326 extends through the opening 354 and into engagement with the underside of the rail base. In similar manner, one of the horizontal clamps seats upon an insert similar to the insert 351 while the other horizontal clamp extends through an opening in the side wall of the shear box. At this time, the alignment between the leading end of the rail section 67 and the trailing end of the continuous rail 322 is checked and, if this alignment is not within the allotted tolerances, the pairs of clamps are all released and the stop members of one or more of these pairs are adjusted, whereupon the clamps are again applied and the alignment is rechecked. An experienced operator will be able to determine which of the stop members should be adjusted and the amount of adjustment necessary. In any event, the above described procedure is repeated until the rails are properly aligned at which time the clamps are all extended. Of course, automatically operated aligning dies could be used to effect the alignment but these have not been shown in the drawings. When the movable clamps are extended, the forward end of the rail section is securely clamped to the movable carriage 321 and, at this time, fluid under pressure is admitted to the piston and cylinder assembly 335 to begin the movement of the carriage from its retracted position to its extended position. The latching mechanism 372 is effective to lock the shear box in retracted position. The piston and cylinder assembly 335 is rendered effective to reciprocate the carriage 321 and, at the same time, to advance the carriage gradually to the left as the welding cycle progresses, thus flashing the ends of the rails to heat them. Near the completion of the welding cycle, the piston and cylinder assembly 335 is rendered effective to apply a large force to the carriage 321 in order to push the rail section 67 against the end of the continuous rail 322 to form the joint, at the same time, creating the upset region 344. When the weld has been completed, the horizontal and vertical clamps on the movable carriage are released and the movable carriage 321 is returned to its retracted position by operation of the piston and cylinder assembly 335.

When the movable carriage 321 has been fully retracted, the latching mechanism 372 is released and the piston and cylinder assembly 345 is rendered effective to extend the shear box 342 by moving it from the position shown in FIG. 18 to that shown in FIG. 19. The horizontal and vertical clamps on the movable carriage 321 are then reapplied but, at this time, they engage the walls of the shear box 342 since they are no longer aligned with the inserts and the openings in the shear box. When the horizontal and vertical clamps engage the walls of the shear box, the shear box is securely locked to the carriage 321 and, at this time, the piston and cylinder assembly 335 is again rendered operative to move the carriage 321 from its retracted position to its extended position. A force of approximately fifty tons is exerted on the movable carriage and this force is sufficient to drive the shearing blades 343 through the upset 344 with the result that a major portion of the upset metal is sheared off prior to feeding the continuous rail to the grinding equipment 55. Immediately after the shearing has been completed, the piston and cylinder assembly 335 is rendered effective to return the movable platen to its retracted position where it is latched by the mechanism 372 and the horizontal and vertical clamps on the carriage 321 are released. The shear box is then retracted by operation of the piston and cylinder assembly and the stationary clamps are released to permit the cycle to continue. The operation of the welding and shearing apparatus may be completely automatic as described more fully hereinafter or, alternatively, these operations may be performed by operation of suitable manually operated control switches which are actuated at the proper times to effect the sequence of operation described above.

When an automatic cycle is employed, suitable limit switches are used to control the cycle of operation. Thus, for example, when the shear box 342 is extended, a shear box advanced limit switch LS–SBA is closed by engagement of its operating arm 376 by a switch operating collar 377 secured in fixed position upon the piston rod 346. When the shear box is retracted, the collar 377 engages an actuating arm 378 of a shear box retracted limit switch LS–SBR in order to provide a control signal indicating that the shear box has been returned to its retracted position. Similarly, when the movable carriage 321 is in its retracted position, a switch engaging arm 380 (FIG. 18) carried on the piston rod 340 engages a switch actuating roller 381 to close a movable platen retracted limit switch LS–MPR to indicate that the movable platen has been retracted. When the movable carriage is in its extended position, the arm 380 engages an actuating arm 382 to close a movable platen advanced limit switch LS–MPA in order to indicate that the movable carriage has been extended or applied. Similar limit switches may be employed for operation when the horizontal and vertical stationary clamps are extended and retracted and when the horizontal and vertical clamps on the movable carriage and the two pairs of electrodes 327, 328 and 331, 332 are extended and retracted but, in the interest of simplicity, these limit switches are not illustrated in FIGS. 18 and 19 although they are referred to hereinafter in conjunction with the description of the automatic operation of the system. In this connection, it should be understood that each of the clamps and each of the electrodes has associated therewith a pair of limit switches, one for indicating that the device has been moved to its extended position and the other for indicating that the device has been retracted.

*The Grinding Equipment*

The grinding equipment 55 is effective to remove those portions of the upset region 344 which remain on the rail head and on the rail base after the shearing operation. This grinding is performed as the continuous rail is advanced by the pusher mechanism 56 (FIG. 13) and the grinding takes place at two stations respectively indicated by the reference numerals 400 and 401 in FIGS. 23 and 24, these stations being spaced apart in the direction of travel of the rail. At the first grinding station 400, three grinding heads indicated by the reference numerals 402, 403 and 404 are employed and each of these heads acts upon a different portion of the rail in the area of the weld. More specifically, as is best shown in FIG. 32 of the drawings, the grinding heads 402 and 403 act upon the two side edges of the top or head of the rail while the grinding head 404 is effective to grind the bottom or underside of the rail base. At the grinding station 401, three additional grinding heads 405, 406 and 407 are employed with the head 405 being effective to grind the top running surface of the rail while the grinding heads 406 and 407 act upon the two flat side edges of the rail base, as is best shown in FIG. 28.

The six grinding heads are mounted upon a support frame 410 formed by steel beams secured together to make up a rigid structure supported upon the floor of the welding car 51. The base of the frame 410 may be provided with suitable adjusting bolts of the type described above for the frame of the rail storage and transfer unit 61 for the purpose of adjusting the height of the frame so that the grinding heads are disposed at the proper level for acting upon the continuous rail 322 when the latter is advanced.

To facilitate the movement of the rail through the grinding equipment, rollers 390 and 391 (FIG. 23) are respectively mounted at the front and rear of the frame 410 and are engaged by the underside of the rail base. The rail is held against the rollers 390 and 391 by means of spring pressed upper rollers 392 and 393, respectively, and the latter are carried by adjustable mountings which may be adjusted to permit the grinding equipment to handle rails of different height. Side rollers 394 and 395 (FIG. 24) are carried by the frame 410 at positions adjacent the rollers 390 and 392 in order to engage and hold the two side edges of the rail base. A similar pair of side rollers (not shown) engage the two side edges of the rail base at the exit end of the grinding equipment near the rollers 391 and 393. The pair of rollers 394 and 395 cooperate with the pair of rollers at the exit end of the grinding equipment to inhibit lateral movement of the rail during the grinding operation. Heavy springs urge each of these side rollers against the rail and the mounting for each roller may be adjusted to permit the grinder to handle rails of different base width.

The two grinding heads 404 and 405 respectively acting upon the underside of the rail base and the top running surface of the rail head are generally similar in construction and may be referred to as the large grinding heads in view of the fact that these particular heads grind relatively large areas of the rail surface and, hence, require greater power in their operation than the smaller heads 402, 403, 406 and 407 which act upon relatively small areas of the rail. Considering first the construction of one of the large heads and referring particularly to FIGS. 25 and 26 of the drawings where the head 405 is shown in detail, it should be noted that the components of this head are supported upon a carriage 409 mounted upon the frame 410. The carriage comprises a pair of end plates 411 and 412 respectively carrying ledges 413 and 414 at their upper ends. The end plate 412 also carries a support block 415 which is somewhat larger than a similar block 416 secured to the end plate 411. The support blocks 415 and 416 are welded or otherwise secured to the ends of a hollow platform or base 417 formed by welding together two channel beams oriented with their channels facing each other. Supported upon the base 417 is an electric drive motor 418 and a support bracket 419 carrying a pair of piston and cylinder assemblies 420 and 421 to be described more fully hereinafter. The motor 418 is of a size sufficient to perform the grinding operation required of the large head and in one form of the invention which has been found to provide satisfactory results, a ten horsepower motor was employed. This motor is secured by suitable motor supports to a plate 422 mounted for pivotal movement upon the base 417 by means of a pair of spaced apart downwardly depending ears 423 having openings therein for accommodating a stub shaft 424 carried by support blocks 425 affixed to the base. The shaft 424 may be secured to the support block in any suitable manner as, for example, by means of set screws indicated by the reference numeral 426 in FIG. 25 and the block may be bolted to the base as indicated at 427. The end of the plate 422 remote from the pivot shaft 424 is secured to the base 417 through an adjusting assembly 428 including an elongated bolt 429 and a plurality of lock nuts 430.

The assembly 428 may be adjusted to pivot the plate 422 about the shaft 424 in order to adjust the tension on a drive belt 431 which is trained over a pulley 432 on the output shaft of the motor and over a second pulley 433. The pulley 433 is mounted upon a shaft 434 which also carries a roller 435 for driving an endless abrasive belt 436 in order to perform the grinding operation. In addition, the shaft 434 carries a drive pulley 437 connected through a V belt 438 to drive a pulley 439 mounted upon a drive shaft 440. The shafts 434 and 440 extend within a housing or dust guard 453 formed upon the carriage 409 at the underside of the base 417 as viewed in FIG. 25. A roller 441 mounted on the shaft 440 drives a flexible backing belt 442 made of rubber or other suitable resilient material and having a belt run 443 lying adjacent to a similar run 444 on the abrasive belt 436. Both of the runs 443 and 444 extend longitudinally of the rail and in the position shown in FIGS. 25 and 26 are spaced slightly from the top running surface.

To form the belt run 444 referred to above, the abrasive belt 436 extends over an idler roller 446 mounted upon a suitable supporting shaft 447 journaled within a pair of spaced apart downwardly depending bracket arms 448 secured to the underside of the base 417. For the purpose of maintaining tension on the abrasive belt 436, this belt is also trained over a tensioning roller assembly indicated generally by the reference numeral 449 and operated by the piston and cylinder assembly 421.

In order to form the elongated run 443, the flexible backing belt 442 is trained over an idler rolling 450 carried upon a shaft 451 journaled for rotation upon the bracket arms 448. To maintain tension upon the backing belt, the latter is also engaged by a tensioning roller assembly 452 operated by the piston and cylinder assembly 420 referred to above. The mounting bracket 419 for supporting the piston and cylinder assemblies 420 and 421 includes a mounting plate 454 secured to the upper face of the base 417 together with upwardly extending support bracket legs 455 and 456 spaced apart upon the mounting plate. The bracket legs 455 are connected by a horizontal flange or ledge 457 for carrying the piston and cylinder assembly 420 and this ledge is provided with an opening 458 accommodating the piston rod 460 of the assembly 420. The latter rod extends downwardly through a second opening formed in a guide plate 461 on the mounting bracket 419 and at its lower end carries a cap 462 in engagement with the tensioning roller assembly 452. More specifically, the assembly 452 includes a roller supporting frame formed by a roller support plate 463 and downwardly facing channel beam 464 secured at one end to the latter plate. Secured to the upper face of the beam 464 is an indexing bar 465 having a depression therein for receiving the rounded lower end of the cap 462. The roller support frame is mounted for pivotal movement upon a pin 466 having its opposed ends disposed within suitable openings in the bracket legs 455. This roller support frame may be non-rotatably secured to the shaft 466 in any suitable manner as, for example, by means of set screws 467 locked in position by appropriate lock nuts. The plate 463 carries a roller support block 468 journaling the opposed ends of a support shaft 469 carrying a roller 470 in peripheral engagement with the flexible backing belt 442.

As is best shown in FIG. 27 of the drawings, the support block 468 is locked to the plate 463 by means of locking bolts 471 but these bolts may be loosened to permit adjustment of the roller 470 to shift its horizontal axis in order to level the roller and, hence, to maintain the flexible belt 442 centered thereon. It will also be observed from FIG. 27 that the roller 470 has a slightly concave outer surface 470a to prevent clipping of the backing belt from side to side. The described adjustment of the roller support block is accomplished by first loosening the locking bolts 471 in order to permit relative movement between the block 468 and the plate 463 and by thereafter turning a pair of spaced apart adjusting screws 472 and 473. When the screws 472 and 473 are selectively turned, the block 468 moves upon the plate 463 while the bolts 471 are guided within arcuate slots 463a formed in the plate. After the roller has been leveled, the screws 472 and 473 are locked in position by lock nuts 474 and the bolts 471 are retightened to hold the support block 468 in its adjusted position.

The tensioning roller assembly 449 is generally similar to the assembly 452 just described and includes a roller supporting frame 475 mounted for pivotal movement about a pin 476 carried on the bracket legs 456. The underside of the frame 475 is engaged by a cap 477 carried on the upper end of a piston rod 478 forming part of the piston and cylinder assembly 421. The frame 475 supports a shaft 479 carrying a roller 480 in engagement with the abrasive belt 436. Here again, the roller 480 has a slightly curved or concave outer surface for preventing slipping of the abrasive belt 436 from side to side. A typical concave roller of this type is illustrated in FIG. 30 where the concave surface is illustrated as acting upon the belt at the region indicated by the reference numeral 481. Here again, the roller 480 may be leveled by loosening bolts 482 and by thereafter turning screws 483 corresponding to the adjusting screws 472 and 473 described above. The manner in which this adjustment is made will be evident from the foregoing description.

In order to tension the abrasive belt 436 and the backing belt 442, fluid, such as air, at a predetermined pressure is supplied from an appropriate source, for example, a compressor on the welding car, to the upper end of the piston and cylinder assembly 420 and to the lower end of the piston and cylinder assembly 421 in order to extend the piston rods 460 and 478. Extension of the rod 460 pivots the roller supporting frame of the assembly 452 about the pin 466 in a counterclockwise direction as viewed in FIG. 25 in order to apply tension to the flexible backing belt 442. Extension of the piston rod 478, on the other hand, pivots the frame 475 about the pin 476 in a counterclockwise direction as viewed in FIG. 25 so that tension is also applied to the abrasive belt 436. The pressure of the fluid delivered to the piston and cylinder assemblies 420 and 421 is adjusted through suitable valves and is measured by gauges in order to assure that proper tension is maintained upon the belts 436 and 442. In the event that it becomes desirable to release the tension on either or both of the belts 436 and 442, as might be required, for example, to replace a worn or defective belt, the fluid flow to the piston and cylinder assemblies 420 and 421 is controlled to retract either or both of the piston rods 460 and 478.

The two belt runs 443 and 444 are adapted to be moved downwardly so that the undersurface of the run 444 engages the rail and this movement is accomplished by a plurality of fluid pressure operated roller devices respectively indicated by the reference numerals 490, 491 and 492. While three such pressure operated devices are illustrated in the drawings, it should be recognized that this has been done for convenience since actually the number of pressure rollers used will be governed by the grinding operation to be performed. Thus, in one installation of the present invention, it was found desirable to employ four such pressure rollers in each grinding head. In any event, the pressure rollers are moved downwardly as viewed in FIG. 26 in sequence in order to force the abrasive belt against the rail, this movement being accomplished by means of piston and cylinder assemblies 493, 494 and 495 (FIGS. 25 and 29). The assemblies 493, 494 and 495 are mounted upon the upper face of the mounting plate 454 and have their piston rods extending downwardly through suitable openings 454a (FIG. 29) for connection to the pressure operated devices 490, 491 and 492, respectively. The latter devices are similar in construction and, hence, only one need be considered in detail that being the device 490 illustrated in FIG. 28 of the drawings. As there shown, the pressure operated device 490 includes a roller assembly 496 which is adapted to seat against the upper surface of the resilient backing belt 442 in order to force the abrasive belt 436 into engagement with the top of the rail when the piston rod 497 of the piston and cylinder assembly 493 is extended. To this end, the roller assembly 496 is mounted upon one end of a shaft 498 carried by a frame 499 formed by side support arms 500 and 501 interconnected by an angle brace 502. In order to prevent rotation of the shaft upon the arms 500 and 501, dowel pins indicated by the broken line 503 in FIG. 25 may be employed. The frame 499 is, in turn, secured to a shaft 504 journaled for rotation within bearing assemblies 505 and 506 mounted on opposed sides of the base 417. The ends of the arms 501 and 502 are secured to the shaft 504 by means of dowel pins 507 again indicated by the broken lines in FIG. 25. As is best shown in FIG. 29, the arm 500 is secured for pivotal movement about a pivot fork 508 carried upon the lower end of the piston rod 497. Thus, when fluid under pressure is delivered to the upper end of the piston and cylinder assembly 493 as viewed in FIGS. 28 and 29, the piston rod 497 is extended to pivot the frame 499 about the shaft 504 in a clockwise direction as viewed in FIG. 29 to force the roller assembly 496 against the flexible backing belt 442, thereby urging the grinding surface of the abrasive belt 436 against the top running surface of the rail. The flexible belt cushions the grinding belt to absorb the shock and vibration and, at the same time, serves as an insulator for the large quantities of heat generated during the grinding action.

An outer ring 510 forming part of the roller assembly 496 has its outer surface contoured as indicated in FIG. 28 to correspond to the top running surface of the rail to be ground and, hence, this roller bends the flexible belt and the abrasive belt around the top of the rail. The outer ring 510 is secured to a bearing race 511 riding upon ball bearings 512 which, in turn, engage an inner bearing race 513 mounted upon a reduced diameter portion 514 of the shaft 498. A cover plate 515 is attached to the ring 510 by machine screws 516 which pass into engagement with the outer race 511 in order to secure the latter to the ring. A dust guard 517 is employed at the inner end of the roller assembly to protect the bearings.

For the purpose of returning the pressure operated roller from the extended position indicated in broken lines in FIG. 29 to the retracted position illustrated in solid lines, there is provided a biasing spring assembly indicated generally by the reference character 518 and including an elongated rod 519 having one end suitably secured to a collar 520 affixed to the shaft 498. The rod extends through an opening in a support block 521 mounted upon the side of the base 417 and its upwardly protruding end is encircled by a coil spring 522 which biases the frame 499 to pivot in a clockwise direction as viewed in FIGS. 25 and 26. To this end, the spring is seated between the block 521 and a washer 523 retained upon the upper end of the rod 519 by means of lock nuts 524. The biasing spring assembly 518 is thus effective automatically to return the pressure operated roller 490 to its retracted position when the fluid pressure flow to the upper end of the piston and cylinder assembly 493 is relieved.

The grinding head 405 is adapted to be raised or lowered upon the frame 410 in order to adjust the grinding equipment for rails of different height and, to this end, as is shown in FIG. 25, jacks 530 and 531 are provided to act between the main frame 410 and the carriage. The jacks are operated by manually rotatable cranks or hand wheels 532 and 533 accessible from the exterior of the equipment. These cranks, as is best shown in FIG. 24 of the drawings, are respectively mounted upon support shafts 534 and 535 extending through bearing supports 536 and 537 secured to the frame 410. The inner ends of the shaft 534 and 535 are supported by bearing blocks, as indicated at 538 for the shaft 534, and each of these shafts is connected through a universal joint to drive a gear (not shown) meshing with a bevel gear forming part of the associated jack. Thus, the shaft 534 drives the bevel gear 540 (FIG. 25) which is internally threaded to ride upon a jack shaft 541 and, in similar manner, the shaft 535 drives a bevel gear 542 which is internally threaded to ride upon a jack shaft 543. The shafts 541 and 543 are respectively secured at their upper ends to the ledges 413 and 414 on the carriage 409 and at their lower ends are key connected to fixed sleeves 544 and 545 on the frame 410. To this end, the shaft 541 carries a fixed pin riding within a keyway slot 547 in the sleeve 544 while the shaft 543 carries a similar pin 548 accommodated within an elongated keyway slot 549. The vertical movement of the carriage 409 along the main frame 410 is guided by blocks 550 and 551 bolted to the main frame 410 and riding within guide slots 552 and 553 respectively formed in the end plates 411 and 412. Thus, when the hand cranks 532 and 533 are turned, the carriage 409 is raised or lowered upon the frame 410 to adjust the height of the grinding head 405 and when the desired level is attained the carriage 409 is locked in position by tightening locking bolts 555 which extend through elongated openings formed in plates 556 and 557 of the main frame and are accommodated within tapped openings formed in the end plates 411 and 412. The elongated openings are indicated in FIG. 25 by the dotted lines in the plates 411 and 412 adjacent the bolts 555 and, when the bolts are loosened, these openings permit limited movement of the carriage during the adjustment described above.

As previously indicated, the grinding head 404 is similar to the head 405 described above and it too may be referred to as a large grinding head in view of the fact that it employs a large driving motor of the same size as the motor 418 employed on the head 405. Thus, as is best shown in FIG. 23 of the drawings, the grinding head 404 includes a motor 565 for driving an abrasive belt 566 and a flexible backing belt 567 through a drive arrangement which is identical to that described above for the grinding head 405. Tension is maintained on the abrasive grinding belt by means of a fluid pressure operated tensioning roller assembly 568, which is identical to the assembly 449 employed on the head 405 and, in similar manner, tension is maintained on the flexible backing belt 567 by means of a tensioning roller assembly 569 which corresponds to the assembly 452 described above. The grinding head 404 further includes a plurality of pressure operated rollers 570, 571 and 572 acting in sequence upon the flexible belt 567 to force the grinding belt 566 into engagement with the underside of the rail base. As is best shown in FIG. 32 of the drawings, the pressure rollers 570, 571 and 572 are identical to the corresponding pressure rollers employed in the grinding head 405 except that they employ a roller assembly 573 which is somewhat wider than the roller assembly 496 previously described since its width corresponds to the width of the rail base. Moreover, since the underside of the rail base is flat the surface of the roller assembly 573 is smooth as indicated by the reference numeral 574 and is not contoured like the outer ring 510 employed on each of the roller assemblies 496 of the grinding head 405. Also, the carriage supporting the grinding head 404 is not adapted to be moved up or down on the main frame 410 since the level of operation of the grinding head 404 is established by adjusting the bolts at the base of the main frame for raising or lowering the frame with respect to the floor of the welding car 51. In all other respects, the grinding head 404 is identical to the head 405 described above.

The two smaller heads 402 and 403 are also generally similar to the large head 405 but, since the power required for operating the two heads 402 and 403 is considerably less than that required for operating the larger grinding heads 404 and 405, the heads 402 and 403 respectively include electric motors 575 and 576 which are considerably smaller than the corresponding motors 418 and 565 described above. In one form of the invention found to provide satisfactory results, five horsepower motors were used to drive the heads 402 and 403. As is best shown in FIG. 24, the motor 575 is connected to drive an abrasive belt 577 and a flexible backing belt 578 through a drive connection which is identical to that employed in the grinding head 405 and described above. The motor 576 drives an abrasive grinding belt 580 and a flexible backing belt 581 via a similar drive connection. Tension on the abrasive grinding belts 577 and 580 is maintained by fluid pressure operated tensioning roller assemblies 582 and 583, respectively, which are similar to the assembly 449 described above. Tension is maintained on the flexible backing belts 578 and 581 by means of fluid pressure operated tensioning roller assemblies 584 and 585, respectively, which are similar to the assembly 452 described above. The abrasive belt 577 is adapted to be forced into engagement with one side edge of the rail head by means of sequentially operated pressure rollers 586, 587 and 588 which are similar to the pressure operated rollers 490, 491 and 492 described above. In corresponding manner, the abrasive grinding belt 580 is adapted to be urged against the other side edge of the rail head by a similar set of sequentially operated pressure rollers 589, 590 and 591. As will be observed from FIG. 32, each of the assemblies 586 to 591 includes a roller assembly indicated by the reference numeral 592 having a surface 593 contoured to correspond with the contour of the side edge of the rail head. The outer ring of the roller assembly is dimensioned to permit the flexible backing belt and the abrasive belt to fit between the outer surface of the roller and the rail so that the flexible belt will perform the grinding function. The two carriages for the heads 402 and 403 are connected together by suitable support structures 615 and 616 (FIG. 24) located at their opposed ends so that these carriages are united for joint movement upon the main frame 410 in order to adjust the position of the heads to permit the grinding of rails of different cross sectional dimensions. The adjustment of the position of the two carriages for the heads 402 and 403 is accomplished by turning hand cranks 617 and 618 (FIG. 23). These hand cranks are connected in the manner indicated above to operate jacks for raising or lowering the carriages of the two grinding heads until these heads are positioned to correspond to the rail being ground, whereupon they are locked in the manner previously described.

The grinding heads 406 and 407 acting upon the two side edges of the rail base are similar to the grinding heads 402 and 403 since they include relatively small driving motors for driving their associated abrasive grinding belts and the corresponding flexible backing belts. The backing belt for the head 406 is indicated in FIGS. 23 and 24 by the reference numeral 600 while the abrasive belt is indicated by the reference numeral 601. The backing belt for the head 407 is designated in FIG. 28 by the reference numeral 602 and the abrasive belt bears the reference numeral 603. Tension is maintained on the abrasive belt and on the backing belt of each of the heads 406 and 407 by fluid operated tensioning roller assemblies of the type described above, the assembly for tensioning the belt 601 being indicated in FIGS. 23 and 24 by the reference character 604 and the assembly for tensioning the backing belt 600 being designated by reference numeral 605. The abrasive belt 601 is urged against one side edge of the rail base by selectively supplying fluid under pressure in sequence to piston and cylinder assemblies associated with pressure operated rolls 607, 608 and 609 and a similar series of rolls is employed for urging the abrasive belt 603 against the other side edge of the rail base although only one of these pressure roller assemblies is shown in the drawings and this is designated by the reference numeral 610 in FIG. 23. The pressure rollers employed in the heads 406 and 407 differ somewhat form the pressure rollers employed on the heads 402 and 403, in that the outer surface of their roller assemblies 612 (FIG. 28) are smooth or flat since they are adapted to urge their associated abrasive belts against flat areas on the two side edges of the rail base. In addition, no provision is made for raising or lowering the heads 406 and 407 upon the main frame 410 in view of the fact that the level of operation of these two heads is controlled by adjusting the bolts at the base of the main frame.

The fluid operated pressure rollers of each grinding head are adapted to be advanced in sequence as the welded joint 344 of the continuous rail reaches a position just ahead of the roller. This arrangement prevents the abrasive belt of each head from being moved into engagement with the continuous rail for an excessive period of time and avoids the grinding of the rail except in the vicinity of the welded joint. The pressure roller is extended just prior to the time when the welded joint moves to a position in alignment with the roller so that the rail will be ground just ahead of the welded joint and a smooth blend is, therefore, achieved. The fluid pressure is maintained on the applied roller for a predetermined period of time sufficient to allow the welded joint to pass the roller and is then automatically relieved to permit the roller to be moved to retracted position. Thus, when the welded joint 344 passes through the heads 402, 403 and 404 in its advancement from left to right as viewed in FIGS. 23 and 24, the first pressure rollers 570, 586 and 589 of each of these heads are applied simultaneously, i.e., they are moved to their extended positions shown in FIGS. 23 and 24, and they remain extended until the weld moves beyond these rollers, thus grinding the welded joint. As the weld advances somewhat further toward the right, the fluid pressure on the rollers 570, 586 and 590 is relieved to permit the latter to retract and the pressure rollers 571, 587 and 590 are simultaneously applied. In similar manner, when the weld moves past the rollers 571, 587 and 590, the latter rollers are retracted and the rollers 572, 588 and 591 are simultaneously extended. All of the pressure rollers of the heads 402, 403 and 404 are retracted when the weld advances from the first grinding station 400 to the second grinding station 401. When the welded joint reaches a point just ahead of the pressure operated roller 490, the latter is moved to its extended position simultaneously with the operation of the pressure rollers 607 and 610 (FIG. 28) of the heads 406 and 407, respectively. The operation then continues in an obvious manner as the welded joint passes the second grinding station.

In the event that rail sections of different size or shape are used, the roller assemblies of the various heads must be replaced. Thus, the roller assemblies in the head 404 must be of the same width as the base of the rail, the roller assemblies of the heads 406 and 407 must be wide enough to grind the two side edges of the base and the contour of the roller assemblies of the heads 402, 403 and 405 must conform to that of the rail to be ground. In addition to replacing the rollers, the hand wheels 532 and 533 must be turned to adjust the height of the head 405 to the proper level and a similar adjustment must be made for the heads 402 and 403 by turning hand wheels 617 and 618.

Weld Sensing and Timing Mechanism

The mechanism for sequentially applying the pressure operated rollers is illustrated in FIGS. 33 and 34 and includes a weld sensing arrangement shown in FIG. 33 for distinguishing the welded joint 344 from the remaining portion of the continuous rail 322 and a timing mechanism indicated by the reference numeral 620 operated by the forward movement of the continuous rail for controlling the supply of fluid pressure to the piston and cylinder assemblies of the pressure rollers in the grinding heads.

The weld sensing mechanism is indicated by the reference numeral 621 and includes a pair of rollers 622 and 623 adapted to engage the web of the continuous rail 322. The roller 622 is mounted for rotation upon one end of a link arm 624 which is, in turn, mounted for pivotal movement upon a pivot pin 626 carried on a bracket 625 which is secured in fixed position adjacent the path of movement of the rail as, for example, to the frame 410 of the grinding equipment 55. The link arm 624 is biased to pivot about the pin 626 in a counterclockwise direction as viewed in FIG. 33 by a coil spring 627 encircling a guide rod 628. One end of the rod 628 is secured to the frame 410 of the grinding equipment while its other end extends loosely through a pin 630 which is held in position on the link arm 624 by a clamping and latching assembly 629. Thus, the spring 627 acts upon the pin 630 to urge the arm 624 to a position where the rollers 622 and 623 are seated against the web of the continuous rail 322.

The roller 623 is supported upon one end of an arm 631 which, in turn, is mounted for pivotal movement about a shaft 632 supporting the roller 622. The other end of the arm 631 is connected through a rod 633 to a switch operating finger 634 which is adapted to actuate a switch 635 when the roller 623 is engaged by the sheared upset 344 surrounding the welded joint. More specifically, when the upset 344 engages the roller 623, the arm 631 and the switch actuating finger 634 are moved from the broken line positions indicated in FIG. 33 to the solid line positions, whereupon the finger engages an actuating arm 636 for the switch 635. The switch 635 is actuated only by differential movement between the two rollers 622 and 623. Thus, when the roller 622 is engaged by the upset 344, the arm 624 pivots about the pin 626 in a clockwise direction to compress the spring 627 but this pivotal movement is not accompanied by actuation of the switch 635 in view of the fact that the arm 631 does not pivot about the shaft 632 at this time. Moreover, lateral movement of the continuous rail 322 toward or away from the rolers 622 and 623 does not result in actuation of the switch 635 since this movement merely moves the two rollers jointly and does not cause the arm 631 to pivot about the shaft 632. Therefore, the mechanism 621 is capable of distinguishing between the welded portion of the rail and the remainder of the rail web so that the switch 635 is actuated at the precise instant when the roller 623 is engaged by the raised weld. The switch 635 is a timed switch which, following its energization, remains closed for a predetermined interval sufficient to permit the weld to pass through both of the grinding stations 400 and 401.

Actuation of the switch 635 is effective to initiate operation of the timing mechanism 620 and, to this end, this switch is connected in a circuit including an electrically operated clutch 637. The clutch 637 is adapted, when energized, to connect a driving mechanism 638 to a cam mechanism 639 which, in turn, controls the valves for admitting fluid to operate the pressure rollers of the grinding heads. The driving mechanism 638 includes a roller 640 carried upon suitable supporting structure and biased into engagement with the top running surface of the rail 322 by means of a biasing spring 641 acting between the roller supporting structure and the frame 410 of the grinding equipment. When the rail 322 is advanced, the roller 640 turns in a counterclockwise direction as viewed in FIG. 34 to drive a roller support shaft 642 which is connected by a chain or belt 643 to turn a shaft 644 driving one element of the electrically operated clutch 637. The other element of the clutch 637 drives an output shaft 645 which functions as the input to the camming mechanism 639. To this end, the shaft 645 is connected through suitable reducing gears 646 to drive a cam shaft 647 supporting a plurality of cams 648, 649, etc. One cam may be provided for each of the pressure operated devices employed in the grinding heads, although since the pressure rollers of the three grinding heads at each station are operated in sequence with one roller from each head being actuated simultaneously with a roller from each of the other two heads, a total of six cams will suffice.

Considering now the operation of the timing mechanism 620 beginning with the instant when the weld 344 engages the roller 623 to close the switch 635, it will be observed that the clutch 637 is, at this time, energized via a circuit including a source of power and the switch 635, thereby rendering the roller 640 effective to drive the camming mechanism 639. The shaft 647 rotates while the rail advances and, when the cam 648 reaches a predetermined position, it becomes effective to close a switch 650 having its actuating arm 651 biased into engagement with the periphery of the cam. When the switch 650 is closed, a circuit including a source of power (not shown) is completed for energizing and opening a solenoid operated valve 652 connected between a fluid source 653 and the piston and cylinder assembly for actuating the pressure roller 586. Thus, when the valve 652 is opened, the pressure roller 586 is extended and it acts through the backing belt 578 to force the abrasive belt 577 into engagement with the rail 322. At the same time, the closing of the switch 650 results in extending the pressure rollers 570 and 589 to render the grinding heads 403 and 404 effective to perform their grinding operations. The cam 648 is so oriented on the shaft 647 that the switch 650 closes after the welded joint 344 has advanced from the position where it engages the roller 623 to a point where it is located just ahead of the pressure rollers 570, 586 and 589. The roller 640, in effect, measures the distance between the roller 623 and the point of application of the rollers 570, 586 and 589 to make certain that the latter rollers are not extended until the weld reaches the proper position to begin the grinding. After the welded joint passes the rollers 570, 586 and 589, the switch 650 is opened by the cam 648 and the valve 652 closes to retract the rollers 570, 586 and 589. A short time thereafter the cam 649 becomes effective to close its associated switch and to extend the rollers 571, 587 and 590. The operation then continues in an obvious manner while the welded joint passes through both of the grinding stations 400 and 401. The switch 635 is merely effective to transmit a pulse to the clutch 637 which then remains closed during one revolution of the cam shaft 647. At the completion of this revolution the clutch 637 is automatically disengaged. Thus, the roller 640 continues to rotate, but the cam shaft 647 is not turned until the succeeding weld engages the roller 623 during the next cycle of operation.

The Pusher Mechanism 56

The continuous rail is moved by the pusher mechanism illustrated in FIGS. 35, 36 and 37 which comprises a driven endless tread 660 acting upon the underside of the rail base and an upper idler or squeeze tread 661 acting upon the top running surface of the rail. The lower tread may be selectively driven in either direction to advance or to back up the rail while the upper tread applies pressure for squeezing the rail to develop a tremendous traction of sufficient magnitude to handle the very heavy quarter mile length rail sections. To this end, the lower tread is mounted upon a rigid support frame 662, the level of which may be adjusted with respect to the floor of the welding car 51 by means of adjustable feet in the form of adjusting bolts 663. The bolts 663 are so adjusted that the top run of the tread 660 as viewed in FIG. 35 is at the proper level for receiving the rail base. The frame 662 supports a pair of guide rolls 664 at the entrance end of the pusher mechanism and a second pair of guide rolls 665 at the exit end of the pusher mechanism. A base 666, which is preferably part of the main frame 662, supports a drive assembly for driving the lower tread 660. This base 666 also supports a mast 668 carrying a horizontally disposed roller 669 for engaging the underside of the base in order to support the continuous rail as it leaves the welding car. The mast 668 also supports a pair of guide rolls 670 disposed adjacent the bottom support roller 669. The three pairs of guide rolls 664, 665 and 670 are mounted for rotation about vertical axes and engage the side edges of the rail base to inhibit lateral movement. The mounting arrangement is such that the guide rolls of each pair may be adjusted toward or away from each other to handle rails of different base widths and they may also be adjusted vertically to insure their proper engagement with the side edges of the rail base.

The drive assembly includes a reversible electric motor 667 connected through suitable reduction gearing 671 to drive a sprocket engaging a chain 672. The latter chain, in turn, engages a sprocket 673 mounted upon a shaft 674 rotatably journaled upon the main frame 662. The shaft 674 also carries a sprocket driving a chain 675 which forms what may be referred to as a symmetrical serpentine drive since it meshes with tensioning sprockets 676 and 677 and with large sprocket 678 and 679 respectively carried upon shafts 680 and 681 journaled upon the main frame 662. Each of the shafts 680 and 681 carries a pair of spaced apart sprockets engaging endless single loop type chains 682 and 683 forming part of the drive tread 660. Only one of the two sprockets mounted upon the shaft 680 is visible in FIG. 35 and this is designated by the reference numeral 684. Similarly, only one of the drive sprockets mounted upon the shaft 681 is visible in FIG. 35 and it is designated by the reference character 685. As is best shown in FIG. 36, the chains 682 and 683 are similar and each includes two parallel sets of links interconnected by shafts supporting rollers disposed between the links. Thus, for example, one set of links for the chain 682 is indicated in FIG. 36 by the reference numeral 686 while the other or parallel set of links is designated as 687. Each pair of links in the set 686 is pivotally supported upon a shaft 688 which also pivotally supports a pair of links in the link set 687. A roller 689 having a diameter somewhat greater than the width of the links is carried upon the shaft 688 between the two link sets. Each of the links in the set 687 is provided with a shelf or platform 690 for supporting a metal shoe or plate 691. Along one of its sides the shoe 691 is bolted or otherwise secured to the shelf 690 and along its other side it is similarly secured to a corresponding shelf formed on the chain 683.

When the motor 687 is rendered effective to drive the tread 660 the rollers of the two chains 682 and 683 roll along the top surfaces of guide brackets 692 and 693 secured to the frame 662. The shoes 691, on the other hand, are engaged and supported by a plurality of roller assemblies indicated by the reference numerals 694 and 695. Although two such roller assemblies are illustrated in FIG. 35, it should be understood that actually any number may be employed as required to provide sufficient support for the drive tread 660. Since the two roller assemblies 694 and 695 are identical, only the one assembly, namely the assembly 694 shown in FIG. 36, will be considered in detail. This roller assembly includes a plurality of elongated rollers 696 having their opposed ends connected together by a pair of parallel endless link arrangements 697 and 698. The rollers move over a support block 699 carried upon suitable fixed support structure on the frame 662. This block includes flat upper and lower roller engaging surfaces and rounded ends for permitting movement of the rollers 696. Thus, when the tread 660 is driven by the motor 667, the shoes 691 roll along the rollers 696 to turn the latter and drive them over the surface of the block 699.

The squeeze or idler tread 661 is supported upon a frame 700 mounted for pivotal movement about pivot pins 701 (FIG. 36) carried by support structure 702 adjustably but rigidly secured to the main frame 662. The frame 700 is adapted to be moved about the pivot pins 701 by means of a plurality of piston and cylinder assemblies 703 having their lower ends pivotally supported upon the main frame 662. Fluid flow to these assemblies is controlled by a common valve so that all of them are actuated simultaneously. When the fluid under pressure is admitted to bottom or lower ends of the piston and cylinder assemblies 703 as viewed in FIGS. 35 and 36, the piston rods 704 of these assemblies are extended to pivot the frame 700 about the pins 701 in a counterclockwise direction as viewed in FIG. 36, thus moving the squeeze tread 661 out of engagement with the top of the rail and also out of the path of movement of the rail. When fluid pressure is admitted to the upper ends of the piston and cylinder assemblies 703, the piston rods 704 are retracted and the frame 700 is pivoted about the pins 701 in a clockwise direction as viewed in FIG. 36, thereby causing the squeeze tread 661 to engage the top running surface of the continuous rail 322 and to squeeze the latter rail under very high pressure against the drive tread 660 so that a tremendous traction is exerted on the rail. When the reversible motor 667 is turned in the forward direction the sprockets on the shaft 681 serve as drive sprockets and they are driven in a clockwise direction as viewed in FIG. 35 to advance the chains 682 and 683 from left to right. However, when the motor 667 is reversed, and when the squeeze tread 661 is effective to clamp the rail against the drive tread 660, the sprockets on the shaft 680 provide the drive for the chains 682 and 683 and, since they are turned in a counterclockwise direction at this time, the chains and the rail section are moved from right to left. The symmetrical serpentine drive including the chain 675 permits the chains 682 and 683 to be driven by different sprockets when the motor is reversed and this is an important feature of the present invention.

The frame 700 carries bearing assemblies for supporting shafts 705 and 706 which mount pairs of drive sprockets engaging a pair of endless chains making up the squeeze belt 661. The pair of spaced apart drive sprockets mounted on the shaft 705 are indicated by the reference numeral 707 while those mounted upon the shaft 706 are indicated by the reference numeral 708. The two chains engaged by the sprockets 707 and 708 are respectively indicated in FIG. 36 by the reference numerals 709 and 710 and these chains are identical to the chains 682 and 683 previously described. The chains support plates or shoes 711 which, in turn, carry facing plates 712 formed of a material, such as aluminum, which is somewhat softer than the steel head of the rail 322 so that the very large pressure applied to the top running surface of the rail by the tread 661 will not damage the rail. At the same time, the use of a relatively soft facing plate upon the hard shoes 711 produces better gripping action between the squeeze tread 661 and the rail head. The shoes 711 roll along endless roller assemblies 713 and 714 which are supported upon the frame 700 and are similar to the assembly 694 described above. The pressure exerted by the piston and cylinder assemblies 703 upon the frame 700 is transmitted to the drive tread 660 through the pressure roller assemblies 713 and 714, through the shoes and the facing plates of the tread 660 and through the rail itself.

In accordance with an important feature of the present invention the roller assembly 713 is vertically aligned with the roller assembly 694 and the roller assembly 714 is vertically aligned with the roller assembly 695 and, as a consequence, all of the pressure applied by the piston and cylinder assemblies 703 is exerted across the pairs of roller assemblies which have only relatively rigid metal parts interposed therebetween. Thus, this very high pressure can exert a large tractive forces upon the rail without distorting or damaging the other components such as the chains of the upper and lower treads. Another important advantage of this invention resides in the mounting arrangement for the roller assemblies 713 and 714 of the squeeze treads 661. More specifically, each of these assemblies is floating upon or resiliently supported from the upper frame 700 so that the two roller assemblies may move slightly independently of each other in order to accommodate slight differences in rail size or minor deviations in the contour of the rail. Without this feature, one of the roller assemblies might supply all or a major portion of the pressure to the rail and, as a consequence, the traction might, under some circumstances, be insufficient to move the rail. The mounting arrangement for the roller assembly 713 is shown in FIG. 35 as including a column 718 secured at its lower end to suitable roller support structure 719. A post 720 depending downwardly from the upper frame 700 telescopes within the column 718 so that the support structure is actually movable with respect to the frame. A resilient cushion 721 formed of rubber or the like surrounds the post 720 and is interposed between the top of the column and the underside of frame 700 in order to provide the floating mount referred to above. In view of the foregoing description, it will be apparent that slight changes in rail size or minor deviations in shape will cause one of the roller support structures of the assemblies 713 or 714 to rise against the resilient cushion so that the pressure applied to the rail is distributed substantially equally between the two assemblies 713 and 714, thus avoiding the disadvantages described above.

In order to adjust the squeeze tread for the purpose of handling rail sections of different height, the frame 702 is adjustably secured to the frame 700. As is shown in FIG. 37, this adjustment is effected by means of a series of holes 715 formed in the frame 702 and by a series of apertures 716 in the main frame. The spacing between the holes 715 obviously differs from that between the holes 716 so that securing bolts 717 may be passed through different ones of the holes 715 and 716 in order to permit adjustment of the frame 702. Actually, two pairs of aligned holes 715 are employed at opposed ends of the frame 702 for cooperation with two pairs of aligned holes 716 although only one end of the frame 702 and one set of holes is illustrated in FIG. 37, the remaining set being shown in FIG. 35. While the frame 702 may be adjusted to handle rails of different height both sides of the squeeze tread 661 remain parallel and in the same horizontal plane for each adjustment. Thus, the squeeze tread is never canted or inclined and its shoes 711 and facing plates 712 remain horizontal when the tread is applied.

The rail is pushed from the pusher mechanism 56 through the end of the rail welding car 51 to a testing station which is preferably located on a flat car spaced from the end of the welding car. The testing station is preferably so located that a welded joint in the continuous rail will be located at the testing station when the butt end of the rail is in the welding apparatus 54 in position to be joined to the next rail section supplied from the feeding car 50. At the welding station, the welded joint is tested in any well known manner, as for example, by a magnaflux process wherein the welded joint is magnetized by a coil surrounding the continuous rail and the joint is dusted with ferromagnetic particles. If the welded joint is satisfactory, the dusted particles will have a substantially uniform distribution while a non-uniform distribution is indicative of a defective weld which necessitates back-up of the rail by reversing the operation of the pusher mechanism. The back-up of the rail is, of course, accomplished by reversing the motor 667 of the pusher mechanism and at the same time reversing the drive of the power driven rollers 63 and 64 and the squeeze roller 71. The rail is backed up until the defective weld is located between the grinding equipment 55 and the welding apparatus 54, whereupon this weld is severed in the usual manner by employing an oxyacetylene torch either to cut the weld or to remove a section of the rail including the defective joint. The rail and the severed rail section are then backed up until they are centered in the welding apparatus and, at this time, they are joined by making a new weld in the manner indicated above.

The pusher mechanism 56 is effective to push the continuous rail through the testing station and onto a suitable rail receiving means, as for example, a train of flat cars located on the track adjacent to the welding car 51. Alternatively, of course, the welded rail may be passed onto suitable storage racks. In either case, rails up to a quarter mile in length are formed and are stored upon the rail receiving means so that they can be transported to the area where they are to be used. It will be understood that in use the quarter mile rails are joined together by conventional connecting plates with a slight spacing between the ends of adjacent rails in order to permit expansion or contraction of the rails in response to changes in temperature.

The motor 667 of the drive assembly for the pusher mechanism has associated therewith a spring set magnet brake for accurately stopping the rail at the end of its advancement by the pusher mechanism, and, while this brake is not visible in FIG. 35 it is referred to in the ensuing description of the electrical control circuit. This motor is of the two-speed, constant torque alternating current type and, to this end, includes high speed windings and low speed windings which may be selectively energized in order to advance the rail in a forward direction either at high speed or at low speed. The rail can be backed up only at high speed.

In operation, the rail is adapted to be moved from the welding apparatus 54 at the high speed until the new weld reaches the first grinding station 400 where the speed of travel of the rail is reduced to the low speed during the first grinding operation. After the new weld has passed through the first grinding station, the rail is again advanced at the high speed until the weld reaches the second grinding station 401. During passage of the weld through the second station the pusher mechanism is again rendered effective to move the rail at the low speed. After the weld moves through the second grinding station, the pusher moves the rail at high speed until the brake on the pusher mechanism is applied to stop the end of the continuous rail at the center of the welding and sheering apparatus.

The described rail movement may be accomplished either manually by operating suitable switches to energize the motor 667 at appropriate times to effect the slow down or speed up of the rail or, alternatively, automatic operation may be provided. For automatic operation, it is necessary to provide suitable mechanism for measuring the rail travel and for effecting the necessary control operations in proper sequence as the rail advances. To this end, one of the shafts of the squeeze tread 661, for example, the shaft 706 shown in FIG. 38 carries a sprocket 727 driving a chain 728 which, in turn, drives a sprocket 729 and a shaft 730 having mounted thereon one or more cams 725 engaging and opening a group of limit switches 726 in sequence. The switches are so arranged that they are opened at uniformly spaced intervals with each interval representing a given increment of movement of the rail. In accordance with one embodiment of the invention six switches are employed and each switch operation represents a two inch increment of travel of the rail. However, any number of these switches may be employed as determined by the increment of distance measurement desired and the number of cams 725 required to operate these switches will be determined by the space available for mounting the switches. Actually, a single cam will suffice if the number of switches used can be uniformly spaced about the cam periphery but, if not, two or more cams may be required. In any event, the switches 726 are connected in series with a power source and with coils 731, 732, 733 and 734 of counter devices $C_1$, $C_2$, $C_3$, $C_4$ and $C_5$. The circuit is energized from a power source which applies power through a normally closed set of relay contacts (not shown, but described later) of a relay which is energized when the pusher is reversed so that the set of contacts opens to prevent their operation while the rail is being backed up. Also included in the circuit to the coil of counter $C_5$ is a normally closed begin count limit switch LS–C5B which, as is shown in FIG. 1, is mounted in fixed position near the entrance end of the welding and shearing apparatus 54. This switch is opened when a rail section is disposed in the welding apparatus during the welding and shearing operations and reverts to its normally closed position as soon as the pusher mechanism 56 has moved the trailing end of the rail past the switch. Thus, when the welding and shearing operations are completed, the pusher mechanism immediately becomes effective to advance the rail at the high forward speed and immediately the counter devices $C_1$, $C_2$, $C_3$ and $C_4$ begin to count. Each of the counter devices counts the number of energizations of its associated coil as the circuit is alternately made and broken by opening the switches 726 in sequence and each counter is set to operate when it has completed its count by actuating one or more sets of counter contacts. The count required to operate the various counters may be adjusted in accordance with the spacing between the various components of the system and the counters $C_1$, $C_2$, $C_3$, $C_4$ and $C_5$ are set to complete their counts at different times. Thus counter $C_1$ is set to complete its count first and it is adjusted so that it operates its contacts when the new weld reaches a position adjacent the first grinding station 400. As will be described more fully hereinafter, the contacts of counter $C_1$ are effective to interrupt the circuit to the high speed winding of the pusher motor 667 and to complete a circuit to the low speed winding of this motor so that the rail is advanced at low speed after the counter $C_1$ completes its count. A short time later, the counter $C_2$ completes its count whereupon its contacts break the circuit to the low speed winding of the pusher motor and recomplete the circuit to the high speed winding. The counter $C_2$ is adjusted to complete its count as soon as the new weld on the rail has passed through the first grinding station and, hence, at this time the rail is again moved forward at high speed. Counter $C_3$ is adjusted to complete its count when the new weld reaches a position adjacent the second grinding head 401, at which time the contacts of this counter become effective to break the circuit to the high speed winding of the pusher motor and to recomplete the circuit to the low speed winding. Therefore, the rail progresses at slow speed until the counter $C_4$ completes its count, an event which occurs as soon as the new weld has passed through the second grinding station 401. The contacts of counter $C_4$ are effective at the completion of the count to break the circuit to the low speed winding of the pusher motor and to recomplete the circuit to the high speed winding so that the rail advances at high speed until the counter $C_5$ completes its count. The counter $C_5$ is adjusted so that its count is completed when the trailing end of the rail has moved from the switch LS–C5B to the center of the welding and shearing apparatus 54 and is in proper position for the next welding cycle to begin. The latter distance is, of course, constant irrespective of the length of the rail section and, as a result, the trailing end of the rail is accurately located at the center of the welder when the counter $C_5$ finishes its count even though the rail sections supplied from the rail supply car 50 are not uniform in length.

In this connection it should be observed that sometime during the operation of counters $C_1$, $C_2$, $C_3$ and $C_4$ the rail has moved out of engagement with limit switch LS–C5B to complete the circuit to the coil of counter $C_5$, thereby inducing this counter to begin its count. The exact time when the switch LS–C5B is closed depends upon the length of the rail section and, hence, is not fixed with respect to the operation of the other counters. In any event, when the counter $C_5$ has completed its count its contacts are effective to break the circuit to the high speed winding of the pusher motor so that the latter motor is no longer energized and also to apply the brake on the pusher mechanism in order to hold the rail in position to make the next weld.

*Loading Procedure*

To start the rail forming apparatus described above the rail sections must be fed through the equipment by the power driven rollers 63, 64 and 71 until a rail of sufficient length is formed to extend at least partially into the pusher mechanism 56 whereupon the latter can assume part of the rail handling burden. Thus, assuming that rail sections of standard or 39 foot length are employed, a first of the rail sections will lie upon the power driven rollers 63 and 64, a second rail section extends from the power driven roller 71 to the center or weld area of the welding and shearing apparatus 54 and a third of the rail sections extends from the center of the welding apparatus to the pusher mechanism 56. Therefore, to load the apparatus when the equipment is first set up, it is necessary to render the transfer and storage device 60 effective to deposit a first rail section upon the power driven rollers 63 and 64, to then move this rail section over the latter rollers and over the power driven roller 71 until it extends into the welding apparatus 54. At this time, of course, no weld is made since only one rail section is positioned in the welding apparatus. The transfer and storage device is then rendered effective to deposit a second rail section on the power driven rollers 63 and 64 whereupon the latter rollers and the power driven roller 71 are actuated to move both the first and second rail sections forward until the trailing end of the first rail section is centered in the welding apparatus and the leading end of the second rail section is located adjacent the trailing end of the first section. A weld is then made to join the first and second rail sections together and at this time the leading end of the first rail section should extend into the pusher mechanism if 39 foot rail sections are employed. In the event that shorter rail sections are being used the first rail section may extend only partly through the treads of the pusher mechanism 56 and, if so, a short filler rail may be employed to occupy the remaining tread area in order to permit the pusher mechanism to be operated. If the first rail section does not reach the pusher mechanism it will be necessary to deposit a third rail section upon the power driven rollers 63 and 64 and to advance all three of the rail sections by means of the power driven rollers 63, 64 and 71 until the first rail section has been moved into the pusher mechanism 56. In any event, as soon as the first rail section is moved through the treads of the pusher mechanism the latter takes over the major portion of the rail handling load.

Before the leading procedure described above can be performed the piston and cylinder assemblies 703 of the pusher mechanism 56 must be rendered effective to raise the squeeze tread 661 so that the latter does not engage the top of the rail during the threading or loading of the rails. The squeeze tread 661 may be raised by means of a suitable hand operated valve not shown in the drawings which is effective to admit fluid under pressure to the lower ends of the piston and cylinder assemblies 703, as viewed in FIG. 36.

To start the loading operation and even before the squeeze tread 661 can be raised, a main circuit breaker indicated by the reference numeral 900 in FIG. 40 is closed to connect three phase power lines 901, 902 and 903 to supply power to the control circuit. These lines supply power for energizing the motor 162 of the power driven roller 63, a corresponding motor 162–64 of the power driven roller 64, the motor 181 for the power driven squeeze roller 71, the motor 117 for the rail transfer unit 61, a corresponding motor 117–62 for the rail transfer unit 62, the motor 667 of the pusher mechanism, and a hydraulic power motor 904 for supplying a suitable fluid such as oil under pressure for the system as, for example, for the piston end cylinder assemblies 703 of the pusher mechanism 56 and for the piston and cylinder assembly 335 of the welding and shearing apparatus 54. Of course these motors are not energized until associated relay contacts in their respective energizing circuits are closed during the sequence of operation described below. Closing of the main circuit breaker 900 also connects power lines 901 and 902 directly across the primary winding of a power supply transformer 905 which has its secondary winding connected to energize an electrical control circuit indicated generally by the reference numeral 906. It should also be observed that the power lines 901, 902 and 903 and the energizing lines for each of the motors may be provided with suitable fuses and/or overload relays but in the interest of simplicity these have been eliminated from the drawings. When the main circuit breaker is closed power is applied across lines 907 and 908 thus illuminating an indicating light 909 in order to indicate that the circuit 906 has been supplied with power.

The hydraulic pump motor 904 is started by temporarily depressing a push button start switch 910 which connects the operating coil of a hydraulic motor relay HMR directly across the lines 907 and 908 through a manually operated push button stop switch 911 which must be depressed before it will open. Energization of the relay HMR is effective to close contacts HMR–1, HMR–2 and HMR–3 in order to supply power from the lines 901, 902 and 903 to the hydraulic pump motor 904. With the hydraulic pump motor running hydraulic fluid is available for raising the squeeze tread 661 through operation of the hand operated valve referred to above. Energization of the relay HMR also closes a set of contacts HMR–4 to lock the operating coil of the relay HMR across the lines 907 and 908 through the closed stop switch 911. Of course, the operation can be interrupted at any time by depressing the stop switch 911 to interrupt the circuit to the relay HMR so that the contacts of the latter relay revert to their normally open positions. Depression of the start switch 910 also results in energizing a push to test indicating light 912 to inform the operator that the hydraulic pump motor 904 is running. The indicating light 912 is connected through a push to test switch 913 having a movable pole 914 which may be depressed into engagement with a fixed contact 915 when it is desired to test the light 912. Obviously when the indicating light is depressed the movable pole 914 is effective to connect the light directly across the lines 907 and 908 and, if the indicating light fails to turn on, the operator is informed that the bulb is probably burned out and should be replaced.

When the hydraulic pump motor 904 is running the loading operation is continued by placing a manual-automatic switch 916 in the manual position illustrated in FIG. 41. With the switch 916 in the manual position a first switch section 917 is opened to prevent energization of an automatic cycle relay AR but a second switch section 918 is closed to connect the operating coil of a manual control relay MR directly across the lines 907 and 908. At the same time, a push to test indicating light 919, which is similar to the indicator 912 described above, is illuminated to inform the operator that the circuit is conditioned for manual operation. At this time, the rail storage and transfer unit 60 is rendered effective to place the first rail section on the power driven rollers 63 and 64 by temporarily depressing a push button cycle start switch 920 having a first switch section 920a which connects the operating coil of a rail transfer unit relay RTUR–61 across the lines 907 and 908 through normally closed contacts RCR–1 of a reverse control relay RCR (energized only during reverse operation), through a push button cycle stop switch 921, and through a set of normally closed contacts 174a of the limit switch 174 on the power driven roller 63. It will be recalled that the limit switch 174 is engaged only when a rail section is resting on the power driven rollers 63 and 64 and, hence, at the beginning of the loading procedure the contacts 174a are obviously closed. The reverse control relay is energized in a manner described more fully below only when it is desired to back up the rail to remove a defective weld or for other similar purposes and, as a result, the contacts RCR–1 will remain closed during the loading operation. Energization of the relay RTUR–61 closes contacts RTUR–61–1, RTUR–61–2 and RTUR–61–3 to connect the power lines 901, 902 and 903 to the electric motor 117 of the transfer unit 61 thus driving the transfer plate 115 so that the latter picks up a rail section and deposits it on the power driven rollers 63 and 64. When the cycle start switch 920 is depressed a second section 920b of this switch completes a circuit through the normally closed contacts 174a–64 of a limit switch 174–64 on the power driven roller 64 to energize the operating coil of a relay RTUR–62 controlling the operation of the rail transfer unit 62. When the relay RTUR–62 is energized its contacts RTUR–62–1, RTUR–62–2 and RTUR–62–3 are closed to complete a circuit from the power lines 901, 902 and 903 to the electric motor on the transfer unit 62. Obviously, with the electric motors of both of the transfer units 61 and 62 energized simultaneously, a rail section is lifted and placed on the power driven rollers 63 and 64. When the transfer plates of the units 61 and 62 are in the positions shown in FIG. 2, the plate 115 engages and actuates the limit switch 137 while the plate on the unit 62 engages a similar switch 137–62 but when the transfer plates are moved by temporary depression of the start switch 920, the normally closed contacts of these switches are closed. The contacts of the switch 137 complete a holding circuit through the now closed contacts of the relay RTUR–61–4 of the energized rail transfer unit relay so that the operating coil of the latter relay is locked across the lines 907 and 908 during the cycle of operation of the transfer unit. Similarly, the contacts of switch 137–62 close to complete a holding circuit through the now closed contacts RTUR–62–4 of the energized rail transfer unit 62 relay in order to hold the operating coil of the latter relay across the lines 907 and 908 during the cycle of operation of the transfer and storage device 60. After the transfer and storage units have placed a rail section on the power driven rollers 63, 64, the transfer plates of these two units complete their cycle and engage the limit switches 137 and 137–62 thus opening these switches and interrupting the holding circuits to the operating coils of the relays RTUR–61 and RTUR–62, respectively. Since the momentarily closed cycle start switch 920 has now been released to open its two switch sections 920a and 920b the energizing circuits for the operating coils of the relays RTUR–61 and RTUR–62 are broken and the contacts of these relays revert to their normally open positions, thus breaking the circuits to the two electric motors 117 and 117–62.

When the rail section is deposited on the power driven rollers the limit switches 174 and 174–62 on these rollers are engaged so that normally closed contacts 174a and 174a–62 are opened to prevent the transfer unit relays RTUR–61 and RTUR–62 from being energized as long as a rail section remains on the power driven rollers. A second set of contacts 174b and 174b–64 of the power driven roller limit switches are at this time closed to complete a circuit to a push to test indicator 925 which is thus illuminated to inform the operator that a rail section has been transferred to the power rollers and is in position to be advanced. The loading operation is then continued by momentarily depressing a manually operated All Rolls Jog Forward switch 928 which has two switch sections 928a and 928b. The switch section 928a completes a circuit through a master stop switch 929 and through the now closed contacts MR–1 of the manual control relay MR to the operating coil of a rollers forward control relay RFCR. The switch section 928b completes a circuit through the master stop switch 929, through the contacts MR–1 of the manual control relay MR, through the now closed contacts RFCR–1 of the rollers forward control relay RFCR, and through the normally closed contacts R63R–1 of a roller 63 reverse relay R63R to the operating coil of a roll 63 forward relay R63F. The relay R63R is energized only during reverse operation when it is desired to back up the rail and, hence, the contacts R63R–1 are closed at this time so that the relay R63F is energized. At the same time, switch section 928b completes a circuit through normally closed contacts R64R–1 of a roll 64 reverse relay R64R to the operating coil of a roll 64 forward relay R64F thus energizing the latter relay. The switch section 928b also completes a circuit through the now closed contacts MR–1, through contacts RFCR–2 of the rollers forward control relay RFCR, and through a set of normally closed contacts R71R–1 of a roll 71 reverse relay R71R to the operating coil of a roll 71 forward relay R71F thus energizing the latter relay. The relays R63F, R64F and R71F are thus energized simultaneously when the switch 928 is depressed. Contacts R63F–1, R63F–2, and R63F–3 of the relay R63F are closed to complete a circuit from the power lines 901, 902 and 903 to the electric motor 162 in order to drive the power roller 63 in the forward or rail advancing direction. At the same time, contacts R64F–1, R64F–2 and R64F–3 of the relay R64F are closed to energize the drive motor 162–64 so that the power roller 64 is driven in a forward direction. With the power rollers 63 and 64 both energized the rail section is advanced along the rail supply car 50 until it reaches a position adjacent the squeeze roller 71. This advancement will be continuous as long as the operator holds the switch 928 in closed position. Obviously, by alternately opening and closing the switch the rail can be advanced intermittently or, in other words can be jogged forward. Energization of the relay R71F, of course, closes contacts R71F–1, R71F–2 and R71F–3 to energize the motor 181 of the squeeze roller 71 thus driving the latter roller in a forward direction to advance the rail section into the welding car 50. Here again by maintaining the switch 928 closed the advancement of the rail section through squeeze roller 71 may be continuous and, by alternately opening and closing the switch, intermittent advancement can be obtained.

As the rail section advances it engages the limit switch 226 on the squeeze roller 71 but this has no effect on the circuit until the rail section reaches a point where it engages and closes the limit switch 227. With the limit switches 226 and 227 both closed and with the relay R71F energized, a circuit is completed through the two limit switches and through the closed contacts R71F–4 of the roll 71 forward relay R71F to a solenoid 931 controlling the operation of a valve interposed in the circuit between the fluid pressure source and the piston and cylinder assembly 221. When the solenoid is energized fluid under pressure is admitted to the upper end of the piston and cylinder assembly 221 to force the upper roller 212 into engagement with the top running surface of the rail. The squeeze roller 212 may also be lowered manually by closing a squeeze control switch 930 to complete a circuit to the solenoid 931 whenever either of the relays R71F or R71R is energized. In automatic operation, the roller 212 is raised as soon as the trailing end of the rail moves beyond the limit switch 226 (for forward operation) since the circuit to solenoid 931 is then broken with the result that the piston and cylinder assembly retracts.

When the rail section has been moved beyond the power driven rollers 63 and 64, the two switch sections of each of the limit switches 174 and 175–64 revert to their normal positions so that the transfer device can again be operated to place a new rail section on the power driven rollers. This, of course, is accomplished by again depressing the cycle start switch 920 which causes the circuit to operate in the manner described above to place a second rail section on the power driven rollers 63 and 64. By depressing the switch 928, the second rail section is then moved forward until its butt end engages the trailing end of the first rail section. The two rail sections are then advanced until their abutting ends are centered in the welding apparatus 54. The first weld can then be made and sheared either manually or automatically through operation of the circuit in a manner which will be described more fully hereinafter. After the first weld has been made, the leading end of the first rail section will extend into the pusher mechanism 56 if this rail section is of standard 39 foot length. If the first rail section extends into the pusher mechanism the squeeze tread 661 is lowered by operating the manually controlled valve referred to above to supply fluid under pressure to the upper ends of the piston and cylinder assemblies 703. In the event that the first rail section extends only partly through the treads of the pusher mechanism a short filler length of rail is inserted since the squeeze tread should not be lowered unless either a rail section of a combination of a part of a rail and the above described filler extends entirely through the treads.

If, on the other hand, the first rail section does not extend into the pusher mechanism 56 after the first weld has been made, the first and second rail sections, which are now welded together, are moved forward by using the rail storage and transfer device 60 to place a third rail section upon the power driven rollers 63 and 64 and by then depressing the switch 928 to advance the third rail section until it engages and pushes the first two rail sections forward. When the first two rail sections have been pushed forward a sufficient distance so that the leading end of the first rail section extends through the treads 660 and 661 of the pusher mechanism, the squeeze tread 661 of the latter mechanism is lowered and the apparatus is loaded for operation.

As indicated previously, the rail sections are welded together in end to end relationship to form a continuous rail having a length up to a quarter of a mile. After the first such quarter mile length is formed it is not necessary to reload the apparatus since the end of such a quarter mile strip is adapted to be connected through suitable detachable plates to the first rail section to be used in forming the next quarter mile length. These plates are bolted to the two rails and they permit the pusher mechanism to act upon the first quarter mile strip to draw the new rail section through the equipment in order to form the first weld for the new rail length. After the pusher mechanism has pushed the bolted together rails past the testing station, the detachable plates can be removed in order to separate the two ends of the rails.

*Manual Cycle of Operation*

Assuming that the loading operation has been completed, the entire system can be operated either manually or automatically and the manual operation will be considered first. This operation is effected by placing the Manual-Automatic switch 916 in the manual position to energize the relay MR in the manner indicated above and to illuminate the manual indicating light 919. A new rail section is transferred from the rail storage and transfer device 60 onto the power driven rollers 63 and 64 by depressing the Cycle Start switch 920 with the results indicated above. When a new rail section has been placed on the power driven rollers the continuous rail formed by the previous weld is advanced by rendering the pusher mechanism 56 effective to move the rail forward at high speed until the newly formed weld reaches the first grinding station 400. The pusher mechanism is rendered effective in manual operation by depressing a manually operated Pusher Forward switch 933 (FIG. 41) which includes a switch section 933a for completing an energizing circuit to the operating coil of a forward control relay FCR from line 907 through the Master Stop switch 929, through a normally closed set of contacts FACR-1 of a forward automatic control relay FACR which is deenergized when the circuit is conditioned for manual operation, through now closed contacts MR-3 of the manual control relay MR and through a set of normally closed contacts RCR-4 of the reverse control relay RCR referred to above. Energization of the relay FCR closes contacts FCR-1 to bypass the Pusher Forward switch 933 so that the latter switch can be released without breaking the circuit to the relay FCR. Contacts FCR-2 also close to complete a circuit through the normally closed contacts DR-1 of a drive reverse relay DR to the operating coil of a drive forward relay DF. Energization of the relay DF opens normally closed contacts DF-1 to prevent operation of the drive reverse relay and, at the same time, closes its contacts DF-3, DF-4 and DF-5, thus connecting power lines 903 and 902 to a solenoid 934 (FIG. 40) controlling the operation of the brake for the pusher mechanism. When the solenoid 934 is energized the brake is released to permit movement of the rail by the pusher mechanism. Energization of the relay DF also closes contacts DF-2 to complete a circuit through the now closed contacts FCR-3 of the forward control relay FCR, through a set of normally closed contacts SDCR-1 of a slow down control relay SDCR, which will be described more fully hereinafter, through the now closed contacts MR-4 of the energized manual control relay MR and through normally closed contacts PSS-1 of a pusher slow speed relay PSS to the operating coil of a pusher high speed relay PHS. When the relay PHS is energized, its contacts PHS-1, PHS-2 and PHS-3 are closed to connect the lines 901, 902 and 903 through closed contacts DR-3, DF-4 and DF-5 of the drive forward relay DF to the high speed winding of the pusher motor 667. The latter circuit is effective to operate the pusher motor to turn the drive tread 660 at relatively high speed in order to advance the continuous rail 322 at high speed until the welded joint 344 reaches a position just in advance of the first grinding station 400 whereupon the operator depresses a manually operated Pusher Forward Slow switch 935. When the latter switch is closed a circuit is completed from the line 907 through the Master Stop switch 929, through the now closed contacts MR-5 of the manual control relay MR, through the normally closed section 933b of the Pusher Forward switch 933, which has, at this time, been released and has reverted to its normal position, through the closed section 936b of a Pusher Jog Forward switch 936 to the operating coil of a slow down control relay SDCR. The latter relay is thus energized to close its contacts SDCR-2 in order to bypass the Pusher Forward Slow switch 935 so that the latter may be released without breaking the circuit to the relay SDCR. Energization of the relay SDCR also opens the normally closed contacts SDCR-1 referred to above, thereby breaking the circuit to the pusher high speed relay PHS with the result that the contacts PHS-1, PHS-2 and PHS-3 of the latter relay revert to their normally open positions to break the circuit to the high speed winding of the pusher motor 667. The circuit energizing the solenoid 934 is not broken since the relay DF remains energized and, hence, the brake for the pusher mechanism is not applied. Energization of the relay SDCR also closes contacts SDCR-3 to complete an energizing circuit for the operating coil of the pusher slow speed relay PSS through the now closed contacts DF-2 and through the now closed contacts FCR-4 of the forward control relay FCR. When the relay PSS is energized, its contacts PSS-1, PSS-2 and PSS-3 are closed to connect the low speed winding of the pusher motor 667 through the closed contacts DF-3, DF-4 and DF-5 to the power lines 901, 902 and 903, thereby rendering the pusher motor effective to drive the tread 660 at slow speed in order to advance the weld through the first grinding head at a low speed suitable for performing the grinding operation. After the weld 344 has passed beyond the first grinding head 400, the Pusher Forward switch 933 may again be depressed. The switch section 933a has no effect on the energizing circuit for the relay FCR since the latter relay remains energized through closed contacts FCR-1 but the second switch section 933b opens to break the energizing circuit to the slow down control relay SDCR with the result that the contacts of the latter relay revert to their normal positions. Thus, contacts SDCR-3 open to break the energizing circuit to the relay PSS so that the slow speed winding of the pusher motor 667 is no longer energized. Contacts SDCR-1 return to their normally closed positions to again complete the circuit to the high speed relay PHS so that the contacts PHS-1, PHS-2 and PHS-3 are closed to energize the high speed winding of the pusher motor. The pusher motor is thus rendered effective to drive the tread 660 at high speed and the continuous rail, therefore, advances rapidly while the weld passes from the first grinding station 400 to the second grinding station 401. When the welded joint 344 is located just in advance of the second grinding station 401, the operator again depresses the Pusher Forward Slow switch 935 to recomplete the circuit to the slow down control relay SDCR, thus opening contacts SDCR-1 to break the circuit to the high speed relay PHS and closing contacts SDCR-3 to recomplete the circuit to the slow speed relay PSS. Obviously, with the high speed relay deenergized and the slow speed relay reenergized, the pusher motor is rendered effective to drive the tread 660 at slow speed and, as a result, the rail moves forward slowly while the weld passes through the second grinding station 401. After the weld passes through the second grinding station the operator again depresses the Pusher Forward switch 933 to break the circuit to the slow down control relay SDCR so that the high speed pusher drive is again established in a manner which will be obvious in view of the foregoing description.

When the pusher has moved the continuous rail until the trailing end is centered in the welding apparatus 54, the operator pushes the Master Stop switch 929 in order to stop the pusher motor. More specifically, when the Master Stop switch 929 is depressed, the relays FCR and DF are both deenergized whereupon contacts DF-4 and DF-5 are opened to break the energizing circuit to the solenoid 934 whereupon the brake on the pusher mechanism is applied to terminate the advancement of the rail. In the event that the trailing end of the continuous rail has not advanced far enough to be properly centered within the welding apparatus, the operator may jog the continuous rail forward by using the Pusher Forward switch 933 and the Master Stop switch 929 to move the continuous rail forward in steps or jogs. In the event that the continuous rail must be backed up to center its trailing end within the welding apparatus, a manually operated, temporarily closed Pusher Reverse switch 937 can be employed. The latter switch includes a switch section 937a which, when closed, completes a circuit through the Master Stop switch 929, through the normally closed contacts FACR–1 of the now deenergized forward automatic control relay through normally closed contacts FCR–5 of the now deenergized forward control relay FCR, through the now closed contacts MR–6 of the manual control relay MR and through a normally closed set of contacts AR–1 of the automatic control relay to energize the operating coils of the relays R63R and R64R. It will be recognized that the relay AR is in deenergized condition for manual operation and, hence, the contacts AR–1 are closed. Also the energizing circuits to the relays R63R and R64R, respectively, include contacts R63F–4 and R64F–4 of the roller 63 forward relay R63F and the roller 64 forward relay R64F but these contacts are closed at this time because the drive rollers are not being driven in a forward direction. Depression of the switch 937 also completes an energizing circuit to the relay R71R through normally closed contacts R71F–5 so that the latter relay is energized. When the three relays R63R, R64R and R71R are energized, they respectively close contacts R63R–4, R64R–4, and R71R–5 thus completing a circuit to the reverse control relay RCR. When relays R63R, R64R and R71R are energized, they close contacts R63R–1, R63R–2, R63R–3, R64R–1, R64R–2, R64R–3, R71R–1, R71R–2 and R71R–3 with the result that the motors 162, 162–64 and 181 are energized for reverse drive. Energization of the relay RCR closes its contacts RCR–5 to bypass the switch section 937a so that the switch 937 may be released without breaking the circuits to relays R63R, R64R, R71R and RCR. When the relay RCR is energized, its contacts RCR–4 are opened to prevent the forward control relay FCR from being energized during the reverse movement of the rail. At the same time, contacts RCR–2 are closed to complete a circuit through the normally closed contacts DF–1 of the deenergized drive forward relay DF to the operating coil of the drive reverse relay DR. With the relay DR energized, its contacts DR–2 are closed to complete a circuit through the now closed contacts RCR–3 of the reverse control relay RCR, through the now closed contacts MR–4 of the manual control relay and through the normally closed contacts PSS–1 of the deenergized pusher slow speed relay PSS to the operating coil of the pusher high speed relay PHS. When the relay DR is energized, its contacts DR–3, DR–4 and DR–5 (FIG. 40) close to connect the brake solenoid 937 across the power lines 901 and 902 so that the brake on the pusher motor is again released. With the relay DR and the relay PHS both energized, the high speed winding of the pusher motor 667 is connected to the power lines 901, 902 and 903 but the connection is effectively reversed from the forward drive condition and, as a consequence, the pusher motor drives the tread 660 in reverse and at high speed thus backing up the continuous rail. The power driven rollers 63 and 64 and the squeeze roller 71 are also operated in reverse at this time to move the rail section rearwardly in order to permit the continuous rail to be backed up by the pusher mechanism 56. When the continuous rail has been backed up for sufficient distance to center the trailing end of the rail within the welding apparatus, the Master Stop switch 929 is depressed to break the energizing circuits to the relays RCR and DR so that the pusher motor 667 and the motors 162 and 162–64 for the power driven rollers 63 and 64 and the motor 181 for the squeeze roller 71 are no longer energized. Obviously, by selective operation of the Pusher Forward switch 933, the Pusher Reverse switch 937 and the Master Stop switch 929, the trailing end of the continuous rail may be properly positioned within the welding apparatus. At this time, the new rail can be moved into position by depressing the All Rolls Jog Forward switch 928 with the results described above.

When the trailing end of the continuous rail and the leading end of the new rail section are properly positioned in end to end relationship at the center of the welding and shearing apparatus 54, the stationary clamps and the movable clamps of the welding and shearing apparatus are adjusted in the manner described above to obtain a proper alignment between the two rail sections to be welded together. When these rail sections have been aligned, the welding operation may be carried out either manually or automatically. These two modes of operation of the welding apparatus have been considered in detail below.

*The Manual Welding Cycle*

When the ends of the two rails to be joined together are centered within the welding and shearing apparatus 54, a Weld Cycle Begin limit switch LS–WCB is closed by engagement with the leading end of the new rail section and the welding cycle can proceed either automatically or manually. As indicated above, the weld cannot be made until the rail sections are properly aligned and, if a manual aligning procedure is employed, the stationary and movable clamps of the welding and shearing apparatus are moved into engagement with the rails and the alignment is checked with a suitable gauge or other measuring instrument. As is shown in FIG. 43 of the drawings, the stationary clamps are moved into engagement with the rails by temporarily operating a push button switch 940 which completes a circuit through a set of normally closed contacts SCR–1 of a stationary clamp retract relay SCR to the operating coil of a stationary clamp apply relay SCA, thereby connecting this relay directly across the lines 907 and 908. When the relay SCA is energized, its contacts SCA–1 close to bypass the switch 940, thereby preventing interruption of the energizing circuit to the relay SCA when the latter switch is released. A set of contacts SCA–2 of the relay SCA also close to complete a circuit to a solenoid SC for opening the valving associated with this solenoid, thereby admitting fluid to the piston and cylinder assemblies associated with the stationary clamps so that these clamps are moved into engagement with the continuous rail 322. Separate controls may be employed for the pair of vertical stationary clamps and for the pair of horizontal stationary clamps but, in the interest of simplicity, a single control has been illustrated in FIG. 43. The solenoid SC and its associated valving are of the single acting type and, hence, return automatically to the closed or off position to retract the stationary clamps whenever the circuit to the solenoid SC is broken.

In similar manner, the movable clamps mounted on the carriage 321 may be moved into engagement with the rail section 67 by depressing a temporarily operated, manually controlled switch 941 to complete a circuit through a set of normally closed contacts MCR–1 of a movable clamp retract relay MCR to the operating coil of a movable clamp apply relay MCA, thereby connecting this relay across the lines 907 and 908. When the relay MCA is energized, its contacts MCA–2 close to bypass the switch 941 so that the circuit to the relay MCA is maintained even though the switch 941 is released. Energization of the relay MCA also closes contacts MCA–1 to complete a circuit to a movable clamp apply solenoid MCAS. The latter solenoid controls the valving for admitting fluid under pressure to the vertical clamps 325 and 326 and to the horizontal clamps including the clamp 350 so that these clamps are moved into engagement with the rail section. Here again, separate controls may be provided for the pair of vertical clamps and for the pair of horizontal clamps although a single control has been illustrated in the drawings. The solenoid MCAS and its associated valving are of the double acting type so that they remain open until returned by energizing a solenoid MCRS in a manner described below. After the stationary and movable clamps have been applied, the alignment of the two rails is checked and, in the event that the alignment is incorrect, the stationary clamps and the movable clamps are retracted. The stationary clamps are retracted by depressing a manually operated switch 942 to complete a circuit to the stationary clamp retract relay SCR, thus opening contacts SCR-1 and interrupting the circuit to the relay SCA. When the relay SCA is deenergized, its contacts SCA-1 open to remove the bypass from the switch 940 and the contacts SCA-2 open to interrupt the circuit to the solenoid SC so that the valving associated with the latter solenoid is automatically rendered effective to retract the stationary clamps. In similar manner, the movable clamps are retracted by depressing a switch 943 to complete a circuit to the movable clamp retract relay MCR which, when energized, breaks contacts MCR-1 to interrupt the energizing circuit for the relay MCA. When the relay MCA is deenergized, its contacts MCA-2 open to remove the bypass from the switch 941 and its contacts MCA-1 also open to interrupt the energizing circuit to the solenoid MCAS. At the same time, a set of contacts MCR-3 of the relay MCR close to energize the movable clamp retract solenoid MCRS so that the valving associated with the latter solenoid causes the movable clamps to retract. At this time, the stop members of one or more of the pairs of clamps are adjusted in an attempt to align the rails properly. After the adjustment is made, the stationary clamps and the movable clamps are reapplied in the manner indicated above and the alignment is rechecked. This procedure is repeated until the alignment falls within the allowable tolerance whereupon the welding can proceed.

To start the welding operation, the electrodes are moved into engagement with the rails by manually depressing a temporarily closed switch 944 to complete a circuit to a solenoid E controlling the valving for admitting fluid to the piston and cylinder assemblies associated with the welding electrodes. When the solenoid E is energized the welding electrodes are extended until they engage the rail whereupon the switch 944 is released. At this time, the electrodes, the stationary clamps and the movable clamps are all applied to close their associated applied limit switches. Thus, limit switches LSEA-1 and LSEA-2 associated with the two pairs of electrodes are closed, limit switches LSCA-1, LSCA-2, LSCA-3 and LSCA-4 associated with the stationary clamps are closed and limit switches LSMCA-1, LSMCA-2, LSMCA-3 and LSMCA-4 associated with the movable clamps are closed. When the limit switches LSEA-1, LSEA-2, LSSCA-1, LSSCA-2, LSSCA-3 and LSSCA-4 are closed a circuit is completed through a set of normally closed contacts WCO-3 of a weld cycle over relay WCO to be described more fully hereinafter to the operating coil of an electrode current relay EC. The latter relay is thus energized to close its contacts EC-1 in order to connect the primary winding of an electrode current supply transformer 945 across the lines 907 and 908. The secondary winding of the latter transformer supplies current to the welding electrodes. Energization of the relay EC also closes contacts EC-2 to complete a circuit to a flashing cycle timer T which is adapted to close timing contacts T-1 in order to complete a circuit through the closed limit switches LSMCA-1, LSMCA-2, LSMCA-3 and LSMCA-4 to the operating coil of a movable platen apply relay MPA. The latter relay when energized closes contacts MPA-2 to complete a circuit to a movable platen solenoid MP which controls valving for admitting fluid under pressure to the piston and cylinder assembly 335 in order to advance the movable platen. The timer T and the associated solenoid MP are of the type described in the above identified Schlatter et al. Patent No. 2,781,026 and they function to reciprocate the carriage 321 as it is advanced in order to flash the ends of the rails by drawing arcs therebetween, thereby heating the ends until they are in condition to be joined together whereupon the movable carriage is advanced by the piston and cylinder assembly 335 with great force to force the ends of the rails together. At this point, the shearing can be accomplished automatically or manually but the manual controls have been eliminated from the drawings and the automatic operation of the shearing mechanism is described more fully below in conjunction with the automatic operation of the welding apparatus.

*The Auatomatic Cycle—General Operation*

Considering next the automatic cycle of operation and referring first to FIG. 39 of the drawings, it should be observed that actually four complete welding cycles are required to move a single rail section from the rail storage and transfer device 60 through the weld testing station at the exit end of the welding car 51. Thus, FIG. 39 shows a timing chart wherein the different solid horizontal lines indicate different operations being performed during various portions of the cycle. These horizontal lines are merely indicative of the sequence of operation, however, since no attempt has been made to draw them to scale. The numbers 1 to 7 arranged vertically one above the other at the left side of the chart represent the welds or the rail sections acted upon by the system. The time is divided into four different cycles as will be explained more fully hereinafter since, as indicated above, four complete cycles are required to move the rail section No. 4 from the storage bed on the rail transfer unit 60 through the testing station. More specifically, when the system has been loaded and is cycling automatically the weld at the leading end of the rail section No. 1 is located in the testing station where the magnaflux test operation is performed during the period indicated by the horizontal line 800. At this time, rail section No. 2 extends from the welding apparatus 54 to the pusher mechanism 56 and its trailing end is being welded to the leading end of the third rail section (indicated as No. 3). The period required for aligning the rail sections Nos. 2 and 3, welding their ends together and shearing the upset is indicated by the horizontal line 801 in FIG. 39. At the completion of the welding and shearing operation, the pusher mechanism 56 is rendered effective to move the weld between rail sections Nos. 2 and 3 forward through the grinding stations 400 and 401 during a time period indicated by the horizontal line 802. While the weld between rail sections Nos. 2 and 3 is being made, the rail storage and transfer device 60 is being rendered effective to supply a fourth rail section No. 4 during the period indicated by the horizontal line 803. When the pusher mechanism is rendered effective to move the weld between rail sections Nos. 2 and 3 forward, the power driven rollers 63 and 64 and the squeeze roller 71 are effective to advance the rail section No. 4 until its leading end is centered in the welding apparatus, this particular period of operation being indicated by the line 804.

At the beginning of the next cycle of operation, indicated as cycle No. 2, the rail section No. 4 is joined to the trailing end of the continuous rail by an aligning, welding and shearing procedure indicated by the line 805. While this weld is being made, the welded joint between the rail sections Nos. 1 and 2 is located in the test station where the magnaflux testing procedure is being carried out as indicated by the line 806. After the latter test on the weld has been completed and while the rail section No. 4 is being welded to the trailing end of rail section No. 3, the rail transfer and storage device 60 is again rendered effective to transfer a new rail section No. 5 to the power driven rollers, this operation being indicated by line 807. After the welding and shearing of the joint between the rail sections Nos. 3 and 4 have been completed, the pusher mechanism 56 is again rendered effective to advance the continuous rail so that the weld between sections Nos. 3 and 4 is moved through the grinding stations in the manner indicated above, this operating being indicated by the line 808. At the same time, the power driven rollers are effective to advance the rail section No. 5, an operation which is indicated by the line 809. During the third cycle of operation, the leading end of the fifth rail section is welded to the trailing end of the fourth rail section as indicated by the line 810. The weld on the leading end of the fourth section is, at this time, located near the pusher mechanism 56 and, hence, no operation is performed on this weld during the third cycle. However, the welded joint between the second and third rail sections is located in the testing station as indicated by the line 811. After the test on the latter joint has been completed, the rail transfer device 60 places rail section No. 6 upon the power driven rollers as indicated by the reference numeral 812. The pusher mechanism then advances the weld between the rail sections Nos. 4 and 5 through the grinding equipment during the period indicated by the line 813 and, at the same time, as indicated by the line 814, the power driven rollers advance rail section No. 6 until the leading end of this rail section is centered within the welding apparatus. When the pusher mechanism is operated during the period indicated at 813, the welded joint between the third and fourth rail section is moved to the test station and, during the fourth cycle of operation, this joint is subjected to the magnaflux test, an operation which is carried out during the period indicated by the line 815. At the same time, as is indicated at 816, the rail sections Nos. 5 and 6 are welded together and the rail transfer device becomes effective as indicated at 817 to place a seventh rail section on the power driven rollers. When the fifth and sixth rail sections have been welded together, the pusher mechanism advances as indicated at 818 and the power driven rollers function during the period represented by line 819 to advance the seventh rail section to the welding apparatus, thus completing the fourth cycle of operation. At this point, that is, at the end of four complete cycles of operation, the fourth rail section has passed completely through the system, and the operation then continues in a manner which will be evident in view of the foregoing description.

*The Welding and Shearing Cycle—Automatic*

The welding and shearing cycle is ready to begin as soon as the end of the continuous rail and the end of the next rail section are properly positioned within the welder and when the continuous rail is stopped at the proper position within the welding apparatus by application of the brake in the pusher mechanism in the manner described above. The circuit for effecting the automatic operation is shown in FIG. 43 while the sequence of operation of the various relays is illustrated in FIG. 44. As was indicated previously, the pusher brake was applied when the counter C5 completed its count at the close of the preceding cycle to close its counter contacts C5-2 and to open its normally closed counter contacts C5-1. The counter C5 is of the type which maintains its contacts C5-1 and C5-2 in their energized positions until the counter is reset by energizing its reset coil C5RC at the completion of the welding and shearing cycle in a manner which will become evident as the description proceeds. When the next rail section moves into the welding apparatus its end engages and closes a Weld Cycle Begin limit switch LS-WCB located in the welding apparatus 54, thereby cooperating with counter contacts C5-1 to indicate that the rails are in position for the weld. At this time, the rail sections are aligned. If this alignment is performed manually a push button switch 947 is temporarily depressed while if the alignment is performed automatically by means of aligning jigs or dies (not shown) a relay contact or limit switch 948 is automatically closed as soon as the ends of the rails are aligned. When the limit switch LS-WCB is closed and when either of the switches 947 or 948 is closed, a circuit is completed through the closed contacts C5-2 of the counter C5 and through a set of normally closed contacts WCO-1 of the weld cycle over relay WCO referred to above to energize a start weld relay SWR. Energization of relay SWR closes its contacts SWR-4 to bypass the switches 947 and 948 during the welding portion of the cycle. When the relay SWR is energized its contacts SWR-1 also close to energize the relay SCA which, in turn, closes its contacts SCA-1 to connect stationary clamp solenoid SC across the lines 907 and 908 to apply the stationary clamps in the manner indicated above. These stationary clamps remain applied until the completion of the welding and shearing cycle. Another set of contacts SWR-2 of the start weld relay completes a circuit to the movable clamp apply relay MCA which closes its contacts MCA-1 to energize the solenoid MCAS so that the movable clamps are applied in the manner indicated above. The solenoid MCAS is of the double acting type and holds its associated valve in applied condition until the valve returning solenoid MCRS is energized in a manner described below. An additional set of contacts SWR-3 of the start weld relay functions, when closed, to connect an electrode applying solenoid E across lines 907 and 908. The solenoid E and its associated valving control the extension and retraction of the two pairs of welding electrodes and they are of the single acting type since they are biased to return to their closed or off position whenever the energizing circuit to the solenoid E is broken. When the solenoid E is energized it is moved to its open position to admit fluid under pressure to the cylinders of the electrodes in order to extend the electrodes until they engage the continuous rail and the movable rail section in the manner described above. When the electrodes reach their applied positions, limit switches LSEA-1 and LSEA-2 are closed. Similarly, when the stationary clamps reach their applied positions by energization of the solenoid SC, limit switches LSSCA-1, LSSCA-2, LSSCA-3 and LSSCA-4 are closed to complete a circuit through the closed contacts WCO-3 of the weld cycle over relay WCO to an electrode current relay EC. Energizaton of the relay EC completes a circuit through its contacts EC-1 to connect the primary winding of the weld current transformer across the lines 907 and 908. The secondary winding of this transformer is connected to the electrodes so that current flows through the ends of the continuous rail and the rail section during the flashing and welding operation described above. Energization of the relay EC also closes its contacts EC-2 to complete a circuit to a timing device T which serves to maintain the current flow to the electrodes for a predetermined period sufficient to complete the welding operation. At the end of this predetermined period, the timing device T becomes effective to close its contacts T-1 and T-2. When the contacts T-1 are closed a circuit is completed through the closed electrode applied limit switches LSEA-1 and LSEA-2, through the closed stationary clamp applied limit switches LSSCA-1, LSSCA-2, LSSCA-3 and LSSCA-4, and through the closed movable clamp applied limit switches LSMCA-1, LSMCA-2, and LSMCA-3 and LSMCA-4 to a movable platen applied relay MPA. It will be understood that the limit switches LSMCA-1, LSMCA-2, LSMCA-3 and LSMCA-4 were previously closed when the movable clamp apply solenoid MCAS was energized, and hence, the closing of the timer contacts T-1 connects the operating coil of the relay MPA directly across the lines 907 and 908. Energization of the relay MPA closes its normally open contacts MPA-2 to complete a circuit to the solenoid MP which cooperates with the timer T to reciprocate the carriage 321 and to make the weld in the manner previously described. When the movable platen is moved forward to complete the welding operation, it closes the limit switch LSMPA which has two sets of contacts LSMPA-1 and LSMPA-2. When the limit switch contact LSMPA–1 is closed, a circuit is completed through the closed contacts T–2 of the timer to the operating coil of the weld cycle over relay WCO. Energization of the relay WCO marks the end of the welding operation and causes the following events to take place:

(a) Normally closed contacts WCO–1 are opened to break the circuit to the start weld relay SWR so that the contacts SWR–1, SWR–2, SWR–3 and SWR–4 revert to their normally open positions.

(b) Normally open contacts WCO–2 close to maintain current flow to the relay SCA and, hence, to the stationary clamp solenoid SC so that the stationary clamps remain applied.

(c) Normally closed contacts WCO–3 open to break the circuit to the operating coil of the electrode current relay EC thus opening contacts EC–1 to break the circuit to the current transformer for the welding electrodes and also breaking contacts EC–2 to interrupt the circuit to the timer T.

(d) Normally open contacts WCO–4 close to energize a timer reset coil TR in order to reset the timer which then opens its contacts T–1 and T–2.

(e) Contacts WCO–5 are closed to lock the relay WCO across the lines 907 and 908 through normally closed contacts SCO–1 of a shear cycle over relay SCO to be described more fully hereinafter. The relay WCO remains locked across the lines 907 and 908 for the remainder of the cycle so that the start weld relay SWR cannot be reenergized.

(f) Contacts WCO–6 close to complete a holding circuit through contacts MPA–1 of the energized movable platen applied relay MPA and through a set of normally closed contacts MPR–2 of the movable platen retract relay MPR, thus locking the relay MPA across lines 907 and 908.

When the start weld relay SWR is deenergized, its contacts SWR–3 are opened to interrupt the circuit to the electrode apply solenoid E. As was indicated above, the solenoid E and its associated control valve are of the single acting type and, hence, when the energizing circuit to the solenoid is broken, the valve returns to the closed or off position to retract both pairs of electrodes. Since the start weld relay cannot be energized for the remainder of the cycle, the electrodes remain in retracted position throughout the remainder of the cycle.

When the contacts WCO–5 are closed, at the completion of the welding operation, a circuit is completed through the normally closed contacts SBC–1 of a shear box cycle relay SBC and through the closed contacts of switch section LSMPA–2 of the movable platen applied limit switch to the operating coil of a movable clamp retract relay MCR. It will be understood that switch section LSMPA–2 is closed at this time since the movable platen was advanced at the end of the welding cycle. When the relay MCR is energized, its contacts MCR–2 close to complete a holding circuit through a set of normally closed contacts SBI–3 of a shear box in relay SBI to be described more fully hereinafter. The described holding circuit serves to hold the operating coil of the relay MCR across the line until the relay SBI is energized. When the relay MCR is energized, its normally closed contacts MCR–1 are opened to interrupt the circuit to the operating coil of the movable clamp apply relay MCA. Contacts MCA–1 thus revert to their normally open positions to break the energizing circuit to the movable clamp apply solenoid MCAS. At the same time, a set of normally open contacts MCR–3 are closed to connect the movable clamp retract solenoid MCRS across the line. When the solenoid MCRS is energized, the control valving for supplying fluid to the movable clamps is rendered effective to move these clamps from their applied positions to their retracted positions. Energization of the relay MCR also closes normally open contacts MCR–4 but this has no effect on the circuit operation in view of the fact that contacts SBI–8 are opened.

When the movable clamps reach their fully retracted positions, movable clamp retract limit switches LSMCR–1, LSMCR–2, LSMCR–3 and LSMCR–4 are closed to complete a circuit through a set of normally closed contacts SBC–2 of the deenergized shear box cycle relay SBC and through the now closed limit switches LSER–1 and LSER–2 to the operating coil of a movable platen retract relay MPR. Limit switches LSER–1 and LSER–2 were previously closed when the pairs of electrodes were retracted in response to opening of the relay contacts SWR–3. Energization of the relay MPR opens normally closed contacts MPR–1 but this has no effect on the circuit operation in view of the fact that contacts SBI–2 are at this time open. However, opening of the normally closed contacts MPR–2 breaks the holding circuit to the operating coil of the relay MPA so that this relay is deenergized and its contacts MPA–1 and MPA–2 revert to their normally open positions. It will be understood that the timer contacts T–1 and the limit switches LSEA–1 and LSEA–2 are, at this time, opened to prevent energization of the relay MPA. When the contacts MPA–2 are opened, the energizing circuit for solenoid MP is interrupted so that the control valve for the movable platen returns to its closed or off position to retract the movable platen or carriage 321. When the movable carriage reaches its fully retracted position, the limit switch LSMPR having two switch sections LSMPR–1 and LSMPR–2 is actuated to close both sections of the switch. Section LSMPR–1 has no effect on the circuit operation in view of the fact that contacts SBI–4 are, at this time, open but the closing of switch section LSMPR–2 completes a circuit to the shear box cycle relay SBC. Energization of the relay SBC closes its contacts SBC–3 to complete a holding circuit through normally closed contacts SCO–2 of the shear cycle over relay SCO. Thus, the shear box cycle relay SBC remains energized throughout the remainder of the shearing cycle. Normally closed contacts SBC–1 are opened but this has no effect on the circuit operation since the movable clamp retract relay MCR is, at this time, locked across the line through the holding circuit including contacts MCR–2 and SBI–3. The purpose of the contact SBC–1 is to isolate limit switch section LSMPA–2 from the circuit during the shearing portion of the cycle. Normally closed contacts SBC–2 are opened to break the circuit to the operating coil of the relay MPR so that the contacts of the latter relay return to their normal positions. Thus, contacts MPR–1 and MPR–2 revert to their normally closed positions but neither of these contacts affects the circuit operation in view of the fact that they are both connected in series with switch contacts which are, at this time, open. Similarly, contacts MPR–3 and MPR–4 return to their normally open positions but they do not affect the circuit operation since each is connected in series with a normally open set of contacts of the now deenergized shear box in relay SBI. Energization of the shear box cycle relay SBC has another very important effect in that it results in closing of a set of relay contacts SBC–4 to complete a circuit through normally closed contacts SBR–1 of a shear box return relay SBR described more fully below to an operating solenoid SB for applying the shear box. The solenoid SB and its associated valve are of the single acting type which automatically close when the solenoid SB is deenergized but which are opened when the circuit to the solenoid SB is completed. When the solenoid SB is energized, fluid under pressure is delivered to the shear box cylinder 345 to extend the shear box in the manner previously described. When the shear box reaches its fully extended position, the shear box applied limit switch LSSBA is closed to complete a circuit to the shear box in relay SBI. Energization of the relay SBI has the following results:

(a) Contacts SBI-7 close to complete a holding circuit through normally closed contacts SCO-3 of the deenergized shear cycle over relay SCO for the purpose of holding the operating coil of the relay SBI across the line for the remainder of the shearing cycle.

(b) Contacts SBI-1 close and contacts SBI-3 open to apply the movable clamps. Thus, when contacts SBI-3 open the holding circuit for the movable clamps, retract relay MCR is broken so that this relay becomes deenergized. Contacts MCR-1 return to their normally closed positions, contacts MCR-2 open and contacts MCR-3 open to break the circuit to the movable clamp retract solenoid MCRS. A circuit is then established through closed contacts SBI-1 and through the normally closed contacts MCR-1 to connect the operating coil of the relay MCA across the line. When the relay MCA is energized, its contacts MCA-1 are closed to recomplete the circuit to the movable clamp apply solenoid MCAS in order to extend the movable clamps in the manner described above.

(c) Contacts SBI-2 close to complete an enabling circuit through the closed contacts MPR-1 of the deenergized relay MPR so that the relay MPA will be energized as soon as the movable clamps are applied.

(d) Contacts SBI-4 close to set up a circuit for energizing the movable clamp retract relay MCR when the movable platen retract limit switch LSMPR is next actuated. It should be understood that the latter limit switch is open at this time and, as a consequence, the relay MCR remains deenergized.

(e) Contacts SBI-5 close to set up a circuit for energizing the relay MPR when the limit switch LSMPA is next actuated. At this time, the movable platen 321 is retracted and the switch section LSMPA-1 is opened and, as a consequence, the relay MPR is not energized.

(f) Contacts SBI-6 close to set up a holding circuit for the relay MPR when the latter relay becomes energized.

(g) Contacts SBI-8 close to set up a circuit for energizing the shear box retract relay SBR during subsequent portions of the shearing cycle. At this time, the relay SBR is not energized because a set of contacts MCR-4 of the deenergized movable clamp retract relay MCR are open.

(h) Contacts SBI-9 close to set up a circuit for energizing the stationary clamp return relay SCR when the shear box is retracted during subsequent portions of the cycle. At this time, the relay SCR is not opened because the limit switch LSSBR is open.

As indicated above, energization of the relay SBI causes the movable clamps to be extended into engagement with the walls of the shear box in the manner described above. When the movable clamps reach their extended positions, the limit switches LSMCA-1, LSMCA-2, LSMCA-3 and LSMCA-4 are again closed to complete a circuit to the operating coil of the relay MPA through the closed contacts SBI-2 and through the normally closed contacts MPR-1 of the deenergized movable platen retract relay MPR.

Energization of the relay MPA causes contacts MPA-1 to close in order to complete a holding circuit through the closed contacts MPR-2 so that the operating coil of the relay MPA is locked across the line. Contacts MPA-2 also close to complete the circuit to the movable platen solenoid MP with the result that the movable carriage 321 is advanced in the manner described above to drive the shearing blades through the upset 344, thus performing the shearing operation. When the movable carriage reaches its fully extended position, the limit switch sections LSMPA-1 and LSMPA-2 of the movable platen advanced limit switch LSMPA are closed. The closing of switch section LSMPA-2 has no effect on the circuit operation in view of the fact that the contacts SBC-1 are, at this time, open. Closing of switch section LSMPA-1, however, completes a circuit through the now closed contacts SBI-5 of the energized shear box in relay SBI to the operating coil of the movable platen retract relay MPR. When the relay MPR is energized, its contacts MPR-4 close to complete a holding circuit through the now closed contacts SBI-6 of the energized relay SBI so that the movable platen retract relay remains energized throughout the remainder of the shearing cycle. Energization of the relay MPR also opens the normally closed sets of contacts MPR-1 and MPR-2, thereby breaking the holding circuit and the energizing circuit for the relay MPA with the result that the latter relay is deenergized to open its contacts. When contacts MPA-2 are opened, the circuit to the solenoid MP is interrupted to retract the movable carriage 321 in the manner previously described.

When the movable carriage is fully retracted, it engages limit switch LSMPR and, as a result, limit switch sections LSMPR-1 and LSMPR-2 are both closed. Closing of switch section LSMPR-2 has no effect on the circuit operation in view of the fact that the operating coil of the relay SBC is already locked across the line. However, closing of switch section LSMPR-1 completes a circuit through the closed contacts SBI-4 of the energized relay SBI and through the closed contacts MPR-3 of the energized relay MPR, thereby energizing the operating coil of the movable clamp retract relay MCR. When the relay MCR is energized, its contacts MCR-1 are opened to break the circuit to the operating coil of the movable clamp apply relay MCA so that this relay becomes deenergized to open its contacts MCA-1 and, hence, to interrupt the circuit to the movable clamp apply solenoid MCAS. At the same time, relay contacts MCR-3 close to connect movable clamp retract solenoid MCRS across the line with the result that the movable clamps are retracted in the manner previously described. Relay contacts MCR-2 close but this has no effect on the circuit operation in view of the fact that the contacts SBI-3 of the energized relay SBI are now open. Relay contacts MCR-4 close so that when the movable clamps retract and close the limit switches LSMCR-1, LSMCR-2, LSMCR-3 and LSMCR-4 a circuit is completed through the closed limit switches LSER-1, LSER-2 and through the closed contacts SBI-8 of the energized relay SBI to the shear box retract relay SBR.

When the relay SBR is energized, contacts SBR-2 are closed to complete a holding circuit through normally closed contacts SCO-4 of the shear cycle over relay SCO with the result that the shear box retract relay SBR remains energized for the remainder of the cycle. Energization of the relay SBR also breaks the normally closed contacts SBR-1 to open the energizing circuit to the shear box solenoid SB. Since the latter solenoid is of the single acting type, its associated valve returns to its closed or off position when the solenoid is deenergized and, as a consequence, the shear box is automatically returned to its retracted position. When the shear box reaches its fully retracted position, the limit switch LSSBR is closed to complete a circuit through the now closed contacts SBI-9 of the energized relay SBI to the stationary clamp retract relay SCR so that the latter relay becomes energized. Energization of the relay SCR opens the normally closed contacts SCR-1 to interrupt the circuit to the relay SCA which, in turn, opens contacts SCA-2 to break the circuit to the stationary clamp solenoid SC. The valving associated with the latter solenoid thus closes to retract the stationary clamps. When the stationary clamps reach their fully retracted positions, series connected limit switches LSSCR-1, LSSCR-2, LSSCR-3 and LSSCR-4 all close to connect the operating coil of the shear cycle over relay SCO across the line through the closed contacts SCR-2 of the energized stationary clamp relay SCR. As soon as the relay SCO is energized its contacts SCO-5 close to complete a holding circuit from the line 907 through a normally closed set of contacts ASCR–3 of an automatic stop control relay ASCR which is not energized until near the end of the pusher advance portion of the cycle. Thus, the relay SCO remains energized while the pusher mechanism and the power driven rollers advance the rail. When the relay SCO is energized, its contacts SCO–6 close to complete a circuit to the counter 5 release coil RC to open the contacts C5–2 in order to prevent the weld cycle from beginning again. When the relay SCO is energized, its contacts SCO–1 are opened to break the circuit holding the relay WCO across the line and, as a consequence, the latter relay is deenergized. When the relay WCO is deenergized, the contacts WCO–5 open to break the circuit to the relays MCR, MPR, SBC, SBI, SBR and SCR, in order to condition the circuit for the next cycle of operation. At this time, the welding and shearing apparatus have completed one complete cycle of operation and the sheared weld is now ready to be passed to the grinding equipment.

*Automatic Operation of the Power Driven Rollers and the Pusher Mechanism*

To obtain automatic operation, the Automatic-Manual switch 916 (FIG. 41) is placed in the automatic position to energize the automatic control relay AR and to illuminate the indicating light 940. At the completion of the welding and shearing cycle described above, the pusher mechanism may be rendered automatically effective to advance the continuous rail including the new welded joint. As is indicated in FIG. 42 of the drawings, this operation may be completely divorced from the welding cycle so that the operator is required to depress a manually operated switch 950 having switch sections 950a and 950b in order to start the pusher mechanism. However, preferably, the pusher mechanism is rendered automatically effective by energization of the shearing cycle over relay SCO at the completion of the shearing operation. Energization of the latter relay closes two sets of contacts SCO–7 and SCO–8 which are respectively connected to shunt the switch sections 950a and 950b. In any event, either the closing of contacts SCO–7 and SCO–8 or the depression of the switch 950 completes a circuit through the Master Stop switch 929, through the closed contacts AR–7 of the automatic control relay and through conductor 951 to a set of parallel connected counter solenoids C1S, C2S, C3S, C4S and C5S. Series connected contacts C1S–1, C2S–1, C3S–1, C4S–1 and C5S–1 close to complete a circuit from the conductor 951 through a set of normally closed contacts C5–4 of the counter C5 to the forward automatic control relay FACR. The latter relay has seven sets of contacts which function as follows:

(a) A set of normally closed contacts FACR–1 (FIG. 41) open to prevent energization of the relays FCR and RCR and also to prevent energization of the relays R63R, R64R and R71R controlling the reverse rotation of the power driven rollers.

(b) Contacts FACR–2 (FIG. 42) close to bypass the switch section 950a and the relay contacts SCO–7.

(c) Contacts FACR–3 close to bypass the contacts SCO–8, the switch section 950b and the series connected contacts C1S–1, C2S–1, C3S–1, C4S–1 and C5S–1. The bypass circuit including the contacts FACR–3 also includes a set of normally closed contacts C5–1 of the counter C5 but since the latter counter was reset at the completion of the shearing cycle, the contacts C5–1 are closed.

(d) Contacts FACR–4 close to connect conductor 951 to a circuit which will eventually start the power driven rollers forward. However, this circuit includes limit switch LS–RFC which remains open until the trailing end of the continuous rail leaves the idler roll 72 at the front end of the rail supply car, an event which does not occur until the pusher mechanism 56 has advanced the rail.

(e) Contacts FACR–5 close to connect the coils of the counter devices C1, C2, C3 and C4 through the series connected cam operated switches 726 described above to the power line 907, thus causing these four counters to begin their counting operations.

(f) Contacts FACR–6 close to complete a circuit through the normally closed contacts DR–1 of the drive reverse relay DR to the operating coil of the drive forward relay DF, thus energizing the latter relay.

(g) Contacts FACR–7 close to complete a circuit through the closed contacts DF–2 of the energized relay DF, through normally closed contacts SDCR–4 of the slow down control relay SDCR, through closed contacts AR–9 of the automatic control relay AR and through normally closed contacts PSS–1 of the deenergized pusher slow speed relay PSS to the operating coil of the pusher high speed relay PHS, thus energizing the latter relay.

When the relays DF and PHS are energized it will be apparent from the foregoing description that the pusher motor 667 is rendered effective to advance the continuous rail at high speed and in a forward direction. As the rail advances, the shaft 706 of the pusher mechanism drives the shaft 730 carrying the cams 725 so that the switches 726 are opened in sequence with one of these switches being opened for each two inch increment of travel of the rail. The counters C1, C2, C3 and C4 count the number of openings of the switches 726 and when the counter C1 has completed its count, its contacts C1–1 close to complete a circuit to the operating coil of the slow down control relay SDCR through the closed contacts AR–7 of the energized automatic control relay AR and through normally closed contacts C2–1 and C4–1 of the counters C2 and C4, respectively. The counters C2 and C4, of course, have not as yet completed their count and, hence, their contacts are in their normal positions. When the relay SDCR is thus energized, its contacts SDCR–1 open to interrupt the energizing circuit for the pusher high speed relay PHS and its contacts SDCR–3 close to complete a circuit to the operating coil of the pusher slow speed relay PSS through the closed contacts FACR–7 of the energized relay FACR and through the closed contacts DF–2 of the energized drive forward relay DF. With the relay PHS deenergized and with the relay PSS energized, the pusher motor 667 is, of course, rendered effective, in the manner previously described, to drive the tread 660 slowly so that the rail is advanced in a forward direction at slow speed. As indicated previously, the counter C1 is set so that the slow down control relay SDCR is energized when the new weld is located adjacent the first grinding station 400 and, as a consequence, the rail travel is decelerated while the new weld passes through the first grinding station. When the welded joint has moved beyond the first station, the counter C2 completes its count and its contacts C2–1 open to interrupt the circuit to the slow down control relay SDCR with the result that contacts SDCR–3 open to deenergize the relay PSS while contacts SDCR–4 revert to their normally closed condition to again complete the circuit to the relay PHS. When the relay PHS is reenergized in the manner just described, the pusher motor 667 again becomes effective to drive the tread 660 in order to advance the rail at high speed while the weld passes from the first grinding station 400 to the second grinding station 401. When the weld reaches a position adjacent the second grinding station, the counter C3 completes its count and it closes its contacts C3–1 to energize coil C2RC in order to reset the counter C2 so that the contacts C2–1 revert to their normally closed condition. Counter C1 is not reset and, hence, its contacts C1–1 remain closed so that the circuit to the slow down control relay SDCR is again completed with the result that the motor 667 is slowed down while the weld passes through the second grinding station 401. When the welded joint passes beyond the second grinding station the counter C4 completes its count and it is effective to open its contacts C4–1 to interrupt the circuit to the slow down control relay SDCR, thus causing the pusher motor 667 to advance the rail at high speed in a manner which will be obvious in view of the foregoing description.

At some point during the above described operation, the trailing end of the continuous rail will have advanced beyond the idler roller 72 so that the limit switch LSRFC returns to its normally closed position, thus completing a circuit through the closed contacts FACR-4 to a roller timing solenoid RTS which closes its contacts RTS-1 to start the operation of a timing motor RT. At the end of a predetermined interval of time, the timer RT is effective to close contacts RT-1 to energize the rail forward control relay RFCR in order to begin the advancement of the new rail section by the rollers 63, 64 and 71. The timer RT is set so that the power driven rollers will advance the leading end of the new rail section to be welded to the center of the welding and shearing apparatus 54 at a time coinciding with the movement of the trailing end of the continuous rail to the center of the welding apparatus through the operation of the pusher mechanism 56.

Energization of the relay RFCR when the limit switch LSRFC is closed, closes contacts RFCR-1 and RFCR-2 to energize the relays R63F, R64F and R71F through the closed contacts AR-6 of the energized automatic control relay AR. When the relays R63F, R64F and R71F are energized, the rollers 63, 64 and 71 are driven in a forward direction to advance the rail section in a manner which will be evident in view of the foregoing description. The new rail section is thus advanced and the squeeze solenoid 931 is energized in the manner described above to press the squeeze roller 212 against the upper surface of the forwardly moving rail section. The spot grinder 70 performs its operation in the manner described previously.

When the trailing end of the continuous rail is moved by the pusher mechanism 56 to a point where it no longer engages the limit switch LSC5B, the latter switch closes to complete a circuit to the automatic stop control relay ASCR through the closed contacts FACR-3 of the forward automatic control relay FACR and through the normally closed contacts C5-1 of the counter C5. The relay ASCR is thus energized to close its contacts ASCR-1 to bypass the limit switch LSC5B so that the relay ASCR will not be deenergized when the new rail section advances to a point where its leading end engages and opens the switch LSC5B. Energization of the relay ASCR also opens normally closed contacts ASCR-3 (FIG. 43) to break the holding circuit to the shear cycle over relay SCO so that the latter relay becomes deenergized. Energization of the automatic stop control relay ASCR also closes contacts ASCR-2 to complete a circuit from the series connected switches 726 to the counter C5 with the result that the latter counter begins its count.

When the counter C5 completes its count, contacts C5-1 break the circuit to the relay ASCR, contacts C5-2 close to set up the welding cycle for the next weld, contacts C5-3 (FIG. 41) close to energize reset coils C1RC, C3RC and C4RC in order to reset the counters C1, C3 and C4. Counter C2 was previously reset and counter C5 is not reset until the termination of the next welding cycle. When the counter C5 completes its count, the normally closed contacts C5-4 of this counter are opened to interrupt the circuit to the forward automatic control relay FACR with the result that both this relay and the roller forward control relay RFCR are deenergized. In this connection, it should be observed that the relay RFCR is deenergized when contacts FACR-4 open. When the relay RFCR is deenergized, its contacts RFCR-1 and RFCR-2 open to break the circuits to the relays R63R, R64F and R71F so that the power driven rollers 63, 64 and 71 are no longer operative. Contacts FACR-2 and FACR-3 open to remove the bypasses from the switch sections 950a and 950b and the relay contacts SCO-7 and SCO-8. Contacts FACR-6 and FACR-7 open to deenergize the drive forward relay DF and the pusher high speed relay PHS so that the pusher motor 667 is no longer energized. When the relay DF is deenergized, the solenoid 934 becomes effective to apply the brake on the pusher mechanism to hold the continuous rail in fixed position while the succeeding weld is made.

In the event that the end of the continuous rail is not properly positioned within the welding and shearing apparatus 54, the operator may jog the rail forward by depressing the manually operable Pusher Jog Forward switch 936 to close switch section 936a and, hence, to complete a circuit through the Master Stop switch 929 through the normally closed contacts FACR-1 of the deenergized forward automatic control relay FACR and through the closed contacts AR-3 of the energized automatic control relay AR, thereby energizing the relay FCR so that the pusher motor 667 is rendered effective in the manner described above to move the rail forward as long as the switch 936 is depressed. To reverse the pusher drive in order to back up the rail section to center its trailing end within the welding and shearing apparatus, the operator may depress a Pusher Reverse switch 955 which completes a circuit through the Master Stop switch 929, through the contacts FACR-1, through normally closed contacts FCR-5 of the deenergized forward control relay FCR, through the closed contacts AR-4 of the energized automatic control relay AR and through closed contacts AR-5 of the relay AR to energize the reverse control relay RCR in order to drive the pusher motor 667 in reverse in the manner described above. When the switch 955 is depressed, a circuit is also completed to energize the relay R71R in order to close contacts R71R-1, R71R-2 and R71R-3, thereby energizing the motor 181 for reverse drive in order to render the squeeze roller 71 effective to back up the new rail section.

Similarly, in the event that the leading end of the new rail section is not properly positioned within the welding and shearing apparatus 54, this rail section may be jogged forward by depressing a Roll 71 Jog Forward switch 956 which, when closed, completes a circuit through the Master Stop switch 929 and through closed contacts AR-6 of the automatic control relay AR to the operating coil of the relay R71F. When the relay R71F is energized, its contacts R71F-1, R71F-2, and R71F-3 complete a circuit to energize the motor 181 of the drive roll 71 so that the rail section is moved forward until it is properly positioned within the welding and shearing apparatus. By selectively operating the Master Stop switch 929, the Pusher Jog Forward switch 936, the Pusher Jog Reverse switch 955 and the Roll 71 Jog Forward switch 956, the operator can adjust the positions of the trailing end of the continuous rail and the leading end of new rail section until they are properly centered within the welding and shearing apparatus 54 in the event that the pusher brake does not stop the rail at the exact position required to perform the welding operation.

While the welding and shearing cycle is proceeding, the welded joint located at the test station is being subjected to the magnaflux test. When it is desired to cycle the system continuously, a timer circuit may be employed to render the rail storage and transfer device 60 automatically effective to place a new rail section on the power driven rollers at the expiration of a predetermined period of time which is sufficient to allow the weld test to be made. A new rail section should not be placed on the power driven rollers 63 and 64 until the welded joint at the testing station has been checked and approved in view of the fact that this rail section would have to be backed up or removed in the event that a defective weld is found. Thus, when the control system is in automatic operation, a manually operated Test Timer switch 960 is closed and it remains in the closed position until it is desired to stop the automatic cycling. When the switch 960 is closed, it sets up a circuit through a normally closed set of contacts RCR-6 to a test timing device TT. The contacts RCR-6 prevent the test timing device from operating during the reverse or back up procedure so that a new rail section will not be delivered from the rail storage and transfer device 60 when the continuous rail is being reversed. The energizing circuit to the test timer TT also includes a set of contacts STR–2 of a start timing relay STR which is automatically energized at the beginning of the welding cycle by closing contacts C5–5 of the counter C5 at the end of the preceding cycle. When the contacts C5–5 are closed a circuit is completed through normally closed sections 174c and 174c–64 of the two limit switches 174 and 174–64 respectively mounted on the power driven rollers 63 and 64. Thus, at the beginning of the welding cycle, the relay STR is energized to close its contacts STR–2 in order to start the test timer TT. The timer TT is set to time for a period sufficient to complete the weld testing procedure and at the end of this period automatically closes its contacts TT–1 and TT–2 to complete circuits for energizing the relays RTUR–61 and RTUR–62. If a defective weld is discovered during the test, the cycle is immediately interrupted by opening the Cycle Stop switch 921 so that the rail transfer device 60 cannot operate. If the weld is satisfactory, as will be the case in an overwhelming majority of cases, the timer TT times out to energize the rail transfer unit relays RTUR–61 and RTUR–62. The circuit for energizing the relay RTUR–61 is completed from the line 907 through closed contacts AR–2 of the energized automatic control relay AR, through the Cycle Stop switch 921, through the normally closed contacts 174a of the limit switch 174, through closed contacts AR–9 of the automatic control relay through a normally closed section 920c of the Cycle Start switch 920 and through the contacts TT–1. The circuit to the relay RTUR–62 is completed through the contacts AR–2, through the Cycle Stop switch 921, through closed switch section 174a–64 of the power driven roller 64 limit switch 174–64, through closed contacts AR–10 of the automatic cycle control relay, through section 920b of the Cycle Start switch 920 and through the contacts TT–2. Thus, when the timing cycle of the timer TT is completed, relays RTUR–61 and RTUR–62 are energized to render the motors 117 and 117–62 of the rail transfer units 61 and 62 effective to transfer a rail to the power driven rollers 63 and 64 in a manner which will be evident in view of the foregoing description. As soon as a rail has been placed on the rollers, the limit switches 174 and 174–64 are engaged and actuated, thus opening switch sections 174a and 174a–64, 174c and 174c–64 and closing switch sections 174b and 174b–64. Switch sections 174c and 174c–64 break the circuit to the relay STR so that the timer TT cannot be energized as long as the rail section remains on the power driven rollers 63 and 64. The closing of switch sections 174b and 174b–64 illuminates the indicating light 925 to inform the operator that a new rail section has been placed on the power driven rollers. Opening of switch sections 174a and 174a–64 has no effect on the circuit operation in view of the fact that these switch contacts are bypassed by the limit switches 137 and 137–62 and by the closed contacts RTUR61–4 and RTUR62–4. When the rail transfer units 61 and 62 have completed their cycle the limit switches 137 and 137–2 are opened to deenergize the relays RTUR61 and RTUR62 in the manner described above and, at the same time, switch sections 137a and 137a–64 of the limit switches 137 and 137–62 close to complete a circuit to a test timer reset coil TTRC which resets the timer TT and opens its contacts TT–1 and TT–2. At this point, a new rail section has been placed on the power driven rollers awaiting the cycle of operation which proceeds in the manner indicated above.

While a particular embodiment of the invention has been illustrated and described, it will be understood that many modifications will readily occur to those skilled in this art and it is, therefore, contemplated by the appended claims to cover any such modifications as fall within the true spirit and scope of the invention.

What is claimed as new and desired to be secured by Letters Patent of the United States is:

1. In an apparatus for welding rail sections together in end to end relationship to form a continuous rail for delivery to rail receiving means, the combination of a single railroad car containing electric welding apparatus, grinding equipment and a pusher mechanism for pushing the continuous rail from one end of the railroad car to the rail receiving means, rail supply means located adjacent the other end of said railroad car, said rail supply means including a rail transfer device for storing rail sections and supplying them one at a time to power driven means for feeding each rail section to the welding apparatus after it is supplied from the rail transfer device, a spot grinder for grinding portions of the top of each rail section near each of its ends in order to clean these portions prior to supplying the rail section to the welding apparatus, said welding apparatus including first and second electrodes respectively engageable with adjacent ground portions of successive rail sections to be welded together and further including means for causing current flow between the electrodes and through the ends of the rail sections in order to make the weld, means for shearing off a portion of the excess material of each weld, said grinding equipment including a plurality of grinding heads each including a grinding belt and respectively acting upon the top, the bottom and the side edges of the continuous rail in the region of the weld for the purpose of removing weld material, a first of said grinding heads being spaced from a second of said heads in the direction of travel of the continuous rail, said pusher mechanism including means for continuously drawing the continuous rail through the grinding equipment and for varying the speed of travel so that the continuous rail travels at relatively high speed from the welding apparatus until the weld reaches the vicinity of the second grinding head whereupon the speed decreases to a relatively low value while the weld passes the second grinding head, the last named means being operable to increase the speed of travel of the continuous rail to said relatively high speed as the weld passes from the second grinding head to the first grinding head, to then decrease the speed of travel to said relatively low value during movement of the weld past the first grinding head, and then to increase the speed of travel to said relatively high speed when the weld moves beyond the first grinding head.

2. In an apparatus for welding rail sections together in end to end relationship to form a continuous rail for delivery to rail receiving means, the combination of a single railroad car containing electric welding apparatus, grinding equipment and pusher mechanism for pushing the continuous rail from one end of the railroad car to the rail receiving means, rail supply means located adjacent the other end of said railroad car for supplying rail sections one at a time to the welding apparatus, a spot grinder for grinding portions of the top of each rail section near each of its ends in order to clean these portions prior to supplying the rail section to the welding apparatus, said welding apparatus including first and second electrodes respectively engageable with adjacent ground portions of successive rail sections to be welded together and further including means for causing current flow between the electrodes and through the ends of the rail sections in order to make the weld, means for shearing off a portion of the excess material of each weld, said grinding equipment including a plurality of grinding heads acting upon the continuous rail in the region of the weld for the purpose of removing weld material, a first of said grinding heads being spaced from a second of said heads in the direction of travel of the continuous rail, said pusher mechanism including means for continuously drawing the continuous rail through the grinding equipment and for varying the speed of travel so that the continuous rail travels at relatively high speed from the welding apparatus until the weld reaches the vicinity of the second grinding head whereupon the speed decreases to a relatively low value while the weld passes the second grinding head, the last named means being operable to increase the speed of travel of the continuous rail to said relatively high speed as the weld passes from the second grinding head to the first grinding head, to then decrease the speed of travel to said relatively low value during movement of the weld past the first grinding head, and then to increase the speed of travel to said relatively high speed when the weld moves beyond the first grinding head.

3. In an apparatus for welding rail sections together in end to end relationship to form a continuous rail for delivery to rail receiving means, the combination of a single railroad car containing electric welding apparatus, grinding equipment and a pusher mechanism for pushing the continuous rail from one end of the railroad car to the rail receiving means, rail supply means located adjacent the other end of said railroad car for supplying rail sections one at a time to the welding apparatus, a spot grinder operated automatically as the rail sections are advanced to the welding apparatus for grinding portions of the top of each rail section near each of its ends in order to clean these portions prior to supplying the rail section to the welding apparatus, said welding apparatus including first and second electrodes respectively engageable with adjacent end portions of successive rail sections to be welded together and further including means for causing current flow between the electrodes and through the end portions of the rail sections in order to make the weld, means for shearing off a portion of the excess material of each weld, said grinding equipment being spaced from said welding apparatus and including a plurality of grinding heads spaced apart much less than the length of one rail section and each including a grinding belt acting upon the continuous rail in the region of the weld for the purpose of removing weld material, means for normally preventing engagement of said belts with said continuous rail but automatically effective when the continuous rail is advanced to a position where the welded joint is in the vicinity of the grinding equipment to move the belts against the rail to remove the excess weld material, and said pusher mechanism including means for advancing the continuous rail from the welding apparatus through the grinding equipment and for directing the free end of the continuous rail out of said railroad car and onto the rail receiving means.

4. In an apparatus for welding rail sections together in end to end relationship to form a continuous rail for delivery to rail receiving means, the combination of a single railroad car containing electric welding apparatus, grinding equipment and a pusher mechanism for pushing the rail from one end of the car to the rail receiving means, power driven rail supply means located adjacent the other end of said railroad car for supplying rail sections one at a time to the welding apparatus and into abutting end to end relationship with the continuous rail, said welding apparatus including means for causing current flow through the abutting ends of the rail section and the continuous rail in order to make the weld, means for shearing off a portion of the excess material of each weld, said grinding equipment being spaced from said welding apparatus and being normally ineffective to grind said continuous rail, said grinding equipment further including means automatically operated when the continuous rail is advanced by the pusher mechanism from the welding apparatus to position where the welded joint reaches the vicinity of the grinding equipment to render said equipment effective to act upon the continuous rail in the region of the weld to remove excess weld material, and said pusher mechanism including means for advancing the continuous rail from the welding apparatus through the grinding equipment and for directing the free end of the continuous rail out of said railroad car and onto the rail receiving means.

5. In an apparatus for welding rail sections together in end to end relationship to form a continuous rail, the combination of electric welding apparatus, grinding equipment, a pusher mechanism for passing the continuous rail from the welding apparatus to the grinding equipment, means for supplying rail sections one at a time to said welding apparatus, a spot grinder for grinding spaced apart portions of the top of each rail section near each of its ends in order to clean these portions prior to supplying the rail section to the welding apparatus, said welding apparatus including first and second electrodes respectively engageable with adjacent ground portions of successive rail sections to be welded together and further including means for causing current flow between the electrodes and through the ends of the rail sections in order to make the weld, means for shearing off a portion of the excess material of each weld, said grinding equipment including a plurality of grinding heads respectively acting upon the top, the bottom and the side edges of the continuous rail in the region of the weld for the purpose of removing weld material, a first of said grinding heads being spaced from a second of said heads in the direction of travel of the continuous rail and by a distance much less than the length of one rail section, said pusher mechanism including means for varying the speed of travel so that the continuous rail travels at relatively high speed from the welding apparatus until the weld reaches the vicinity of the second grinding head whereupon the speed decreases to a relatively low value while the weld passes the second grinding head, the last named means being operable to increase the speed of travel of the continuous rail to said relatively high speed as the weld passes from the second grinding head to the first grinding head, to then decrease the speed of travel to said relatively low value during movement of the weld past the first grinding head, and then to increase the speed of travel to said relatively high speed when the weld moves beyond the first grinding head.

6. In an apparatus for welding rail sections together in end to end relationship to form a continuous rail, the combination of electric welding apparatus, grinding equipment, a pusher mechanism for passing the continuous rail from the welding apparatus to the grinding equipment, means for supplying rail sections one at a time to said welding apparatus, said welding apparatus including first and second electrodes respectively engageable with adjacent end portions of successive rail sections to be welded together and further including means for causing current flow between the electrodes and through the ends of the rail sections in order to make the weld, said grinding equipment including a plurality of grinding heads respectively acting upon the top, the bottom and the side edges of the continuous rail in the region of the weld for the purpose of removing weld material, a first of said grinding heads being spaced from a second of said heads in the direction of travel of the continuous rail and by a distance much less than the length of one rail section, said pusher mechanism including means for varying the speed of travel so that the continuous rail travels at relatively high speed from the welding apparatus until the weld reaches the vicinity of the second grinding head whereupon the speed decreases to a relatively low value while the weld passes the second grinding head, the last named means being operable to increase the speed of travel of the continuous rail to said relatively high speed as the weld passes from the second grinding head to the first grinding head, to then decrease the speed of travel to said relatively low value during movement of the weld past the first grinding head, and then to increase the speed of travel to said relatively high speed when the weld moves beyond the first grinding head.

7. In an apparatus for welding rail sections together, in end to end relationship to form a continuous rail, the combination of electric welding apparatus, grinding equipment, mechanism for passing the continuous rail from the welding apparatus to the grinding equipment, means for supplying rail sections one at a time to said welding apparatus, a rail transfer device for supplying rail sections one at a time to the supplying means, a spot grinder for grinding spaced apart portions of each rail section respectively located near its opposed ends in order to clean these portions prior to supplying the rail section to the welding apparatus, said welding apparatus including first and second electrodes respectively engageable with adjacent cleaned portions of successive rail sections to be welded together and further including means for causing current flow between the electrodes and through the ends of the rail sections in order to make the weld, means for shearing off a portion of the excess material of each weld, said grinding equipment including a grinding belt acting upon the continuous rail in the region of the weld for the purpose of removing weld material and a plurality of pressure operated means for forcing the belt against the rail, and control means including an electrical control circuit for automatically operating the rail transfer device, the rail supplying means, the spot grinder, the welding apparatus, the shearing means, the grinding means and said mechanism in predetermined sequence in order to weld the rail sections one at a time to the continuous rail, said control circuit including switch means actuated when the rail section is supplied from the rail transfer device to the rail supplying means, said switch means when actuated rendering the rail supplying means effective to advance the rail section to the welding apparatus, said control means including means operated by the rail section when the latter is advanced for rendering the spot grinder automatically effective to clean the spaced apart rail portions, said control circuit also including means rendered effective when the rail section is disposed in abutting end to end relationship with the continuous rail for moving the electrodes into engagement with the ends of the rail sections and for supplying welding current through the ends of the rail sections for a predetermined period, said control circuit including means operated automatically at the expiration of said period for rendering the shearing means effective to shear off portions of the weld, said control circuit also including means operated following the shearing for rendering the mechanism effective to move the completed weld to the grinding equipment, said control means further including means operated in response to movement of the weld for rendering the pressure operated means effective in sequence to force the belt against the rail, and said control circuit including means operable following a predetermined time delay period sufficient to permit testing of the weld for rendering the rail transfer device effective to supply another rail section to the supplying means in order to initiate a new cycle of operation.

8. In an apparatus for welding rail sections together in end to end relationship to form a continuous rail, the combination of electric welding apparatus, grinding equipment, mechanism for passing the continuous rail from the welding apparatus to the grinding equipment, means for supplying rail sections one at a time to said welding apparatus, said welding apparatus including first and second electrodes respectively engageable with adjacent end portions of successive rail sections to be welded together and further including means for causing current flow between the electrodes and through the ends of the rail sections in order to make the weld, means for shearing off a portion of the excess material of each weld, said grinding equipment including a grinding belt acting upon the continuous rail in the region of the weld for the purpose of removing weld material and a plurality of pressure operated means for forcing the belt against the rail, and control means including an electrical control circuit for automatically operating the rail supplying means, the welding apparatus, the shearing means, the grinding equipment and said mechanism in predetermined sequence in order to weld the rail sections one at a time to the continuous rail, said control circuit including switch means actuated when the rail section is in position in the rail supplying means for advancement to the welding apparatus, said control circuit also including means rendered effective when the rail section is disposed in abutting end to end relationship with the continuous rail for moving the electrodes into engagement with the ends of the rail sections and for supplying welding current through the ends of the rail sections for a predetermined period, said control circuit including means operated at the expiration of the predetermined period for rendering the shearing means effective to shear off portions of the weld, said control circuit also including means operated following the shearing for rendering the mechanism effective to move the completed weld to the grinding equipment, and said control means further including means operated in response to movement of the weld for rendering the pressure operated means effective in sequence to force the belt against the rail.

9. In an apparatus for welding rail sections together in end to end relationship to form a continuous rail, the combination of electric welding apparatus, grinding equipment, mechanism for passing the continuous rail from the welding apparatus to the grinding equipment, means for supplying rail sections one at a time to said welding apparatus, a rail transfer device for supplying rail sections one at a time to the supplying means, said welding apparatus including first and second electrodes respectively engageable with adjacent end portions of successive rail sections to be welded together and further including means for causing current flow between the electrodes and through the ends of the rail sections in order to make the weld, means for shearing off a portion of the excess material of each weld, said grinding equipment including a grinding belt acting upon the continuous rail in the region of the weld for the purpose of removing weld material and a plurality of pressure operated means for forcing the belt against the rail, and control means including an electrical control circuit for automatically operating the rail transfer device, the rail supplying means, the welding apparatus, the shearing means, the grinding equipment and said mechanism in predetermined sequence in order to weld the rail sections one at a time to the continuous rail, said control circuit including switch means actuated when the rail section is supplied from the rail transfer device to the rail supplying means, said switch means when actuated rendering the rail supplying means effective to advance the rail section to the welding apparatus, said control circuit also including means rendered effective when the rail section is disposed in abutting end to end relationship with the continuous rail for moving the electrodes into engagement with the ends of the rail sections and for supplying welding current through the ends of the rail sections for a predetermined period, said control circuit including means operated at the expiration of the predetermined period for rendering the shearing means effective to shear off portions of the weld, said control circuit also including means operated following the shearing for rendering the mechanism effective to move the completed weld to the grinding equipment, said control means further including means operated in response to movement of the weld for rendering the pressure operated means effective in sequence to force the belt against the rail, said control circuit including means operable following a predetermined time delay period sufficient to permit testing of the weld for rendering the rail transfer device effective to supply another rail section to the supplying means in order to initiate a new cycle of operation.

10. In an apparatus for welding rail sections together in end to end relationship to form a continuous rail, the combination of electric welding apparatus, grinding equipment, mechanism for passing the continuous rail from the welding apparatus to the grinding equipment, means for supplying rail sections one at a time to said welding apparatus, a rail transfer device for supplying rail sections one at a time to the supplying means, said welding apparatus including first and second electrodes respectively engageable with adjacent end portions of successive rail sections to be welded together and further including means for causing current flow between the electrodes and through the ends of the rail sections in order to make the weld, means for shearing off a portion of the excess material of each weld, said grinding equipment including grinding means acting upon the continuous rail in the region of the weld for the purpose of removing weld material, and control means including an electrical control circuit for automatically operating the rail transfer device, the rail supplying means, the welding apparatus, the shearing means, the grinding equipment and said mechanism in predetermined sequence in order to weld the rail sections one at a time to the continuous rail, said control circuit including switch means actuated when the rail section is supplied from the rail transfer device to the rail supplying means, said switch means when actuated rendering the rail supplying means effective to advance the rail section to the welding apparatus, said control circuit also including means rendered effective when the rail section is disposed in abutting end to end relationship with the continuous rail for moving the electrodes into engagement with the ends of the rail sections and for supplying welding current through the ends of the rail sections for a predetermined period, said control circuit including means operated at the completion of the welding operation for rendering the shearing means effective to shear portions of the weld, said control circuit also including means operated following the shearing for rendering the mechanism effective to move the completed weld to the grinding equipment, and said control circuit further including means operable following a predetermined time delay period sufficient to permit testing of the weld for rendering the rail transfer device effective to supply another rail section to the supplying means in order to initiate a new cycle of operation.

11. In an apparatus for welding rail sections together in end to end relationship to form a continuous rail, the combinaation of electric welding apparatus, grinding equipment, mechanism for passing the continuous rail from the welding apparatus to the grinding equipment, means for supplying rail sections one at a time to said welding apparatus, said welding apparatus including first and second electrodes respectively engageable with adjacent end portions of successive rail sections to be welded together and further including means for causing current flow between the electrodes and through the ends of the rail sections in order to make the weld, means for shearing off a portion of the excess material of each weld, said grinding equipment including grinding means acting upon the continuous rail in the region of the weld for the purpose of removing weld material, and control means including an electrical control circuit for automatically operating the rail transfer device, the rail supplying means, the welding apparatus, the shearing means, the grinding equipment and said mechanism in predetermined sequence in order to weld the rail sections one at a time to the continuous rail, said control circuit including switch means actuated when the rail section is in position in the rail supplying means for advancement to the welding apparatus, said control circuit also including means rendered effective when the rail section is disposed in abutting end to end relationship with the continuous rail for moving the electrodes into engagement with the ends of the rail sections and for supplying welding current through the ends of the rail sections, said control circuit including means operated at the completion of the welding operation for rendering the shearing means effective to shear portions of the weld, and said control circuit also including means operated following the shearing for rendering the mechanism effective to move the completed weld to the grinding equipment.

12. In an apparatus for welding rail sections together in end to end relationship to form a continuous rail, the combination of electric welding apparatus, grinding equipment, mechanism for passing the continuous rail from the welding apparatus to the grinding equipment, means for supplying rail sections one at a time to said welding apparatus, a rail transfer device for supplying rail sections on at a time to the supplying means, said welding apparatus including first and second electrodes respectively engageable with adjacent end portions of successive rail sections to be welded together and further including means for causing current flow between the electrodes and through the ends of the rail sections in order to make the weld, said grinding equipment including grinding means acting upon the continuous rail in the region of the weld for the purpose of removing weld material, and control means including an electrical control circuit for automatically operating the rail transfer device, the rail supplying means, the welding apparatus, the grinding means and said mechanism in predetermined sequence in order to weld the rail sections one at a time to the continuous rail, said control circuit including switch means actuated when the rail section is supplied from the rail transfer device to the rail supplying means, said switch means when actuated rendering the rail supplying means effective to advance the rail section to the welding apparatus, said control circuit also including means rendered effective when the rail section is disposed in abutting end to end relationship with the continuous rail for moving the electrodes into engagement with the ends of the rail sections and for supplying welding current through the ends of the rail sections for a predetermined period, said control circuit including means operated following said predetermined period for rendering the mechanism effective to move the completed weld to the grinding equipment, said control circuit including means operable following a predetermined time delay period sufficient to permit testing of the weld for rendering the rail transfer device effective to supply another rail section to the supplying means in order to initiate a new cycle of operation.

13. In an apparatus for welding rail sections together in end to end relationship to form a continuous rail, the combination of electric welding apparatus, grinding equipment, mechanism for passing the continuous rail from the welding apparatus through the grinding equipment, means for supplying rail sections one at a time to said welding apparatus for disposition in abutting end to end relationship with the continuous rail, a spot grinder operated automatically when the rail sections are advanced to the welding apparatus for grinding spaced apart portions of each rail section near each of its ends in order to clean these portions prior to supplying the rail section to the welding apparatus, said welding apparatus including first and second electrodes respectively engageable with adjacent cleaned portions of successive rail sections to be welded together and further including means for causing current flow between the electrodes and through the ends of the rail sections in order to make the weld, means for shearing off a portion of the excess material of each weld, said grinding equipment being spaced from the welding apparatus and including a plurality of grinding heads automatically effective to act upon the continuous rail in the region of the weld when the continuous rail is advanced by said mechanism, thereby to remove additional excess weld material, and means for automatically operating the rail supplying means, the spot grinder, the welding apparatus, the shearing means, the grinding equipment and said mechanism in sequence to join a rail section to the continuous rail and to remove at least a portion of the excess weld material around the welded joint.

14. In an apparatus for welding rail sections together in end to end relationship to form a continuous rail, the combination of electric welding apparatus, grinding equipment, mechanism for passing the continuous rail from the welding apparatus through the grinding equipment, means for supplying rail sections one at a time to said welding apparatus for disposition in abutting end to end relationship with the continuous rail, said welding apparatus including first and second electrodes respectively engageable with adjacent portions of the rail section and the continuous rail and further including means for causing current flow between the electrodes and through the ends of the rail sections in order to make the weld, means for shearing off a portion of the excess material of each weld, said grinding equipment being spaced from the welding apparatus and including a plurality of grinding heads automatically effective to act upon the continuous rail in the region of the weld when the continuous rail is advanced by said mechanism thereby to remove additional excess weld material in the weld region, and means for automatically operating the rail supplying means, the welding apparatus, the shearing means, the grinding equipment and said mechanism in sequence to join a rail section to the continuous rail and to remove at least a portion of the excess weld material around the welded joint.

15. In an apparatus for welding rail sections together in end to end relationship to form a continuous rail, the combination of electric welding apparatus, grinding equipment, a mechanism for passing the continuous rail from the welding apparatus through the grinding equipment, means for supplying rail sections one at a time to said welding apparatus for disposition in abutting end to end relationship with the continuous rail, said welding apparatus including first and second electrodes respectively engageable with adjacent portions of the rail section and the continuous rail and further including means for causing current flow between the electrodes and through the ends of the rail sections in order to make the weld, said grinding equipment being spaced from the welding apparatus and including a plurality of grinding heads automatically effective to act upon the continuous rail in the region of the weld when the continuous rail is advanced by said mechanism, thereby to remove excess weld material in the weld region, and means for automatically operating the rail supplying means, the welding apparatus, the grinding equipment and said mechanism in sequence to join a rail section to the continuous rail and to remove the excess weld material.

16. In an apparatus for welding rail sections together in end to end relationship to form a continuous rail for delivery to rail receiving means, the combination of a single railroad car containing welding apparatus, grinding equipment and a pusher mechanism, power driven rail supply means located adjacent the other end of the said railroad car for supplying rail sections one at a time to the welding apparatus and into abutting end to end relationship with the continuous rail, said welding apparatus including means for welding together the abutting ends of the rail section and the continuous rail, means for shearing off a portion of the excess material of each weld, said grinding equipment including means automatically operated when the continuous rail is advanced and acting upon the continuous rail in the region of the weld to remove excess weld material, and said pusher mechanism including means for advancing the continuous rail from the welding apparatus through the grinding equipment and for pushing the continuous rail out of said car and onto the rail receiving means.

17. In apparatus for welding rail sections together in end to end relationship to form a continuous rail, the combination of welding apparatus, grinding equipment, a pusher mechanism for passing the continuous rail from the welding apparatus to the grinding equipment, means for supplying rail sections one at a time to said welding apparatus, said welding apparatus including means for welding each rail section to the end of the continuous rail, said grinding equipment including a plurality of grinding heads respectively acting upon the top, the bottom and the side edges of the continuous rail in the region of the weld for the purpose of removing weld material, a first of said grinding heads being spaced from a second of said heads in the direction of travel of the continuous rail, said pusher mechanism including means for varying the speed of travel so that the continuous rail travels at relatively high speed from the welding apparatus until the weld reaches the vicinity of the second grinding head whereupon the speed decreases to a relatively low value while the weld passes the second grinding head, the last named means being operable to increase the speed of travel of the continuous rail to said relatively high speed as the weld passes from the second grinding head to the first grinding head, to then decrease the speed of travel to said relatively low value during movement of the weld past the first grinding head, and then to increase the speed of travel to said relatively high speed when the weld moves beyond the first grinding head.

18. In an apparatus for welding rail sections together in end to end relationship to form a continuous rail, the combination of welding apparatus, grinding equipment, mechanism for passing the continuous rail from the welding apparatus through the grinding equipment, means for supplying rail sections one at a time to said welding apparatus for disposition in abutting end to end relationship with the continuous rail, said welding apparatus including means for welding the abutting ends together, means for shearing off a portion of the excess material of each weld, said grinding equipment including a plurality of grinding heads acting upon the continuous rail in the region of the weld for the purpose of removing weld material, and means for automatically operating the rail supplying means, the welding apparatus, the shearing means, the grinding equipment and said mechanism in sequence to join a rail section to the continuous rail.

19. In an apparatus for welding rail sections together in end to end relationship to form a continuous rail, the combination of welding apparatus, grinding equipment, a mechanism for passing the continuous rail from the welding apparatus through the grinding equipment, means for supplying rail sections one at a time to said welding apparatus for disposition in abutting end to end relationship with the continuous rail, said welding apparatus including means for welding the abutting ends together, said grinding equipment including a plurality of grinding heads acting upon the continuous rail in the region of the weld for the purpose of removing weld material, and means for automatically operating the rail supplying means, the welding apparatus, the grinding equipment and said mechanism in sequence to join a rail section to the continuous rail.

20. In an apparatus for welding rail sections together in end to end relationship to form a continuous rail, the combination of welding apparatus, grinding equipment, mechanism for passing the continuous rail from the welding apparatus to the grinding equipment, means for supplying rail sections one at a time to said welding apparatus, said welding apparatus including means for welding each rail section to the end of the continuous rail, means for shearing off a portion of the excess material of each weld, said grinding equipment including grinding means acting upon the continuous rail in the region of the weld for the purpose of removing weld material, and control means including an electrical control circuit for automatically operating the rail transfer device, the rail supplying means, the welding apparatus, the shearing means, the grinding equipment and said mechanism in predetermined sequence in order to weld the rail sections one at a time to the continuous rail, said control circuit including switch means actuated when the rail section is in position in the rail supplying means for advancement to the welding apparatus, said control circuits also including means rendered effective when the rail section is disposed in abutting end to end relationship with the continuous rail for rendering the welding apparatus effective to make the weld, said control circuit including means operated at the completion of the welding operation for rendering the shearing means effective to shear portions of the weld, and said control circuit also including means operated following the shearing for rendering the mechanism effective to move the completed weld to the grinding equipment.

21. A method of joining together a plurality of rail sections to form a continuous rail, said method comprising the steps of supplying rail sections one at a time and in end to end relationship, grinding electrode receiving portions respectively located near the opposed ends of each rail section, welding together the ends of adjacent rail sections by means of a welding apparatus including electrodes engageable with the electrode receiving portions of the rail sections, shearing off excess weld metal surrounding the weld, grinding the rail in the vicinity of the weld at a plurality of spaced apart grinding stations, pulling the rail so that the weld moves from the welding apparatus to the first of the grinding stations at relatively high speed, pulling the rail at relatively slow speed as the weld passes through each grinding station and pulling it at relatively high speed as the weld passes between the grinding stations, and pushing the ground rail to a rail storage area.

22. A method of joining together a plurality of rail sections to form a continuous rail, said method comprising the steps of supplying rail sections one at a time and in end to end relationship, grinding electrode receiving portions respectively located near the opposed ends of each rail section, welding together the ends of adjacent rail sections by means of a welding apparatus including electrodes engageable with the electrode receiving portions of the rail sections, grinding the rail in the vicinity of the weld at a plurality of spaced apart grinding stations, pulling the rail so that the weld moves from the welding apparatus to the first of the grinding stations at relatively high speed, pulling the rail at relatively slow speed as the weld passes through each grinding station and pulling it at relatively high speed as the weld passes between the grinding stations, and pushing the ground rail to a rail storage area.

23. In an apparatus for forming a continuous rail by passing individual rail sections one at a time and in sequence to a welding mechanism which joins the leading end of each section to the trailing end of the preceding section, the combination of means for moving the continuous rail through the welding mechanism after the weld has been made, means located at a fixed predetermined point in advance of the welding mechanism for sensing the arrival of the trailing end of the rail at said point, and a circuit including the last named means for rendering the rail moving means effective to move the rail through a predetermined distance following arrival of the trailing end of the rail at said predetermined point and for then rendering the rail moving means ineffective to move the rail, whereby the continuous rail is stopped at a desired position within the welding mechanism irrespective of variations in length of the rail sections.

24. The apparatus defined by claim 23 wherein the sensing means comprises a limit switch engaged by the continuous rail during its movement and disengaged when the trailing end of the rail passes said predetermined point.

25. The apparatus defined by claim 23 wherein the control circuit includes a counter mechanism whose operation is initiated by the sensing means, said counter mechanism being driven by the rail during movement of the latter and including switch means connected in said circuit to render the rail moving means ineffective to move the rail after the counter mechanism completes a preselected number of counts.

26. The apparatus defined by claim 25 wherein the sensing means comprises a limit switch engaged by the continuous rail during its movement and disengaged when the trailing end of the rail passes said predetermined point.

27. A method of forming a continuous rail from first, second, third, fourth and fifth rail sections, said method comprising the steps of supplying said rail sections successively and in the order named to welding apparatus where the ends of the rail sections are welded together, passing the welded joints through a grinding station where each joint is ground to remove a portion of the excess metal, passing the welded rail to a testing station, testing the weld at the latter station, the above steps being so carried out that the weld between the first and second sections is tested while the third and fourth sections are being welded together, and with the weld between the third and fourth sections being passed through the grinding station while the fifth section is being supplied to the welding apparatus.

28. A method of forming a continuous rail from first, second, third, fourth, fifth, sixth and seventh rail sections, said method comprising the steps of supplying said rail sections successively and in the order named to welding apparatus where the ends of the rail sections are welded together, passing the welded joints through a grinding station where each joint is ground to remove a portion of the excess metal, passing the welded rail to a testing station, testing the weld at the latter station, the above steps being so carried out that the weld between the first and second sections is tested while the third and fourth sections are being welded together, the weld between the third and fourth sections being passed through the grinding station while the fifth section is being supplied to the welding apparatus, the weld between the second and third sections being tested while the ends of the fourth and fifth sections are being welded together and the weld between the fourth and fifth sections being passed through the grinding station while the sixth rail section is being supplied to the welding apparatus, the weld between the third and fourth sections being tested while the ends of the fifth and sixth sections are being welded together, and the weld between the fifth and sixth sections being passed through the grinding station while the seventh rail section is being supplied to the welding apparatus.

29. In an apparatus for forming a continuous rail by welding together rail sections supplied in sequence to a welding mechanism, said mechanism being of the type having a plurality of movable clamps mounted upon a movable carriage and engageable with the rail section to lock the latter to the carriage, at least one of said clamps including a fluid pressure operated piston and cylinder assembly for applying and retracting said one clamp by moving it towards and away from the rail section, said mechanism also including a plurality of stationary clamps at least one of which is provided with a piston and cylinder for moving it into and out of engagement with the continuous rail, said mechanism further being provided with means including a plurality of welding electrodes, at least one of which is connected to a piston and cylinder for moving it into and out of engagement with the rail section and another of which is connected to a piston and cylinder for moving it into and out of engagement with the continuous rail, for passing current through the ends of the rail section and the continuous rail in order to heat them, said mechanism including a carriage operating piston and cylinder for reciprocating the carriage to flash the ends of the rail and the rail section while the current is passing therethrough and for then forcing said ends together to complete the weld and to create an upset therearound, said mechanism being provided with means including a shear box mounted on said carriage and surrounding the rail section for shearing the upset around the weld, the last named means including a shear box operating piston and cylinder for extending and retracting the shear box by moving it along the rail section upon the carriage, the improvement which comprises a control circuit for sequentially operating the piston and cylinders in such manner that the stationary and movable clamps are first moved into respective engagement with the rail and the rail section, the welding electrodes are next moved into engagement with the rail and the rail section and the current is then passed through the electrodes, the carriage operating cylinder is next rendered effective to reciprocate the carriage and to make the weld, the welding electrodes are then disengaged from the rail and the rail section, the movable clamps are then disengaged from the rail section, the shear box operating piston and cylinder is rendered effective to move the shear box along the rail section towards the upset, the movable clamps are then applied to lock the shear box to the carriage, the carriage operating piston and cylinder is then rendered effective to move the carriage in a direction to drive the shear box through the upset and is then rendered effective to move the carriage in the reverse direction, the movable clamps are then retracted and the shear box operating piston and cylinder is then rendered effective to retract the shear box by moving it along the rail section away from the weld.

30. The apparatus defined by claim 29 wherein the control circuit includes limit switches actuated by the movements of the stationary and movable clamps, the welding electrodes, the shear box and the carriage for rendering the circuit automatically effective to make the weld and shear the upset as soon as the rail section and the rail are properly aligned in end to end relationship within the welding mechanism.

31. In an apparatus for forming a continuous rail by welding together rail sections supplied in sequence to a welding mechanism, said mechanism being of the type having a plurality of movable clamps mounted upon a movable carriage and engageable with the rail section to lock the latter to the carriage, at least one of said clamps including a fluid pressure operated piston and cylinder assembly for applying and retracting said one clamp by moving it towards and away from the rail section, said mechanism also including a plurality of stationary clamps at least one of which is provided with a piston and cylinder for moving it into and out of engagement with the continuous rail, said mechanism further being provided with means including a plurality of welding electrodes at least one of which is connected to a piston and cylinder for moving it into and out of engagement with the rail section and another of which is connected to a piston and cylinder for moving it into and out of engagement with the continuous rail, for passing current through the ends of the rail section and the continuous rail in order to heat them, said mechanism including a carriage operating piston and cylinder for reciprocating the carriage to flash the ends of the rail and the rail section while the current is passing therethrough and for then advancing the carriage to force said ends together to complete the weld and to create an upset therearound, said mechanism being provided with means including a shear box mounted on said carriage and surrounding the rail section for shearing the upset around the weld, the last named means including a shear box operating piston and cylinder for extending and retracting the shear box by moving it along the rail section upon the carriage, the improvement which comprises an automatic control circuit for sequentially operating the piston and cylinders in such manner that the stationary and movable clamps are first moved into respective engagement with the rail and the rail section, said circuit including first limit switch means actuated by the application of the movable and stationary clamps for next rendering the piston and cylinders associated with the welding electrode effective to move the latter electrodes into engagement with the rail and the rail section and for then passing the current between the electrodes, second limit switch means operated when the electrodes are applied for rendering the carriage operating cylinder effective to reciprocate the carriage and to make the weld, third limit switch means actuated when the carriage is fully advanced to complete the weld for rendering the piston and cylinders connected to the electrodes effective to retract the electrodes and to render the piston and cylinder associated with said one movable clamp effective to disengage the latter clamp from the rail section, fourth limit switch means actuated when the said one movable clamp is retracted to render the shear box operating piston and cylinder effective to extend the shear box along the rail section towards the upset, fifth limit switch means actuated when the shear box is extended for rendering the piston and cylinder associated with said one movable clamp effective to apply the latter in order to lock the shear box to the carriage, said first limit switch means being effective when said one movable clamp is applied to render the carriage operating piston and cylinder effective to move the carriage in a direction to drive the shear box through the upset, said third limit switch means being effective when the carriage is advanced to render the carriage operating piston and cylinder effective to move the carriage in the reverse direction in order to retract the carriage, sixth limit switch means actuated when the carriage is retracted to render the piston and cylinder associated with said one movable clamp effective to retract said one clamp, said fourth limit switch means being effective when said one clamp is retracted to render the shear box operating piston and cylinder effective to retract the shear box by moving it along the rail section away from the weld.

32. In an apparatus for welding rail sections together in end to end relationship to form a continuous rail, the combination of electric welding apparatus, grinding equipment, pusher mechanism for passing the continuous rail from the welding apparatus to the grinding equipment and for pushing the rail to a storage area, said pusher mechanism including a brake effective to stop the mechanism in order to hold the rail with its trailing end disposed within the welding apparatus, means for supplying rail sections one at a time to said welding apparatus, control means including an electrical control circuit for automatically operating the rail supplying means, the welding apparatus, the grinding equipment and said pusher mechanism in predetermined sequence in order to weld the rail sections one at a time to the continuous rail, said control circuit including switch means actuated when a rail section is disposed in the rail supplying means in position to be advanced to the welding apparatus, said switch means when actuated rendering the rail supplying means effective to advance the rail section to the welding apparatus, said control circuit also including means rendered effective when the rail section is disposed in abutting end to end relationship with the continuous rail for applying the brake on the pusher mechanism in order to hold the rail in position while a weld is being made, and said control circuit also including means operated after the weld has been made for releasing the brake on the pusher mechanism and for rendering the pusher mechanism effective to move the completed weld to the grinding equipment.

33. In an apparatus for welding rail sections together in end to end relationship to form a continuous rail, the combination of electric welding apparatus, grinding equipment, pusher mechanism for passing the continuous rail from the welding apparatus to the grinding equipment and for pushing the ground rail to a rail storage area, said pusher mechanism including a brake effective to stop the mechanism in order to hold the rail with its trailing end disposed within the welding apparatus, means for supplying rail sections one at a time to said welding apparatus, a rail transfer device for supplying rail sections one at a time to the supplying means, means for shearing off a portion of any excess material around each weld, said grinding equipment including a grinding belt acting upon the continuous rail in the region of the weld for the purpose of removing weld material and a plurality of pressure operated means for forcing the belt against the rail, and control means including an electrical control circuit for automatically operating the rail transfer device, the rail supplying means, the welding apparatus, the shearing means, the grinding means and said pusher mechanism in predetermined sequence in order to weld the rail sections one at a time to the continuous rail, said control circuit including switch means actuated when the rail section is supplied from the rail transfer device to the rail supplying means, said switch means when actuated rendering the rail supplying means effective to advance the rail section to the welding apparatus, said control circuit also including means rendered effective when the rail section is disposed in abutting end to end relationship with the continuous rail for applying the brake on said pusher mechanism while the weld is being made, said control circuit including means operated after the weld has been made for rendering the shearing means effective to shear off portions of the weld, said control circuit also including means operated following the shearing for releasing the brake on said pusher mechanism and for rendering the pusher mechanism effective to move the completed weld to the grinding equipment, said control means further including means operated in response to movement of the weld for rendering the pressure operated means effective in sequence to force the belt against the rail.

34. In an apparatus for welding rail sections together in end to end relationship to form a continuous rail for delivery to rail receiving means, the combination of electric welding apparatus, grinding equipment and a pusher mechanism for passing the continuous rail from one end of the welding apparatus through the grinding equipment to a rail storage area, said pusher mechanism including a brake for stopping the pusher mechanism to hold the rail with its trailing end disposed within the welding apparatus, rail supply means located adjacent the other end of said welding apparatus, said rail supply means including a rail transfer device for storing rail sections and supplying them one at a time to power driven means for feeding each rail section to the welding apparatus after it is supplied from the rail transfer device, said grinding equipment including a plurality of grinding heads each including a grinding belt and acting upon different portions of the continuous rail in the region of the weld for the purpose of removing weld material, a first of said grinding heads being spaced from a second of said heads in the direction of travel of the continuous rail, and a control circuit operable to apply the brake on said pusher mechanism while the weld is being made and to release the brake after the weld is completed to render the pusher mechanism effective to draw the continuous rail through the grinding equipment, said control circuit including means for varying the speed of travel, said speed varying means including counter mechanism driven by the rail movement and rendered effective to begin its count when the weld is completed, said counter mechanism being effective during a first predetermined interval while the weld moves from the welding apparatus to the vicinity of the second grinding head to cause the pusher mechanism to move the rail at relatively high speed, said counter mechanism being effective at the expiration of said first interval to render the pusher mechanism effective to move the rail at relatively low speed for a second interval while the weld passes the second grinding head, the counter mechanism being operated after said second interval to increase the speed of travel of the continuous rail to said relatively high speed during a third interval as the weld passes from the second grinding head to the first grinding head and at the expiration of said third interval to decrease the speed of travel to said relatively low value for a fourth interval during movement of the weld past the first grinding head, said counter mechanism being effective at the expiration of the fourth interval to render the pusher mechanism effective to increase the speed of travel of the rail to said relatively high speed for a fifth interval after the weld moves beyond the first grinding head, said counter mechanism being effective at the expiration of the fifth interval to render the control circuit effective to apply the brake to hold the continuous rail in position for the next weld.

35. In an apparatus for welding rail sections together in end to end relationship to form a continuous rail for delivery to rail receiving means, the combination of a single wheeled vehicle containing electric welding apparatus, flash removing means and pusher mechanism for pushing the continuous rail from one end of the vehicle to the rail receiving means, rail supply means located adjacent the other end of said vehicle for supplying rail sections one at a time to the welding apparatus, a spot grinder operated automatically as the rail sections are advanced to the welding apparatus for grinding portions of each rail section near each of its ends in order to clean these portions prior to supplying the rail section to the welding apparatus, said welding apparatus including first and second electrodes respectively engageable with adjacent cleaned end portions of successive rail sections to be welded together and further including means for causing current flow between the electrodes and through the end portions of the rail sections in order to make the weld, said flash removing equipment being spaced from said welding apparatus and including means acting upon the continuous rail in the region of the weld for the purpose of removing weld flash material, and said pusher mechanism including means for advancing the continuous rail from the welding apparatus through the flash removing means and for directing the free end of the continuous rail out of said vehicle and onto the rail receiving means.

36. In an apparatus for welding rail sections together in end to end relationship to form a continuous rail for delivery to rail receiving means, the combination of a single wheeled vehicle containing electric welding apparatus, flash removing means and pusher mechanism for pushing the continuous rail from one end of the vehicle to the rail receiving means, rail supply means located adjacent the other end of said vehicle for supplying rail sections one at a time to the welding apparatus, a spot grinder operated automatically as the rail sections are advanced to the welding apparatus for grinding portions of each rail section near each of its ends in order to clean these portions prior to supplying the rail section to the welding apparatus, said welding apparatus including first and second electrodes respectively engageable with adjacent cleaned end portions of successive rail sections to be welded together and further including means for causing current flow between the electrodes and through the end portions of the rail sections in order to make the weld, said flash removing means being spaced from said welding apparatus and acting upon the continuous rail in the region of the weld for the purpose of removing at least a portion of the weld flash material, means for normally preventing engagement of said flash removing means with said continuous rail but effective when the continuous rail is advanced to a position where the welded joint is in the vicinity of the flash removing means to act against the rail to remove the excess weld flash material, and said pusher mechanism including means for advancing the continuous rail from the welding apparatus through the flash removing means and for directing the free end of the continuous rail out of said vehicle and onto the rail receiving means.

37. In an apparatus for welding rail sections together in end to end relationship to form a continuous rail for delivery to rail receiving means, the combination of a single wheeled vehicle containing electric welding apparatus, flash removing means and a pusher mechanism for pushing the continuous rail from one end of the vehicle to the rail receiving means, power driven rail supply means located adjacent the other end of said car for supplying rail sections one at a time to the welding apparatus and into abutting end to end relationship with the continuous rail, said welding apparatus including means for causing current flow through the abutting ends of the rail section and the continuous rail in order to make the weld, said flash removing means being spaced from said welding apparatus and including means for removing at least a portion of the flash surrounding the rail when the continuous rail is advanced by the pusher mechanism from the welding apparatus to a position where the welded joint reaches the vicinity of the flash removing means, and said pusher mechanism including means for advancing the continuous rail from the welding apparatus through the flash removing means and for directing the free end of the continuous rail out of said vehicle and onto the rail receiving means.

38. In an apparatus for welding rail sections together in end to end relationship to form a continuous rail for delivery to rail receiving means, the combination of a single wheeled vehicle containing electric welding apparatus, flash removing means and a pusher mechanism for pushing the continuous rail from one end of the vehicle to the rail receiving means, power driven rail supply means located adjacent the other end of said vehicle for supplying rail sections one at a time to the welding apparatus and into abutting end to end relationship with the continuous rail, said welding apparatus including means for causing current flow through the abutting ends of the rail section and the continuous rail in order to make the weld, said flash removing means being spaced from said welding apparatus and being normally ineffective to act upon said continuous rail, said flash removing means further including means operated when the continuous rail is advanced by the pusher mechanism from the welding apparatus to a position where the welded joint is adjacent the flash removing means to render said flash removing means effective to act upon the continuous rail in the region of the weld to remove excess weld flash material, and said pusher mechanism including means for advancing the continuous rail from the welding apparatus through the flash removing means and for directing the free end of the continuous rail out of said vehicle and onto the rail receiving means.

39. In a welding apparatus for forming a continuous rail by joining together individual rail sections in end to end relationship, the combination of means for moving the continuous rail through mechanism for acting upon the rail, sensing means located at a fixed station in advance of said mechanism for sensing the arrival of a predetermined point on the rail at said station, and a control circuit including the sensing means for rendering the rail moving means effective to move the rail through a predetermined distance following arrival of said predetermined point on the rail at said station and for then developing a control signal.

40. The apparatus defined by claim 39 wherein the control circuit includes a counter mechanism the operation of which is initiated by the sensing means, said counter mechanism being driven by the rail driving movement of said predetermined point through said predetermined distance and including means for developing said control signal after said counter mechanism completes a preselected number of counts.

41. The apparatus defined by claim 39 wherein means are provided for responding to the control signal to render the rail moving means ineffective to move the rail, thereby to stop the continuous rail at a desired position with respect to said mechanism irrespective of variations in length of the rail sections.

42. The apparatus defined by claim 40 wherein means are provided for responding to the control signal to render the rail moving means ineffective to move the rail, thereby to stop the continuous rail at a desired position with respect to said mechanism irrespective of variations in length of the rail sections.

43. The apparatus defined by claim 39 wherein means are provided responsive at least in part to said control signal for rendering said mechanism effective to act upon the rail as soon as said predetermined point has traversed said predetermined distance.

44. The apparatus defined by claim 40 wherein means are provided responsive at least in part to said control signal for rendering said mechanism effective to act upon the rail as soon as said predetermined point has traversed said predetermined distance.

45. A method of forming a continuous rail from first, second, third, fourth and fifth rail sections, the method comprising the steps of supplying said rail sections successively and in the order named to welding apparatus where the ends of the rail sections are welded together, passing the welded joints through a flash removing station where at least a portion of the excess flash metal surrounding each weld is removed, passing the welded rail to a testing station, testing the weld at the latter station, the above steps being so carried out that the weld between the first and second sections is tested while the third and fourth sections are being welded together, and with the weld between adjacent ends of the rail sections being passed through the flash removing station as it moves from the welding apparatus to the testing station.

46. A method of forming a continuous rail from first, second, third, fourth and fifth rail sections, the method comprising the steps of supplying said rail sections successively and in the order named to the welding apparatus, grinding portions of the periphery of each rail section respectively located near its opposed ends prior to supplying the rail section to the welding apparatus, passing electric current between adjacent ends of successive rail sections by means of electrodes in the welding apparatus in engagement with the ground peripheral portions of the adjacent ends of the successive rail sections in order to weld together the ends of the rail sections and then forcing the rail sections together to form a flash upset surrounding the welded joint, passing the welded joints through a flash removing station where at least a portion of the excess flash metal around each joint is removed, passing the welded rail to a testing station, testing the weld at the latter station, the above steps being so carried out that the weld between the first and second sections is tested while the third and fourth sections are being welded together, and with the weld between adjacent ends of the rail sections being passed through the flash removing station as it moves from the welding apparatus to the testing station.

47. The method defined by claim 46 wherein the grinding of the peripheral portions of each rail section is carried out while the rail section is in motion in passing to the welding apparatus.

48. A method of forming a continuous rail from first, second, third, fourth and fifth rail sections, the method comprising the steps of supplying said rail sections successively and in the order named to welding apparatus, grinding portions of the periphery of each rail section respectively located near its opposed ends prior to supplying the rail section to the welding apparatus, passing electric current between adjacent ends of successive rail sections by means of electrodes in the welding apparatus in engagement with the ground peripheral portions of the adjacent ends of the successive rail sections in order to weld together the ends of the rail sections and then forcing the rail sections together to form a flash upset surrounding the welded joint, passing the welded joints through a grinding station where each joint is ground to remove at least a portion of the excess metal, passing the welded rail to a testing station, testing the weld at the latter station, the above steps being so carried out that the weld between the first and second sections is tested while the third and fourth sections are being welded together, and with the weld between adjacent ends of the rail sections being passed through the grinding station as it moves from the welding apparatus to the testing station.

49. The method defined by claim 48 wherein the grinding of the peripheral portions of each rail section is carried out while the rail section is in motion in passing to the welding apparatus.

50. A method of forming a continuous rail from first, second, third, fourth, fifth, sixth and seventh rail sections, said method comprising the steps of supplying said rail sections successively and in the order named to welding apparatus where the ends of the rail sections are welded together by passing electric current through the ends of adjacent rail sections and by then forcing the adjacent rail sections together to form a flash upset, passing the welded joints through a grinding station where each joint is ground to remove a portion of the flash upset, passing the welded rail to a testing station, testing the weld at the latter station, the above steps being so carried out that the weld between the first and second sections is tested while the third and fourth sections are being welded together, the weld between the third and fourth sections being passed through the grinding station as it passes from the welding apparatus to the testing station, the weld between the second and third sections being tested while the ends of the fourth and fifth sections are being welded together and the weld between the fourth and fifth sections being passed through the flash removing station as it passes from the welding apparatus to the testing station, the weld between the third and fourth sections being tested while the ends of the fifth and sixth sections are being welded together, and the weld between the fifth and sixth sections being passed through the grinding station as it passes from the welding apparatus to the testing station.

51. A method of forming a continuous rail from first, second, third, fourth, fifth, sixth and seventh rail sections, said method comprising the steps of supplying said rail sections successively and in the order named to welding apparatus where the ends of the rail sections are welded together, passing the welded joints through a flash removing station where at least a portion of the excess flash metal around each joint is removed, passing the welded rail to a testing station, testing the weld at the latter station, the above steps being so carried out that the weld between the first and second sections is tested while the third and fourth sections are being welded together, the weld between the third and fourth sections being passed through the flash removing station as it passes from the welding apparatus to the testing station, the weld between the second and third sections being tested while the ends of the fourth and fifth sections are being welded together and the weld between the fourth and fifth sections being passed through the flash removing station as it passes from the welding apparatus to the testing station, the weld between the third and fourth sections being tested while the ends of the fifth and sixth sections are being welded together, and the weld between the fifth and sixth sections being passed through the grinding station to the welding apparatus.

52. A method of forming a continuous rail from first, second, third, fourth, fifth, sixth and seventh rail sections, said method comprising the steps of supplying said rail sections successively and in the order named to welding apparatus, grinding portions of the periphery of each rail section respectively located near its opposed ends prior to supplying the rail section to the welding apparatus, passing electric current between adjacent ends of successive rail sections by means of electrodes in the welding apparatus in engagement with the ground peripheral portions of the adjacent ends of the successive rail sections in order to weld together the ends of the rail sections and then forcing the rail sections together to form a flash upset surrounding the welded joint, passing the welded joints through a flash removing station where at least a portion of the excess flash metal around each joint is removed, passing the welded rail to a testing station, testing the weld at the latter station, the above steps being so carried out that the weld between the first and second sections is tested while the third and fourth sections are being welded together, the weld between the third and fourth sections being passed through the grinding station as it passes from the welding apparatus and the testing station, the weld between the second and third sections being tested while the ends of the fourth and fifth sections are being welded together and the weld between the fourth and fifth sections being passed through the grinding station as it passes from the welding apparatus to the testing station, the weld between the third and fourth sections being tested while the ends of the fifth and sixth sections are being welded together, and the weld between the fifth and sixth sections being passed through the grinding station as it passes from the welding apparatus to the testing station.

53. The method defined by claim 52 wherein the grinding of the peripheral portions of each rail section is carried out while the rail section is in motion in passing to the welding apparatus.

References Cited in the file of this patent

UNITED STATES PATENTS

| | | |
|---|---|---|
| 444,855 | Ries | Jan. 20, 1891 |
| 1,958,158 | Budd | May 8, 1934 |
| 2,250,869 | Jones et al. | July 29, 1941 |